US010911116B2

(12) United States Patent
Wee et al.

(10) Patent No.: US 10,911,116 B2
(45) Date of Patent: Feb. 2, 2021

(54) WIRELESS COMMUNICATION METHOD AND WIRELESS COMMUNICATION APPARATUS

(71) Applicant: Panasonic Intellectual Property Corporation of America, Torrance, CA (US)

(72) Inventors: Yao Huang Gaius Wee, Singapore (SG); Lei Huang, Singapore (SG); Hiroyuki Motozuka, Kanagawa (JP); Masataka Irie, Kanagawa (JP)

(73) Assignee: Panasonic Intellectual Property Corporation of America, Torrance, CA (US)

(*) Notice: Subject to any disclaimer, the term of this patent is extended or adjusted under 35 U.S.C. 154(b) by 0 days.

(21) Appl. No.: 16/423,221

(22) Filed: May 28, 2019

(65) Prior Publication Data
US 2019/0280749 A1    Sep. 12, 2019

Related U.S. Application Data

(63) Continuation of application No. PCT/JP2017/041973, filed on Nov. 22, 2017.
(Continued)

(30) Foreign Application Priority Data

Nov. 9, 2017 (JP) ................ 2017-216527

(51) Int. Cl.
*H04W 16/28* (2009.01)
*H04B 7/06* (2006.01)
*H04W 84/12* (2009.01)

(52) U.S. Cl.
CPC ........... *H04B 7/0617* (2013.01); *H04B 7/06* (2013.01); *H04W 16/28* (2013.01); *H04W 84/12* (2013.01)

(58) Field of Classification Search
None
See application file for complete search history.

(56) References Cited

U.S. PATENT DOCUMENTS

2016/0373167 A1* 12/2016 Nishioka ............. H02J 50/40
2017/0265122 A1*  9/2017 Levy .................... H04W 48/10
2019/0280749 A1*  9/2019 Wee ..................... H04W 16/28

FOREIGN PATENT DOCUMENTS

WO    2015/132827    9/2015

OTHER PUBLICATIONS

International Search Report of PCT application No. PCT/JP2017/041973 dated Feb. 13, 2018.
(Continued)

*Primary Examiner* — Phuongchau Ba Nguyen
(74) *Attorney, Agent, or Firm* — Seed IP Law Group LLP

(57) ABSTRACT

A wireless communication apparatus transmits a beacon frame during a beacon transmission interval (BTI), receives a transmission sector sweep (SSW) frame from another wireless communication apparatus, during a beamforming training (BFT) period following the BTI, extracts, in a case where information relating to a discovery request is included in the transmission SSW frame, information relating to a first transmission sector that is selected by the other wireless communication apparatus from among the transmission SSW frames, selects a second transmission sector from transmission sectors used by the other wireless communication apparatus, the transmission sectors being included in the transmission SSW frames, transmits a feedback frame including information regarding the selected second transmission sector, using the first transmission sector during the BFT period, and transmits a probe response frame including information regarding the selected second transmission sec- (Continued)

tor, using the first transmission sector, during a data transmission period following the BFT period.

6 Claims, 53 Drawing Sheets

Related U.S. Application Data

(60) Provisional application No. 62/430,251, filed on Dec. 5, 2016.

(56) References Cited

OTHER PUBLICATIONS

IEEE Std 802.11ad(TM)-2012, IEEE Standard for Information technology—Telecommunications and information exchange between systems, Local and metropolitan area networks—Specific requirements, Part 11: Wireless LAN Medium Access Control (MAC) and Physical Layer (PHY) Specifications, Amendment 3: Enhancements for Very High Throughput in the 60 GHz Band (pp. 278-314, pp. 337-339), Dec. 28, 2012.

IEEE Std 802.11ad(TM)-2012, IEEE Standard for Information technology—Telecommunications and information exchange between systems, Local and metropolitan area networks—Specific requirements, Part 11: Wireless LAN Medium Access Control (MAC) and Physical Layer (PHY) Specifications, Amendment 3: Enhancements for Very High Throughput in the 60 GHz Band (All pages), Dec. 28, 2012.

IEEE 802.11-10/0433r2, "PHY/MAC Complete Proposal Specification", May 18, 2010, pp. 1-335.

IEEE 802.11-16/1165r3, "Scalable A-BFT", Sep. 10, 2016.

* cited by examiner

WIRELESS COMMUNICATION METHOD AND WIRELESS COMMUNICATION APPARATUS

BACKGROUND

1. Technical Field

The present disclosure relates to a wireless communication method and a wireless communication apparatus.

2. Description of the Related Art

IEEE 802.11 is one of wireless local area network (LAN) standards, and includes, for example the IEEE 802.11ad standard (hereinafter referred to as "11 ad standard") (e.g., see IEEE 802.11ad TM-2012 pp 278-314 and pp 337-339, published Dec. 28, 2012). The 11ad standard uses beamforming (BF) technology. Beamforming is a method where the directionalities of one or more transmitting units and receiving units included in a wireless communication apparatus are respectively changed to set antenna directionality so that communication quality, e.g., reception strength, is optimal.

SUMMARY

In a case where beamforming is not completed in an active scan, a conventional station (STA) reattempts beamforming in a data transmission interval (DTI: Data Transfer Interval), for example. In this case, the time until the STA completes discovery of an Access Point/Personal basic service set Control Point (AP/PCP) is delayed. Also, this causes interference for other STAs that perform data communication.

One non-limiting and exemplary embodiment provides a wireless communication method and a wireless communication apparatus that reduces delay in time until discovery is completed.

In one general aspect, the techniques disclosed here feature a wireless communication method for a wireless communication apparatus. The method includes: transmitting one or more beacon frames during a beacon transmission period; receiving one or more transmission sector sweep frames from another wireless communication apparatus, during a beamforming training period following the beacon transmission period; extracting, in a case where information relating to a discovery request is included in the one or more transmission sector sweep frames, information relating to a first transmission sector that is selected by the other wireless communication apparatus from among the one or more transmission sector sweep frames; selecting a second transmission sector from transmission sectors used by the other wireless communication apparatus, the transmission sectors being included in the received one or more transmission sector sweep frames; transmitting a feedback frame including information regarding the selected second transmission sector, using the first transmission sector during the beamforming training period; and transmitting a Probe Response frame including information regarding the selected second transmission sector, using the first transmission sector, during a data transmission period following the beamforming training period.

According to one embodiment of the present disclosure, delay in time until discovery is completed can be reduced.

It should be noted that these general or specific embodiments may be implemented as a system, an apparatus, a method, an integrated circuit, a computer program, or a recording medium, and may be realized by any combination of a system, apparatus, method, integrated circuit, computer program, and recording medium.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Embodiments of the present disclosure will be described in detail below, with reference to the drawings as appropriate. Note whoever, that unnecessarily detailed description may be omitted. For example, detailed description of well-known items, and repeated description of configurations that are substantially the same, may be omitted. This is to avoid the following description from becoming unnecessarily redundant, and facilitate understanding of those skilled in the art.

Note that the attached drawings and the following description have been provided for sufficient understanding of the present disclosure by those skilled in the art, and are not intended to restrict the subject matter of the Claims.

Procedures for a certain STA, that is an example of a wireless communication apparatus, to discover another STA in order to perform initial connection with another STA, is referred to as discovery. Conceivable applications using 60 GHz millimeter wave communication include, for example, data downloading at automated turnstiles that require high-speed connection, backup wireless channels that substitute for and/or complement wired networks in a data center, and so forth. Such applications require high-speed connection, so high-speed discovery of 100 msec or less is being studied.

IEEE 802.11ad, which is a 60 GHz millimeter wave communication standard, stipulates active scanning as a procedure for discovery. An active scan includes procedures for BTI (Beacon Transmission Interval) processing, association-beamforming training (A-BFT) period processing, and probe exchange processing.

Figure 1:
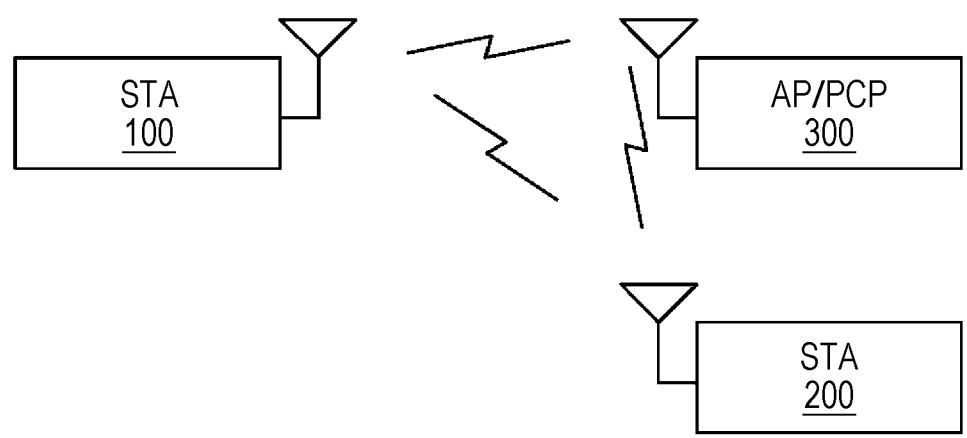
FIG. 1 is a block diagram illustrating an example of a STA performing an active scan, and discovering another STA.

FIG. 1 illustrates an example of a block diagram in a case where a STA 100 performs an active scan, and discovers another STA (peer STA). Note that there are cases where another STA (STA 200) that performs active scanning coexists. The PEER STA may be an AP or PCP (expressed as "AP/PCP") that are examples of wireless base stations (wireless communication apparatuses). The STA 100 and STA 200 may also be non-AP/PCP STAs (adapter, terminal (wireless communication apparatus)). Although the terms of wireless communication apparatus, wireless base station, and adapter (terminal) will be used to simplify description, a wireless base station may operate as an adapter, and an adapter may operate as a wireless base station.

In a BTI, the STA 100 receives or transmits a transmission sector sweep using a DMG (Directional Multi-Gigabit) beacon frame (hereinafter may be referred to as "DMG beacon").

Note that an AP/PCP 300 transmits multiple DMG beacons while switching transmission sectors (transmission beams). The STA 100 receives a DMG beacon, and measures the reception strength and/or reception quality. There are also cases where the STA 100 performing active scanning performs a transmission sector sweep during a BTI.

During the A-BFT period, the STA 100 transmits or receives a transmission sector sweep (of the STA 100) using an SSW (Sector Sweep) frame. The STA 100 also receives or transmits an SSW feedback (SSW-FB) frame.

Note that the STA 100 transmits SSW frames switching the transmission sector (transmission beam) each SSW frame. The AP/PCP 300 receives a SSW frame, measures the reception strength and/or reception quality, and transmits an SSW-FB frame including the measurement results to the STA 100. The STA 100 receives the SSW-FB frame and completes the BFT. Note that in a case where the STA 100 performs a transmission sector sweep during a BTI, the AP/PCP 300 performs a transmission sector sweep during the A-BFT period, and the STA 100 transmits an SSW-FB frame.

The STA 100 that is going to perform active scanning determines a best sector for transmission (a beam appropriate for transmission) during the BTI and A-BFT period, as BFT. The beam indicates the antenna directionality. In a case where BFT has been completed, the STA 100 transmits a Probe Request frame (hereinafter may be referred to simply as "probe request") in probe exchange processing. In a case of having received a probe request, the AP/PCP 300 transmits a Probe Response frame (hereinafter may be referred to simply as "probe response").

Note that in a case of not performing BFT, the STA 100 performs omnidirectional communication. However, the propagation loss is great in 60 GHz millimeter wave communication, so there are cases where it is difficult for omnidirectional transmission signals to reach the AP/PCP 300.

The STA 100 acquires information relating to the terminal connected to (e.g., AP/PCP 300) and basic service set (BSS), by probe exchange processing. The STA 100 determines the other part for connection, e.g., the STA 100 determines whether to connect to the AP/PCP 300 or to discover a different terminal, in accordance with the acquired information. In the 11ad standard, the A-BFT period is shared with other STAs that have received the DMG beacon.

Figure 2:
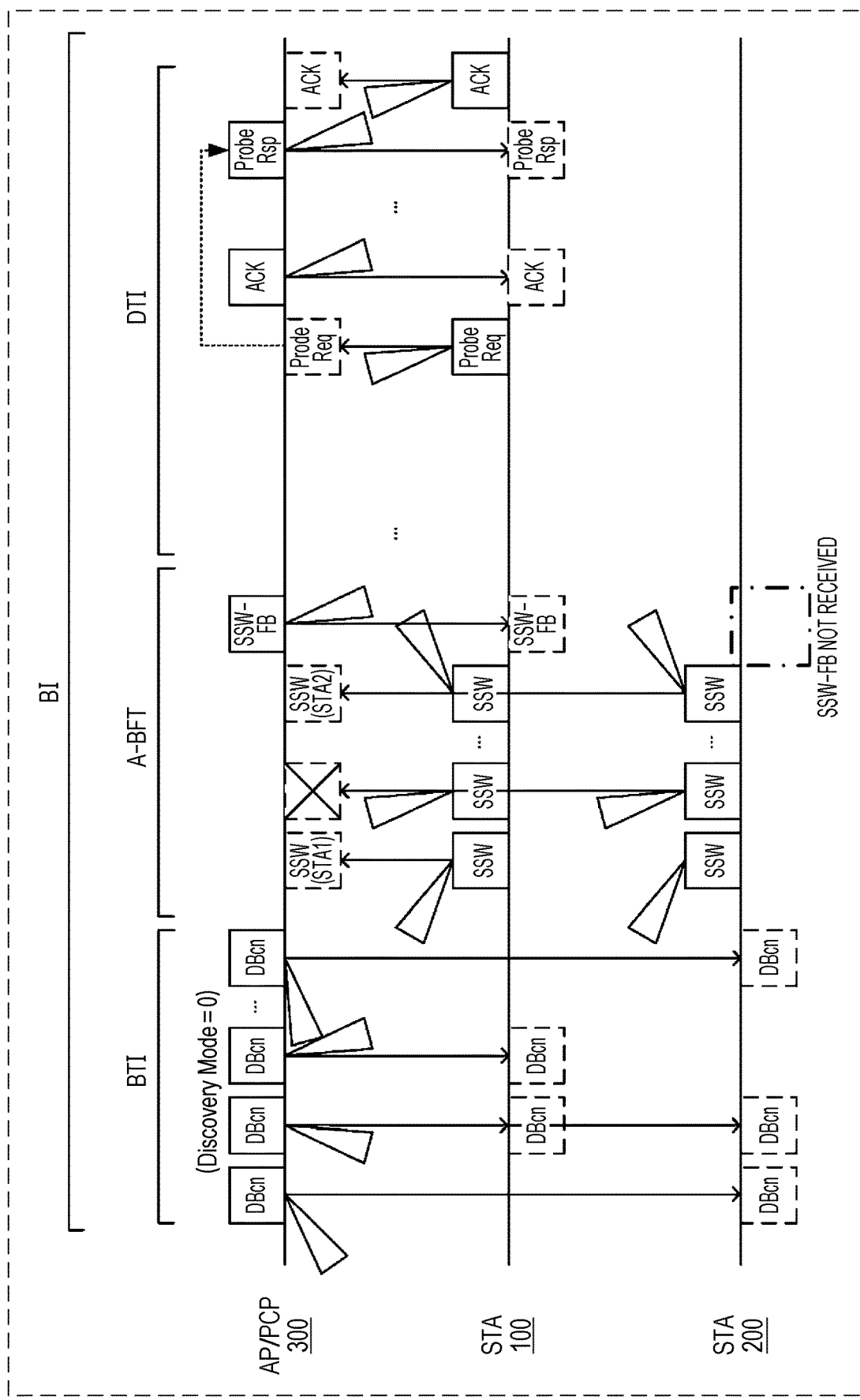
FIG. 2 is a diagram illustrating an example of procedures of a STA performing an active scan.

FIG. 2 is a diagram illustrating an example of procedures for the STA 100 and STA 200 to perform active scanning. In FIG. 2, BI (beacon interval) includes BTI, A-BFT period, and data transfer interval (DTI). For example, the STA 100 and STA 200 receive a DMG beacon ("DBcn" in FIG. 2), and perform transmission sector sweep (transmission of SSW frame) during the A-BFT period.

There are cases where the number of STAs receiving a SSW-FB frame and completing BFT is one at the most, due to multiple STAs performing transmission sector sweeping and contention (e.g., collision of transmission packets) occurring during the A-BFT period. In FIG. 2, the STA 100 receives the SSW-FB frame that the AP/PCP 300 has transmitted addressed to the STA 100, and the STA 200 does not receive the SSW-FB frame.

Accordingly, the STA 100 performs probe exchange processing (processing from transmission of probe request to reception of probe response) during the DTI. Note that in a case where no error is contained in the received probe request, the AP/PCP 300 transmits an ACK frame. Whether or not an error is contained in the received probe request may be determined by frame check sequence (FCS) and/or cyclic redundancy check (CRC), for example. Description of ACK will be omitted.

A STA (STA 200) that did not complete BFT (STA 200) may wait for the next BTI (omitted from illustration) and reattempt BFT. However, in this case, the processing delay reaches at least one beacon interval (e.g., 100 msec), so delay is great.

Note that the STA 200 may start a sector sweep in the DTI. For example, the STA 200 that has not completed beamforming during the BTI and A-BFT period (e.g., failed due to contention) may perform BFT in the DTI after the A-BFT period.

There is interference on wireless channels in the DTI (due to sector sweeps by other STAs omitted from illustration, and data transmission/reception by the STA 100), so there are cases where the probability of completing BFT is low.

First Embodiment

In a first embodiment, a STA that is going to perform an active scan sets a field indicating a discovery request (DR=1) in an SSW frame and transmits, thereby notifying that it can handle reception of a probe response including beamforming feedback information.

Accordingly, even in a case where there is contention of sector sweeps with other STAs performing active scans during the A-BFT period and DTI, the STA transmitting the SSW frame including DR=1 can judge completion of beamforming by reception of the probe response. Accordingly, the probability of beamforming being completed increases, and the amount of time required for discoverer is reduced.

Procedures for the STA 100 to perform active scanning will be described with reference to FIG. 3. During the BTI in FIG. 3, the AP/PCP 300 transmits DMG beacons (DBcn) for example, changing the transmission sector with each DMG beacon.

Figure 3:
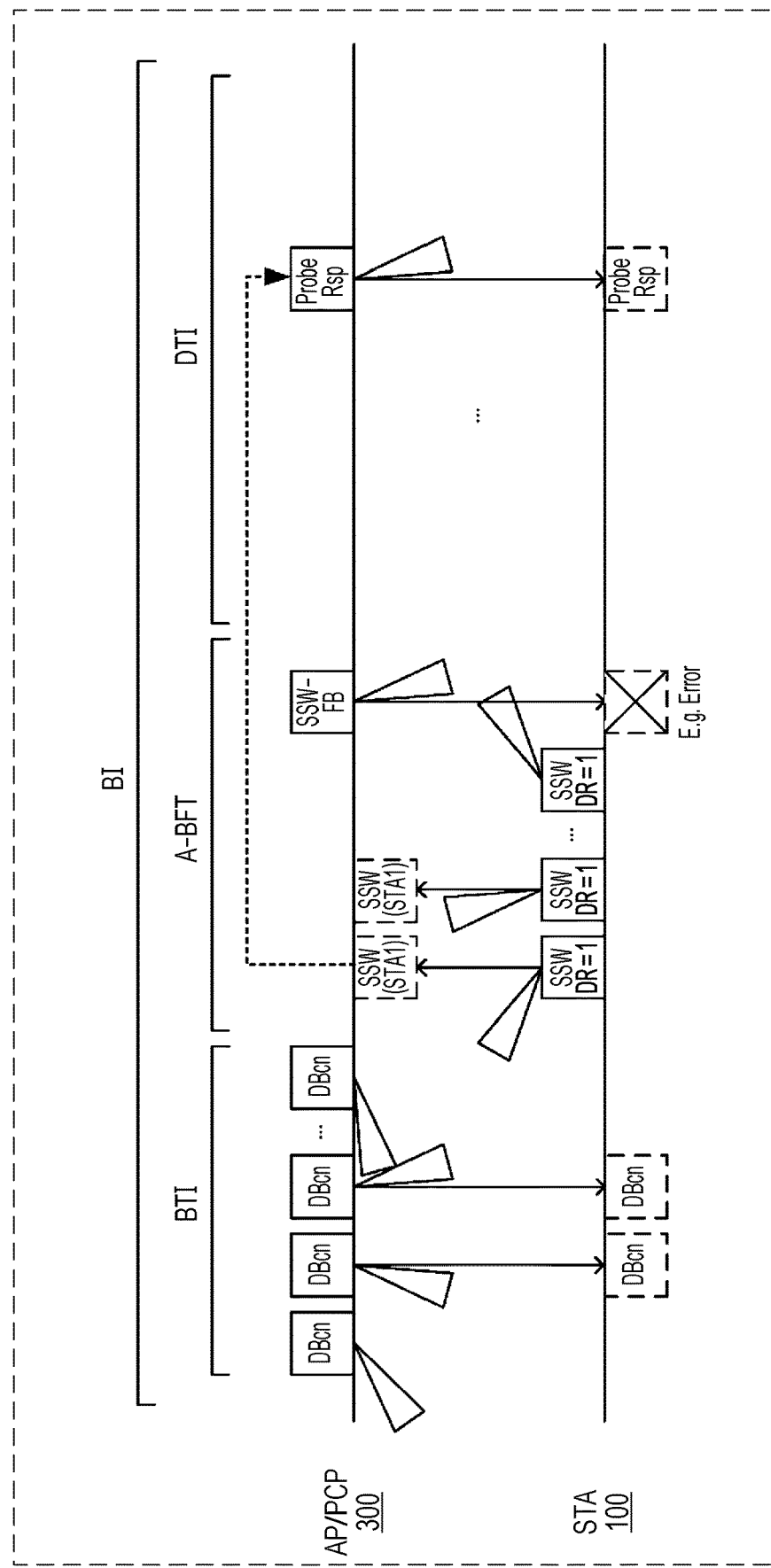
FIG. 3 is a diagram for describing procedures of a STA performing an active scan according to a first embodiment.

The STA 100 receives a DMG beacon during the BTI in FIG. 3. Note that the other STA (STA 200) may receive a DMG beacon in the same BTI.

During the A-BFT period in FIG. 3, the STA 100 transmits SSW frames, changing the transmission sector for each SSW frame including the field indicating a discovery request (DR=1).

Figure 4:
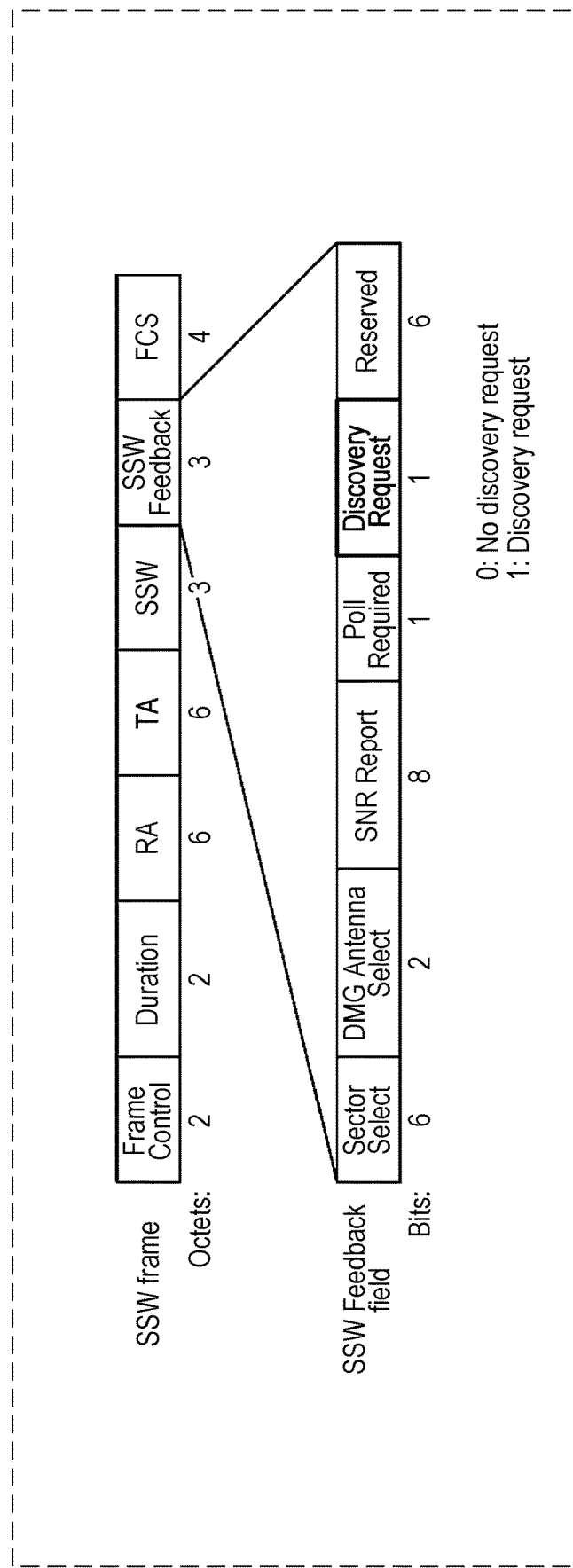
FIG. 4 is a diagram illustrating an example of a format of a sector sweep (SSW) frame including a field indicating a discovery request (DR=1)

FIG. 4 is a diagram illustrating an example of format of a SSW frame the field including a discovery request (DR=1). The SSW frame includes a Frame Control (frame control) field, a Duration (frame length) field, a RA(Receive(r) Address: reception address) field, a TA (Transmit(ter) Address: transmission address) field, an SSW (sector sweep) field, an SSW Feedback (SSW-FB) field, and an FCS (Frame Check Sequence) field.

The SSW field includes information relating to sector sweep. For example, in a case where the STA 100 transmits SSW frames changing the transmission sector each SSW frame, the information relating to sector sweep is transmission sector ID.

The SSW-FB field includes a Sector Select (sector selection) subfield, a DMG Antenna Select (DMG antenna section) subfield, an SNR Report (SNR: signal-to-noise ratio report) field, a Poll Required (poling request) subfield, a Discovery Request (discovery request, written as DR) subfield, and a Reserved (reserved) subfield.

While a SSW frame according to the 11ad standard (omitted from illustration) includes a 7-bit Reserved (reserved) subfield in the SSW-FB field when transmitted during the A-BFT period, the SSW frame in FIG. 4 includes a 6-bit reserved subfield and a 1-bit Discovery Request (discovery request) subfield in the SSW-FB field.

The sector selection subfield includes the sector ID included in the DMG beacon that has been determined to have the best quality (first transmission sector) out of the DMG beacons that the STA 100 has received during the BTI. The AP/PCP 300 may decide the sector ID of the best sector by receiving the SSW frame and obtaining the value of the sector selection subfield.

The discovery request subfield is used to make a request for a probe response including beamforming feedback information to the AP/PCP 300. That is to say, the discovery request subfield is used to notify the AP/PCP 300 that it can handle reception of a Probe Response frame including beamforming feedback information.

During the A-BFT period in FIG. 3, the AP/PCP 300 receives one or multiple SSW frames. The AP/PCP 300 determines the transmission sector ID in the SSW frame having good reception quality out of the received SSW frames to be the best sector for the transmission source STA (second transmission sector). This transmission sector ID is included in the sector selection subfield of the SSW feedback field in FIG. 4.

The AP/PCP 300 includes information of the best sector in an SSW-FB frame and transmits to the STA 100. The STA 100 receives the SSW-FB frame.

Note that there are cases where the STA 100 fails in receiving the SSW-FB frame (reception error) due to, for example, an FCS error due to effects of noise, and/or not detecting the preamble due to contention with transmission by other STAs omitted from illustration.

The STA 100 does not have to transmit an ACK frame even if an SSW-FB frame is received. Accordingly, the AP/PCP 300 does not know whether the STA 100 has received the SSW-FB frame during the A-BFT period. In a case of having received an SSW frame including DR=1 in the A-BFT, the AP/PCP 300 transmits a probe response to the STA 100 including beamforming feedback during the DTI.

Figure 5:
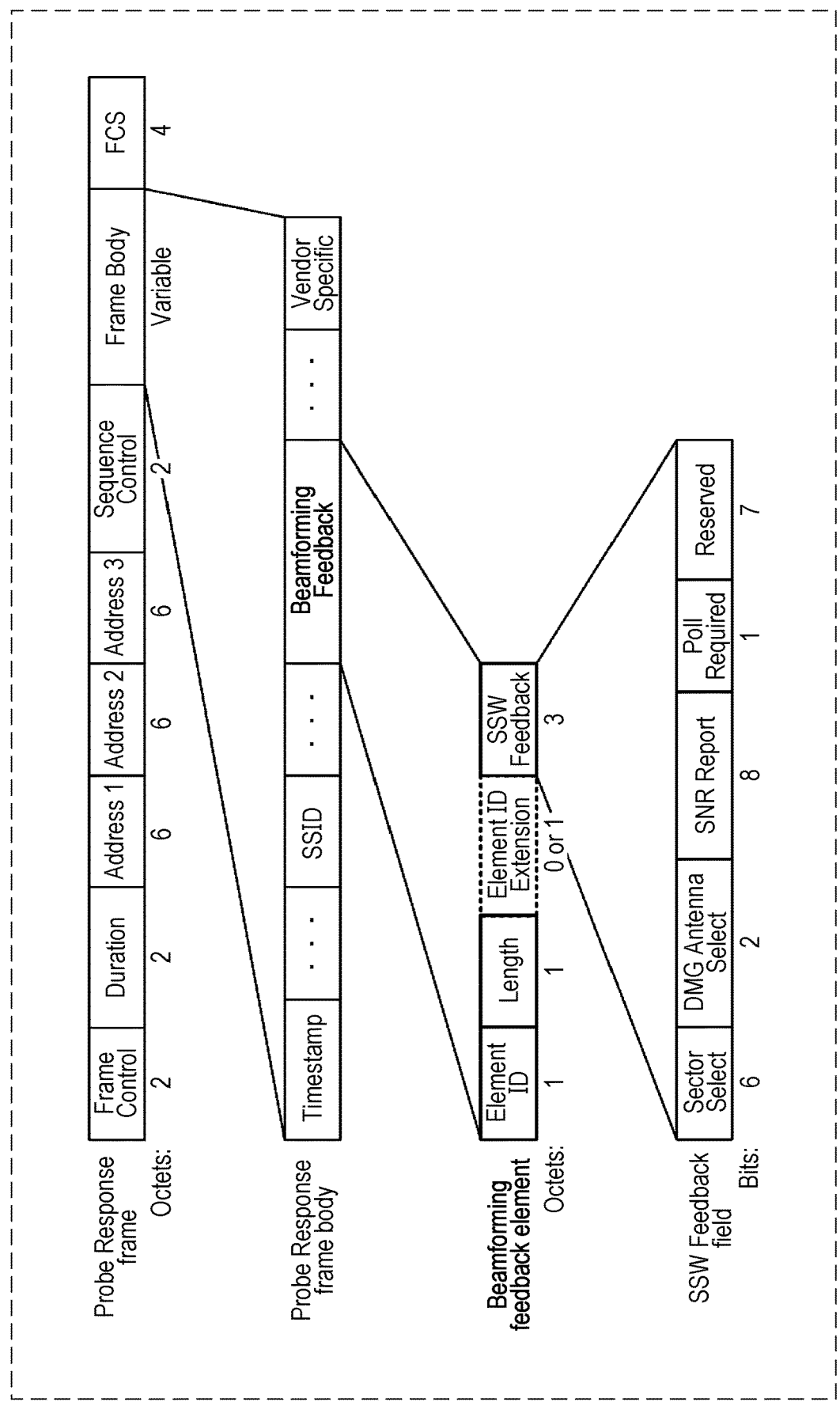
FIG. 5 is a diagram illustrating an example of a format of a probe response that an AP/PCP transmits in a DTI.

FIG. 5 is a diagram illustrating an example of the format of a probe response that the AP/PCP transmits during the DTI. The format of the probe response in FIG. 5 is the same as in 11ad except for the frame body.

The probe response includes a Frame Body (Probe Response frame body) portion. The frame body in the probe response in FIG. 5 includes a Beamforming Feedback element, unlike the frame body in the probe response of the 11ad standard.

The Beamforming Feedback element includes an Element ID (element ID) field, a Length (length) field, an Element ID Extension (element ID extension portion) field, and an SSW Feedback (SSW-FB) field.

The element ID field may be used for distinguishing the types of elements included in the Probe Response frame body (e.g., the elements Timestamp, SSID, Beamforming Feedback, and Vendor Specific). The values of the element ID field are stipulated for each element type in the 11ad standard. An element ID unused in the 11ad standard, "222" for example, may be assigned to the element ID for distinguishing the Beamforming Feedback element.

The Length field represents the length of the remaining portion of the Beamforming Feedback in octet count. For example, the element ID extension field (zero or one octets) and SSW Feedback field (3 octets) are added to yield an octet count (three or four) that is set as the value for the Length field.

The element ID extension field may be used instead of the element ID field, to distinguish the types of elements. In a case where an element ID that is unused in the 11ad standard is assigned to an element ID for distinguishing the Beamforming Feedback element, the element ID extension field may remain unused and the length be zero octets.

The SSW Feedback field is the same as the SSW-FB field in the 11ad standard. That is to say, this is the same as a case where the Discovery Request field in the SSW Feedback field in FIG. 4 is Reserved.

The AP/PCP 300 includes the best sector for the STA 100 in the SSW field of the probe response in FIG. 5, and transmits. Accordingly, even in a case where a reception error of the SSW-FB frame occurs, the STA 100 can obtain information of the best sector. Further, the Probe Response frame body includes information relating to the AP/PCP (e.g., Capability Information: including supported modulation format and transmission rate) and BSS information(e.g., usable radio bandwidth). Accordingly, even in a case where a SSW-FB frame reception error occurs during the A-BFT period, the STA 100 can complete active scanning. The STA 100 may also omit transmission of a probe request (see FIG. 3) and reduce delay.

During the DTI in FIG. 3, the STA 100 receives a probe response including beamforming feedback (Beamforming Feedback element), and determines the best sector to use in communication with the AP/PCP 300 based on information included in the beamforming feedback (e.g., the value of the Sector Select field). Also, the probe response from the AP/PCP 300 has been received, so discovery by active scan procedures as to the AP/PCP 300 is completed (successful).

The STA 100 may, in a case of having decided the discovered AP/PCP to be the connection destination after active scanning (note that additional discovery with regard to other AP/PCPs may be performed), execute the following. That is to say, the STA 100 may set a transmitting antenna to the best sector decided in discovery, and transmit an association request frame to the AP/PCP during the DTI.

Note that the AP/PCP 300 may transmit a probe response including beamforming feedback during the DTI, even in a case where a SSW-FB frame has been transmitted to the STA 100 during the A-BFT period. Even in a case where a reception error has occurred in the reception of the SSW-FB frame, the STA 100 may receive a probe response including beamforming feedback.

Accordingly, the STA 100 can avoid reattempting beamforming (transmission of SSW) during the DTI, for example. Thus, delay required for discovery can be reduced.

Also, the STA 100 may receive a probe response during the DTI without transmitting a probe request. Thus, delay required for discovery can be reduced.

Figure 6:
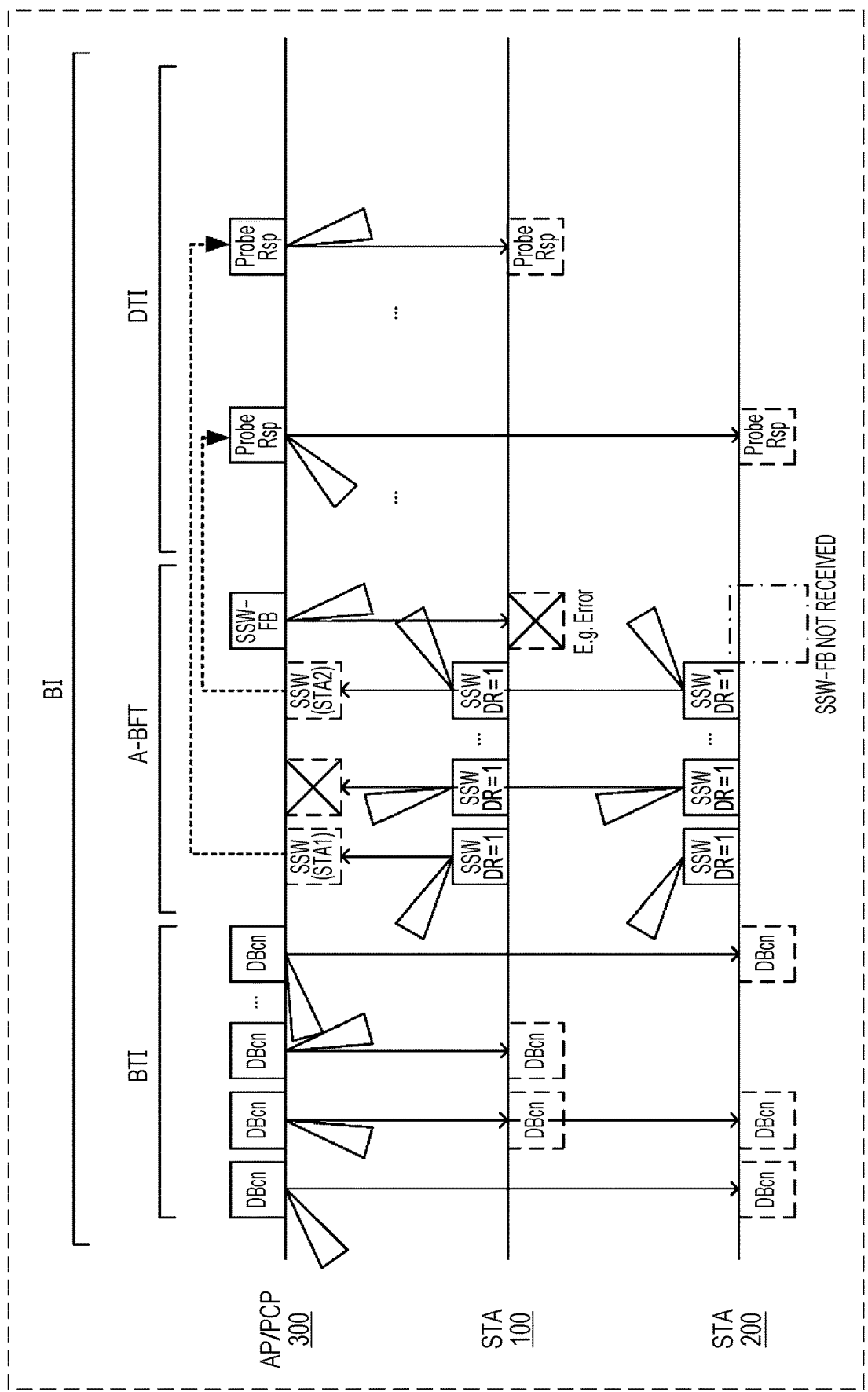
FIG. 6 is a diagram illustrating an example of procedures for a STA to perform an active scan in a same beacon interval (BI) as a BI where a STA is performing an active scan.

FIG. 6 is a diagram illustrating an example of procedures for the STA 200 to perform an active scan in the same beacon interval (BI) as the BI where the STA 100 is performing an active scan. Note that description of processing at the STA 100 and AP/PCP 300 that is the same as in FIG. 3 will be omitted. Also, description will be omitted regarding cases where the STA 200 performs the same processing as the STA 100 in FIG. 3.

Processing in BTI

The STA 200 receives DMG beacons during the BTI. Note that in a case where the location and/or antenna direction of the STA 100 and STA 200 are different, the best sector of the STA 100 and the best sector of the STA 200 will be different. Accordingly, the reception quality of each DMG beacon received by the STA 100 and the reception quality of each DMG beacon received by the STA 200 will be different.

Processing in A-BFT

The STA 200 transmits an SSW frame including DR=1 during the A-BFT period (same as STA 100 in FIG. 3). The AP/PCP 300 receives the SSW frame including DR=1 during the A-BFT period. The SSW frame that the STA 100 transmits and the SSW frame that the STA 200 transmits may have the transmission timings synchronized. The locations, antenna directions, and/or antenna directionalities of the STA 100 and STA 200 differ, so even in a case where SSW frames are transmitted at the same time (e.g., same transmission slot), there are cases where the SSW frame that the STA 100 has transmitted reaches the AP/PCP 300 (received), and the SSW frame that the STA 200 has transmitted does not reach the AP/PCP 300 (not received) (first SSW frame in FIG. 6).

Also, there are cases where the SSW frames transmitted by the STA 100 and STA 200 reach the AP/PCP 300, and interfere with each other (referred to as collision or contention), and the AP/PCP 300 receives neither of the SSW frames (second SSW frame in FIG. 6).

There are also cases where the SSW frame that the STA 200 has transmitted reaches the AP/PCP 300 (received), and the SSW frame that the STA 100 has transmitted does not reach the AP/PCP 300 (not received) (third SSW frame in FIG. 6).

The AP/PCP 300 determines the transmission sector ID (included in the SSW field in FIG. 4) in an SSW frame with good reception quality out of the one or more received SSW frames to be the best sector for the transmission sources, STAs 100 and 200, in the A-BFT.

In a case where one or more SSW frames received include multiple transmission source STAs, the AP/PCP 300 may decide a best sector for each transmission source STA.

The AP/PCP 300 transmits a SSW-FB frame in accordance with the received SSW frames received during the A-BFT period. For example, the AP/PCP 300 may set the transmission source of a received SSW frame (transmission source STA) as the transmission destination of the SSW-FB frame. Also, the AP/PCP 300 may include the sector ID of the best sector of the transmission source STA decided in the processing during the A-BFT period in the SSW-FB frame.

In a case where multiple transmission source STAs are included in multiple SSW frames received during the A-BFT period, the AP/PCP 300 may select one transmission source STA and transmit an SSW-FB frame.

The AP/PCP 300 may select one STA that is the transmission source of the SSW frame with the best reception quality (regardless of the transmission source STA), and transmit an SSW-FB frame. Even in a case where contention occurs in the A-BFT, the STA can receive the SSW-FB frame and know the best sector, and can perform probe exchange.

The AP/PCP 300 may select a transmission source STA that has transmitted without including DR=1 in the SSW frame, and transmit an SSW-FB frame. A STA that has included DR=1 can receive the probe response later, so a STA that has not included DR=1 is given priority. Accordingly, both STAs can perform probe exchange (reception of probe response) with a short delay.

During the A-BFT period in FIG. 6, the AP/PCP 300 transmits an SSW-FB frame to the STA 100, but does not transmit an SSW-FB frame to the STA 200. Processing in DTI The AP/PCP 300 includes the best sector of the STA 200 in the SSW-FB frame of the probe response in FIG. 5, and transmits the probe response during the DTI. Accordingly, the STA 200 can obtain information of the best sector even if the SSW-FB frame is not received during the A-BFT period.

Further, the Probe Response frame body includes information relating to the AP/PCP 300 (e.g., Capability Information: including supported modulation format and transmission information) and BSS information(e.g., usable radio bandwidth). Accordingly, the STA 200 can complete active scanning even in a case where a SSW-FB frame is not received in the A-BFT. The STA 200 may also omit transmission of a probe request (see FIG. 2) and reduce delay during the DTI.

The AP/PCP 300 may obtain a transmission opportunity (TXOP) for transmission of multiple frames, with regard to transmission of probe responses addressed to the STA 100 and STA 200, in the DTI. TXOPs can be secured in batch fashion, as compared to a case of each STA acquiring TXOPs for transmitting probe requests as in FIG. 2, so efficiency of transmission can be improved.

The STAs 100 and 200 receive the probe response from the AP/PCP 300, and discovery by active scan procedures as to the AP/PCP 300 is completed (successful).

Figure 7:
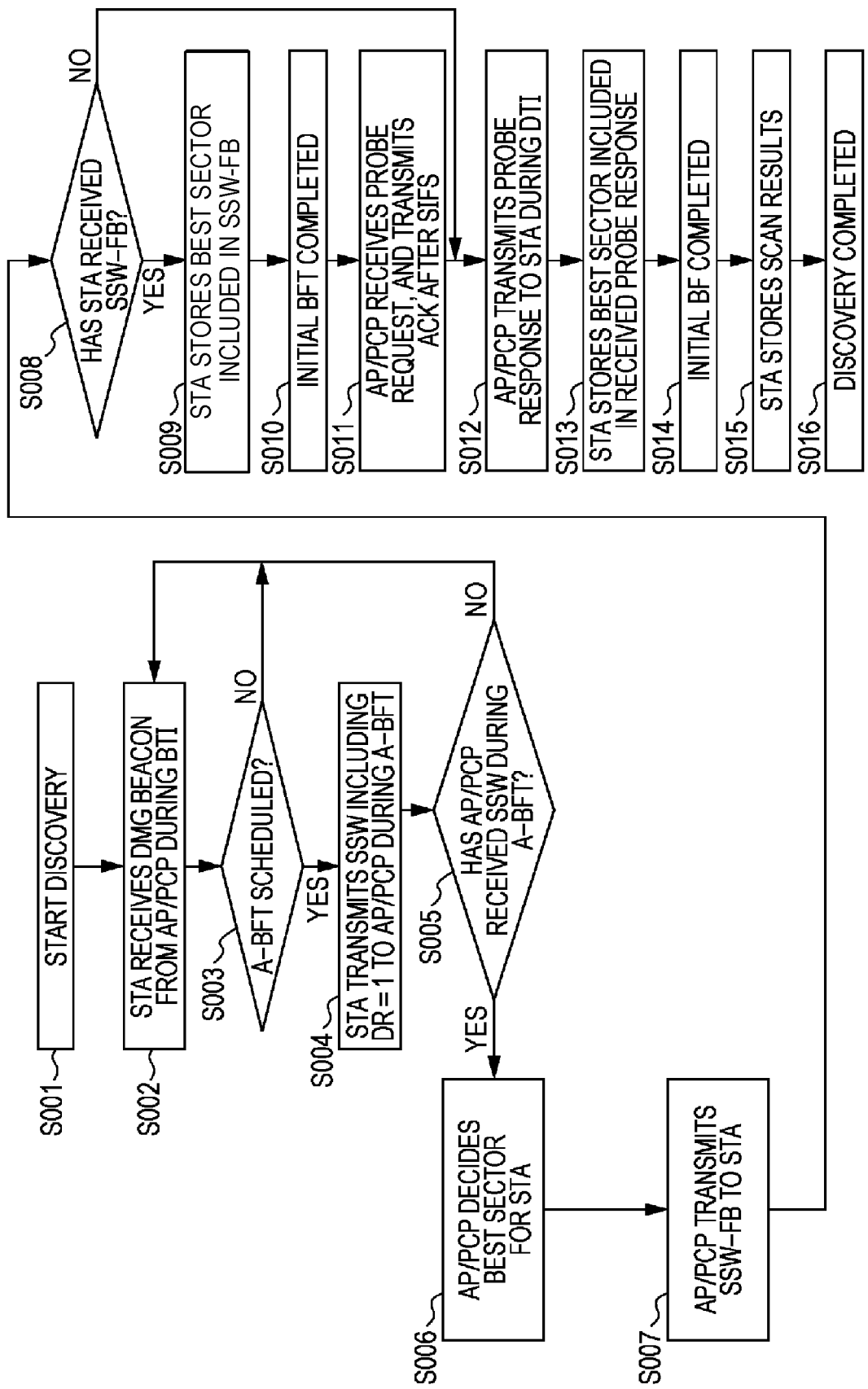
FIG. 7 is a flowchart illustrating an example of procedures of a STA performing discovery with regard to an AP/PCP.

FIG. 7 is a flowchart illustrating an example of procedures of the STA 100 performing discovery with regard to the AP/PCP 300.

First, the STA 100 starts discovery (S001).

Next, the STA 100 receives a DMG beacon during the BTI (S002). The DMG beacon may have been transmitted by the AP/PCP 300 to perform a sector sweep. That is to say, the AP/PCP 300 may switch the transmission direction of wireless signals by switching transmission sectors, and transmit one or more DMG beacons. The AP/PCP 300 may include, in the DMG beacon, information elements and fields indicating that A-BFT is scheduled after the BTI, and transmit.

Next, in a case where no A-BFT period is scheduled (S003: NO), the flow returns to S002 for the STA 100 to await the next BTI.

In a case where an A-BFT period is scheduled (S003: YES), the STA 100 transmits an SSW frame including DR=1 during the A-BFT period, with the AP/PCP 300 as the transmission destination (S004). Note that the STA 100 may transmit an SSW frame to perform sector sweeping. That is to say, the STA 100 may switch transmission directions of radio signals by switching transmission sectors, and transmit one or more SSW frames. This is equivalent to the STA 100 performing sector sweeping in response to sector sweeping by the AP/PCP 300 using DMG beacons, and is referred to as responder BFT. Note that the STA 100 may decide the best sector for the AP/PCP 300 based on the reception quality of DMG beacons received during the BTI, and transmit information of the best sector (e.g., sector ID) included in an SSW frame during the A-BFT period.

In a case where the AP/PCP 300 has not received the SSW frame in S004 during the A-BFT period (S005: NO), the flow returns to S002 without transmitting the SSW-FB frame (and probe response of S012) to the STA 100. Note that cases where this SSW frame has not been received may include a case where there is a reception error, and/or a case where the reception power is lower than a predetermined threshold value.

In a case of having received the SSW frame in S004 during the A-BFT period (S005: YES), the AP/PCP 300 determines the best sector for the STA 100, and stores information of the best sector in memory, in preparation for communication with the STA 100 (S006).

Next, the AP/PCP 300 transmits the SSW-FB frame to the STA 100 (S007). The AP/PCP 300 may transmit the SSW-FB frame to another STA 200. Alternatively, the AP/PCP 300 may transmit a probe response during the DTI (see S012) without transmitting the SSW-FB frame to either STA. Alternatively, the AP/PCP 300 may transmit the SSW-FB frame using the best sector notified by the SSW frame during the A-BFT period. Alternatively, the AP/PCP 300 may include information of the best sector of the STA 100 in the SSW-FB frame and transmit.

On the other hand, in a case where the STA 100 has not received the SSW-FB frame of S007 corresponding to the SSW frame transmitted in S004 (S008: NO), the flow advances to S012. The STA 100 then stands by for reception of a probe response.

In a case of having received the SSW-FB frame of S007 corresponding to the SSW frame transmitted in S004 (S008: YES), the STA 100 stores information of the best sector included in the SSW-FB frame in memory, in preparation for communication with the AP/PCP 300 (S009).

The STA 100 then judges that initial BFT between the AP/PCP 300 and the STA 100 itself has been completed (successful) (S010). That is to say, the STA 100 is capable of communication with the AP/PCP 300 using the best sector. Note that discovery is ongoing.

Next, the STA 100 may transmit a probe request to the AP/PCP 300 during the DTI (omitted from illustration in FIG. 7). Note that the STA 100 may transmit a SSW frame including DR=1 in S004 and complete initial BFT, and thereafter transition to S012 without transmitting a probe request, and stand by for reception of a probe response.

On the other hand, in a case of having received a probe request and there is no reception error, the AP/PCP 300 transmits an ACK frame to the STA 100 after a Short InterFrame Space (SIFS) (e.g., 3 μsec) (S011).

Next, the AP/PCP 300 transmits a probe response during the DTI (S012). The AP/PCP 300 may include information of the best sector of the STA 100 in the probe response and transmit.

The STA 100 receives the probe response of the S012 during the DTI. In a case where information of the best sector of the STA 100 is included in the probe response that has been received, the STA 100 stores information of the best sector in memory, in preparation for communication with the AP/PCP 300 (S013).

Next, in a case where information of the best sector of the STA 100 is included in the probe response, the STA 100 judges the initial BF to have been completed (successful) (S014). That is to say, the STA 100 is capable of communication with the AP/PCP 300 using the best sector.

Next, the STA 100 stores in memory the AP/PCP 300 included in the probe response, and information of the BSS that the AP/PCP 300 manages (scan results) (S015). Note that a media access control (MAC) processor of the STA 100 may notify a host controller of the scan results.

The STA 100 then competes discovery with regard to the AP/PCP 300 (S016). The STA 100 may return the flow to S001 and repeat discovery regarding other AP/PCPs on the same wireless channel, or after having switched wireless channels, in order to perform discovery regarding other AP/PCPs (omitted from illustration).

Figure 8:
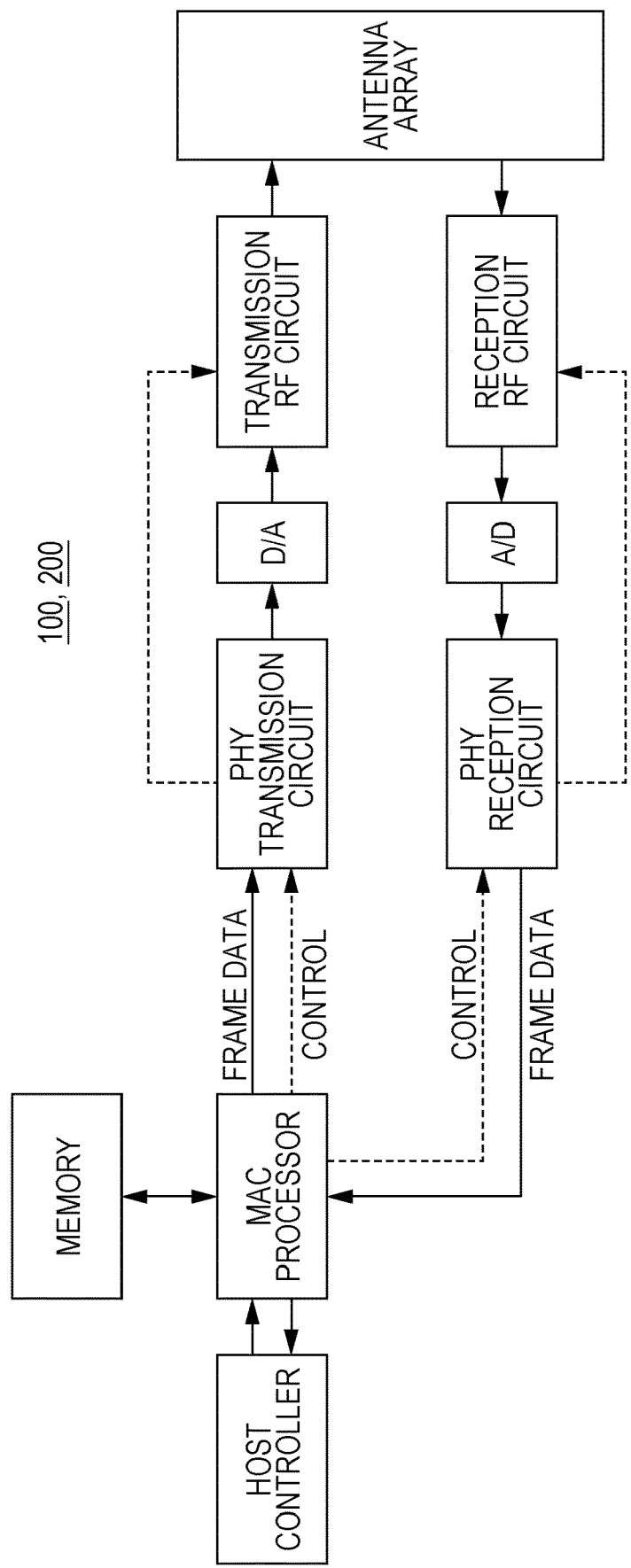
FIG. 8 is a block diagram illustrating an example of the configuration of a communication apparatus.

FIG. 8 is a block diagram illustrating an example of the configuration of the STA (communication apparatus) 100. An antenna array performs transmission and reception of wireless signals.

A reception radio frequency (RF) circuit converts wireless signals that the antenna array has received into reception analog baseband signals. The reception RF circuit also controls the directionality of the receiving antenna by changing the reception gain and phase of signals input from the antenna array in accordance with the reception sector ID (may be the same sector as the transmission best sector) specified by a physical layer (PHY) reception circuit. The reception RF circuit also measures reception quality for each transmission sector sweep frame received.

An analog digital converter (A/D) circuit converts the reception analog baseband signals into reception digital baseband signals.

The PHY reception circuit performs processing on the reception digital baseband signals, such as synchronization, equalization, demodulation, and/or decoding, thereby generating reception frame data.

A MAC processor recognizes and processes MAC frames out of reception frame data. Recognizing MAC frames is distinguishing the types of MAC frames (e.g., MAC data frame, DMG beacon, probe response). Processing of MAC frames includes, for example, confirming frame check sequence (FCS, a type of error detection code), and detecting errors, obtaining data of the fields in accordance with the format of the MAC frame that has been recognized.

The MAC processor extracts user data from MAC data frames and outputs to a host controller. The MAC processor also generates MAC data frames from user data input from the host controller.

In a case of having received a DMG beacon, the MAC processor generates an SSW frame including DR=1 (see S004 in FIG. 7). In a case of having received an SSW frame including DR=1, the MAC processor may generate a probe response (see the processing of the AP/PCP 300 in S012 in FIG. 7). The MAC processor may also make a discovery request to the host controller.

A frame generated by the MAC processor is referred to as transmission frame data (e.g., the above-described MAC data frame, SSW frame, and probe response are included).

A PHY transmission circuit performs encoding, modulation, PHY frame formation, and filtering on transmission frame data, thereby generating transmission digital baseband signals.

A D/A (digital analog converter) circuit converts transmission digital baseband signals into transmission analog baseband signals.

A transmission RF circuit converts the transmission analog baseband signals into transmission wireless signals. The transmission RF circuit also controls the directionality of the transmitting antenna by changing the reception gain and phase of signals to be output to the antenna array in accordance with the transmission sector ID (transmission best sector) specified by the PHY transmission circuit.

The host controller controls the MAC processor to generate transmission user data and/or perform processing of reception user data. The host controller may also generate a probe response in response to a discovery request form the MAC processor, and input to the MAC processor.

Figure 9:
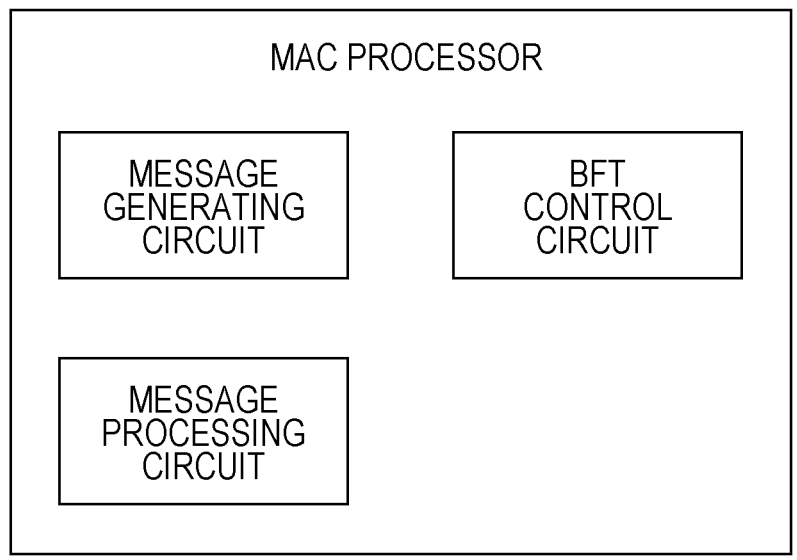
FIG. 9 is a detailed block diagram illustrating an example of the configuration of a MAC processor.

FIG. 9 is a detailed block diagram illustrating an example of the configuration of the MAC processor. A message generating circuit generates transmission MAC frames, such as DMG beacons and SSW frames, for example.

A message processing circuit identifies and processes reception MAC frames.

A BFT control circuit controls the message generating circuit, message processing circuit, PHY transmission circuit, and PHY reception circuit during BFT processing, and controls transmission and reception of DMG beacons and SSW frames. During BFT processing is, for example, sector sweeps during the BTI in S002 in FIG. 7, and sector sweeps during the A-BFT period in S004. The BFT control circuit also outputs control signals to the PHY transmission circuit to select the transmission best sector for the AP/PCP or STA, based on reception quality that the reception RF circuit has measured.

As described above, the STA 100 includes the field indicating a discovery request (DR=1) in a SSW frame and transmits during the A-BFT period, and requests the AP/PCP 300 to transmit a probe response including beamforming feedback information. Accordingly, in a case where the AP/PCP 300 does not transmit an SSW-FB frame, or in a case where the STA 100 does not receive or has difficulty in receiving the SSW-FB frame, the STA 100 can receive the probe response from the AP/PCP 300 and can complete discovery.

Even in a case where the AP/PCP 300 does not transmit an SSW-FB frame, or in a case where the STA 100 does not receive or has difficulty in receiving the SSW-FB frame, the STA 100 can avoid standing by for transmission of an SSW frame until the next BTI or A-BFT period for example, or can omit beamforming in the DTI. Accordingly, the delay required for discovery can be shortened.

Even in a case where the AP/PCP 300 does not transmit an SSW-FB frame, and/or in a case where the STA 100 does not receive or has difficulty in receiving the SSW-FB frame, the STA 100 can complete BFT. Accordingly, communication quality with the AP/PCP 300 can be improved, using a best sector. Reattempting beamforming can be reduced, and interference on the AP/PCP 300 and/or other STAs can be reduced.

Modifications of First Embodiment

Modification 1-1

The AP/PCP 300 may receive an SSW frame including the field indicating a discovery request (DR=1), and include a field indicating that response is supported in a DMG beacon and transmit during the DTI.

Figure 10:
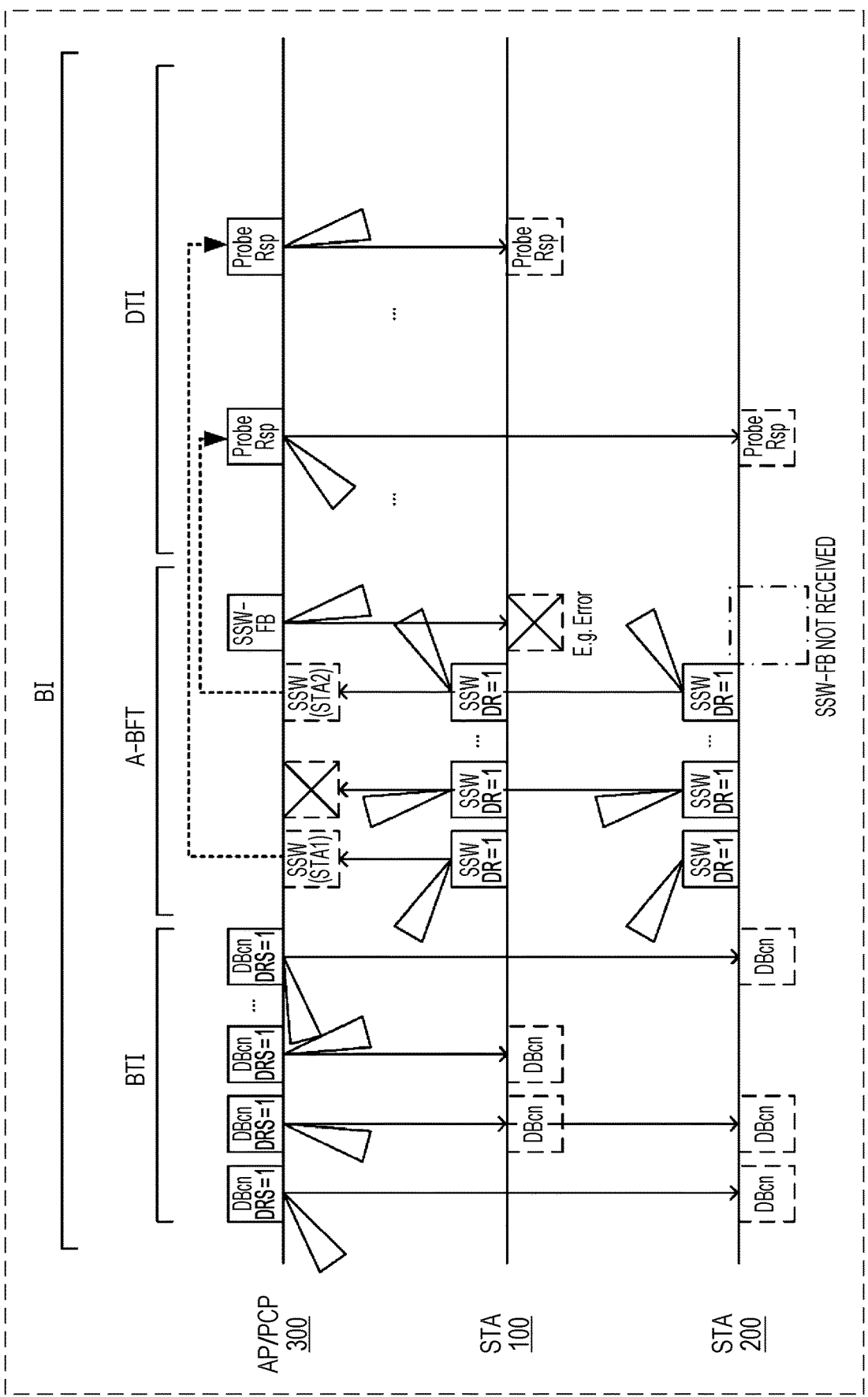
FIG. 10 is a diagram illustrating an example of procedures of a STA performing an active scan with regard to an AP/PCP.

FIG. 10 is a diagram illustrating an example of procedures of the STA 100 and STA 200 performing active scanning with regard to the AP/PCP 300. The AP/PCP 300 receives SSW frames including the field indicating a discovery request (DR=1), and includes a field indicating that response is supported in a DMG beacon and transmits during the DTI.

Figure 11:
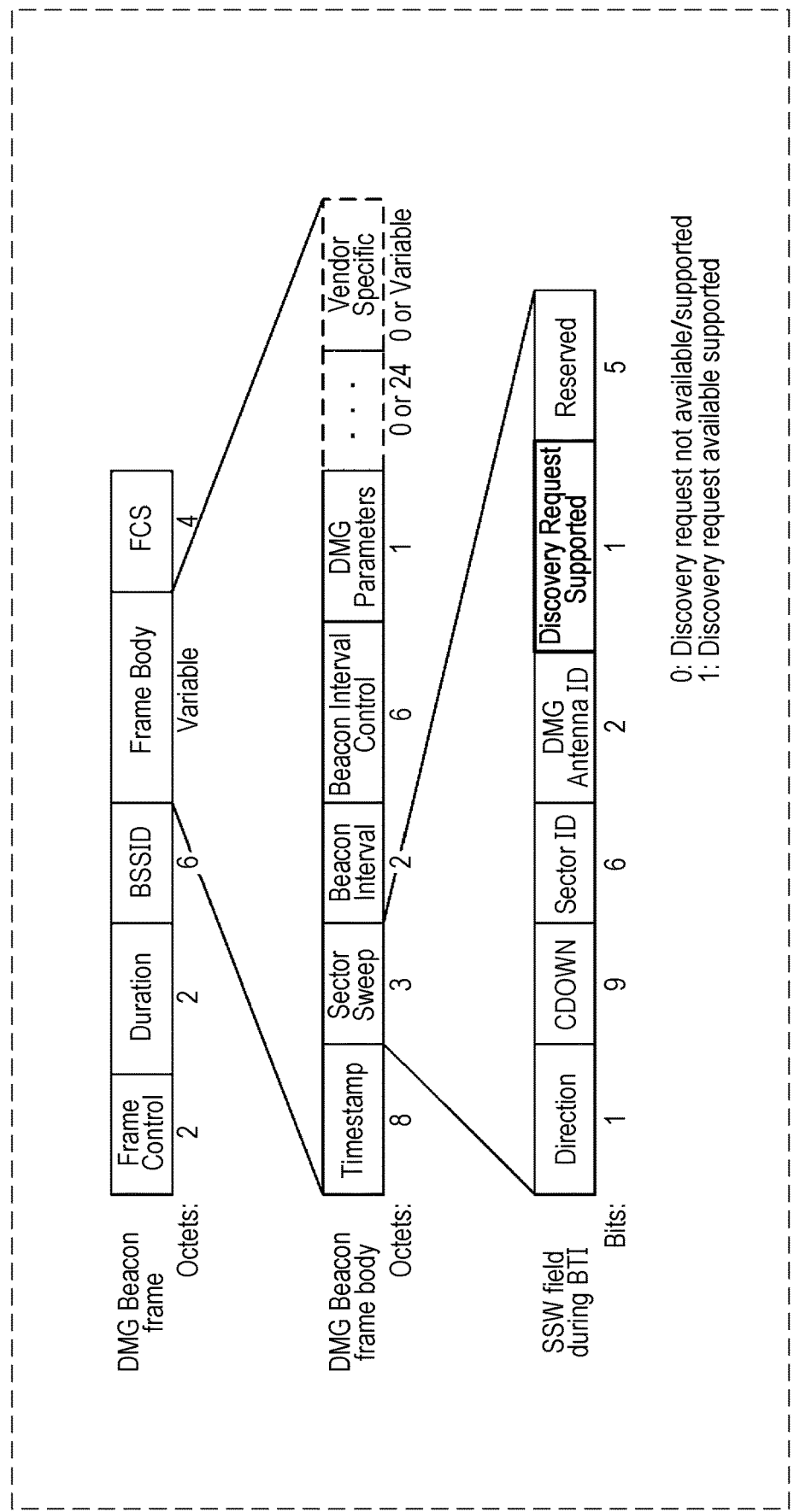
FIG. 11 is a diagram illustrating an example of a format of a directional multi-gigabit (DMG) beacon.

FIG. 11 is a diagram illustrating an example of the format of a DMG beacon. Note that the DMG beacon and DMG Beacon frame body are the same as in the 11ad standard, so detailed description will be omitted.

A DMG beacon according to the 11ad standard (omitted from illustration) has a 6-bit Reserved (reserved) subfield in the SSW frame, while the DMG beacon in FIG. 11 has a 5-bit reserved subfield and a 1-bit discovery request supported (DRS, discovery request support permissible/non-permissible) subfield in the SSW frame.

In a case of having received a DMG beacon where the DRS field in FIG. 11 is set to 1 (DRS=1), the STA 100 may transmit an SSW frame including DR=1 during the A-BFT period. The STA 100 can judge that the AP/PCP 300 has functions of transmitting the probe response in FIG. 4, since DRS=1 is set.

In a case of having received a DMG beacon where the DRS field in FIG. 11 is not set to 1 (DRS=0), the STA 100 may transmit an SSW frame where DR=0 is set during the A-BFT period.

In a case where the DMG beacon does not include the DRS subfield, it is difficult for STAs to distinguish whether the AP/PCP can handle DR=1 or not. Accordingly, in a case where a STA has transmitted an SSW frame including DR=1 during the A-BFT period, there are cases where the AP/PCP 300 does not transmit a probe response including beamforming feedback information during the DTI.

Accordingly, it is difficult for the STA to judge whether to standby for reception of a probe response during the DTI, or to perform sector sweeping during the DTI. In this case, the STA may stand by for the probe response for a predetermined period in the DTI and perform sector sweeping after the predetermined period has elapsed, for example. However, in this case, the standby for the predetermined period increases delay.

In a case where the DMG beacon includes the DRS subfield, and DRS=1, the STA may transmit an SSW frame including DR=1 during the A-BFT period and standby to receive a probe response including beamforming feedback information during the DTI. Also, in a case where DRS=0, the STA may perform sector sweeping during the DTI. Accordingly, the STA can omit the standby for the predetermined period, and delay due to discovery can be shortened.

Modification 1-2

Figure 12:
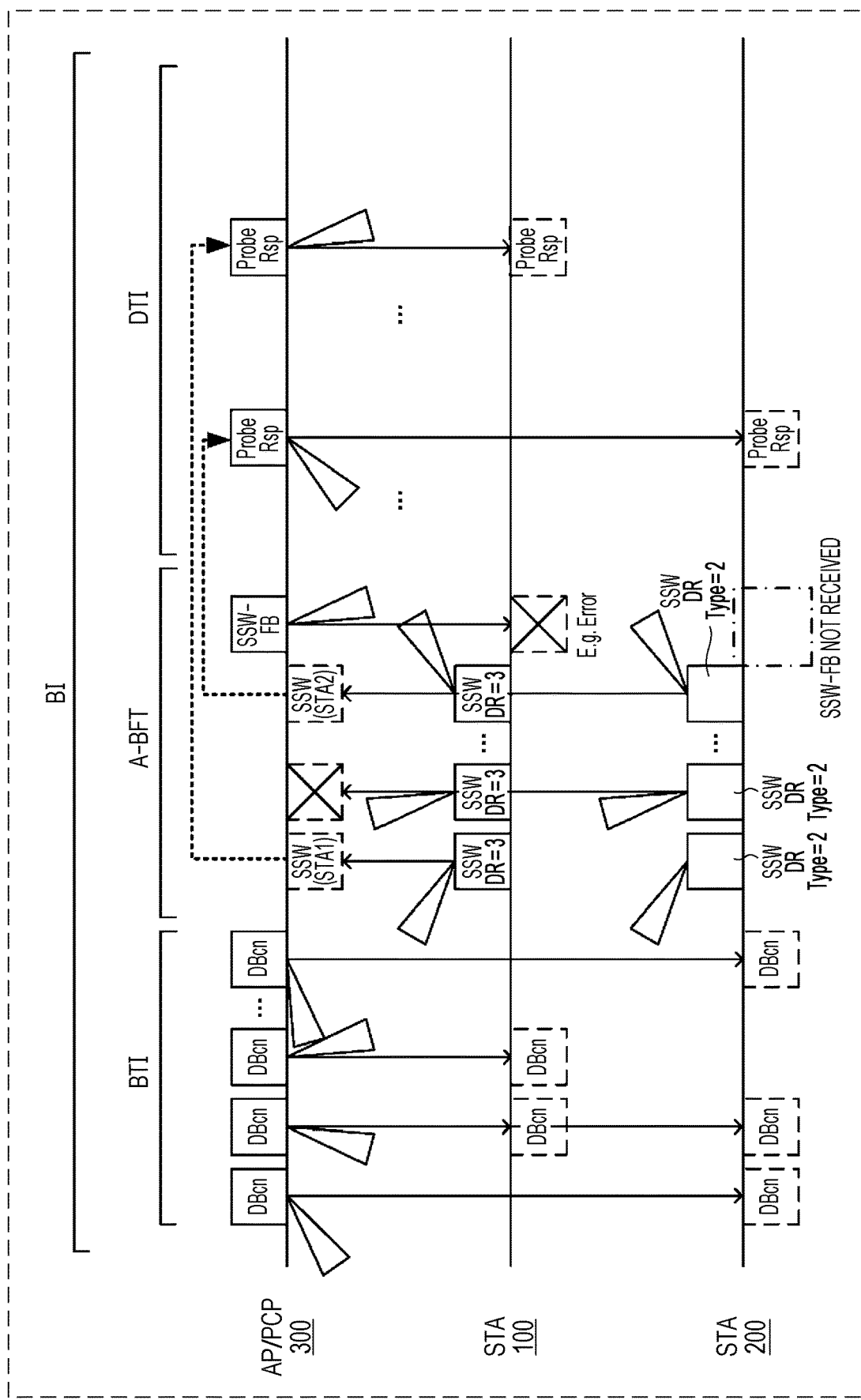
FIG. 12 is a diagram illustrating an example of procedures of a STA performing an active scan with regard to an AP/PCP.

The STA 100 may include a field or subfield indicating the type of discovery request in an SSW frame and transmit during the A-BFT period. FIG. 12 is a diagram illustrating an example of procedures of the STA 100 and STA 200 performing active scanning with regard to the AP/PCP 300. The STA 100 and STA 200 transmit SSW frames where DR Type has been added, during the A-BFT period.

Figure 13:
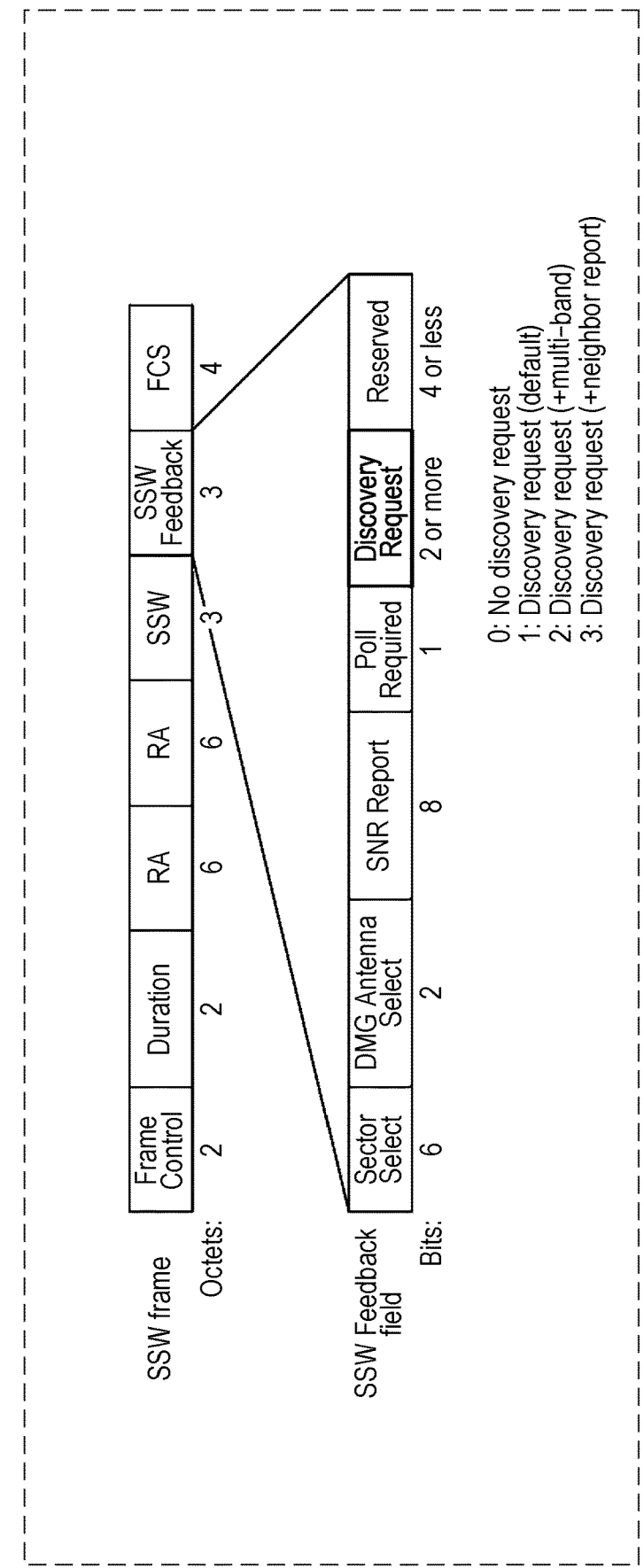
FIG. 13 is a diagram illustrating an example of a format of an SSW frame.

FIG. 13 is a diagram illustrating an example of the format of an SSW frame. Whereas the Discovery Request field of the SSW frame in FIG. 4 is one bit, the Discovery Request field of the SSW frame in FIG. 13 includes two or more bits.

In a case where the STA 200 has set the value of the Discovery Request field to 2 (Discovery request (+Multi-band)) and transmitted an SSW frame, the AP/PCP 300 that has received the SSW frame includes a Multi-band element in the probe response and transmits during the DTI.

In a case of having received a probe response including the Multi-band element, the STA 200 can obtain information of the AP/PCP 300 (e.g., wireless channel No. that a 2.4 GHz band BSS is using) regarding frequency bands (e.g., 2.4 GHz band, 5 GHz band) different from the frequency band where active scanning is being performed (e.g., 60 GHz band).

After having established a connection with the AP/PCP 300 in the 60 GHz band, for example, the STA 200 may transmit a probe request or an association request frame to the AP/PCP 300 in a frequency band different from the 60 GHz band (e.g., 2.4 GHz band) based on the information acquired from the Multi-band element, and establish a 2.4 GHz band connection.

A 2.4 GHz connection may be used as a substitute connection in a case where the 60 GHz connection is cut off. The STA 200 can decide the channel for transmission of the Probe Request frame or association request frame in the 2.4 GHz band, based on information of the Multi-band element. Accordingly, the STA 200 can shorten the time for discovery in the 2.4 GHz band by scanning relevant channels in the 2.4 GHz band.

In a case where the STA 100 has set the value of the Discovery Request field to 3 (Discovery request (+Neighbor Report)) and transmitted an SSW frame, the AP/PCP 300 that has received the SSW frame includes a Neighbor Report element in the probe response and transmits during the DTI.

In a case of having received a probe response including the Neighbor Report element, the STA 100 can obtain information of other AP/PCPs 300 in the vicinity of the AP/PCP 300.

The STA 100 can select a channel where there is a high probability that another AP/PCP can be discovered by active scanning, based on the Neighbor Report element, for example, and perform active scanning. Accordingly, delay in discovery with regard to another AP/PCP 300 can be shortened.

Thus, the STAs 100 and 200 can request the AP/PCP 300 for the type of additional element to be included in a probe response, by appropriately setting the value of the Discovery Request field of the SSW frame.

The value of the Discovery Request field and the presence/absence of requested element and type may be correlated, as illustrated in FIG. 13. Also, the Discovery Request field may be defined as a bitmap, with bits and presence/absence of request being correlated for each element. For example, notification may be made where bit No. 1 is presence/absence of request for Discovery Request, bit No. 2 is presence/absence of request for Multi-band element, bit No. 3 is presence/absence of Neighbor report, where 1 represents present and 0 represents absent.

Modification 1-3

Figure 14:
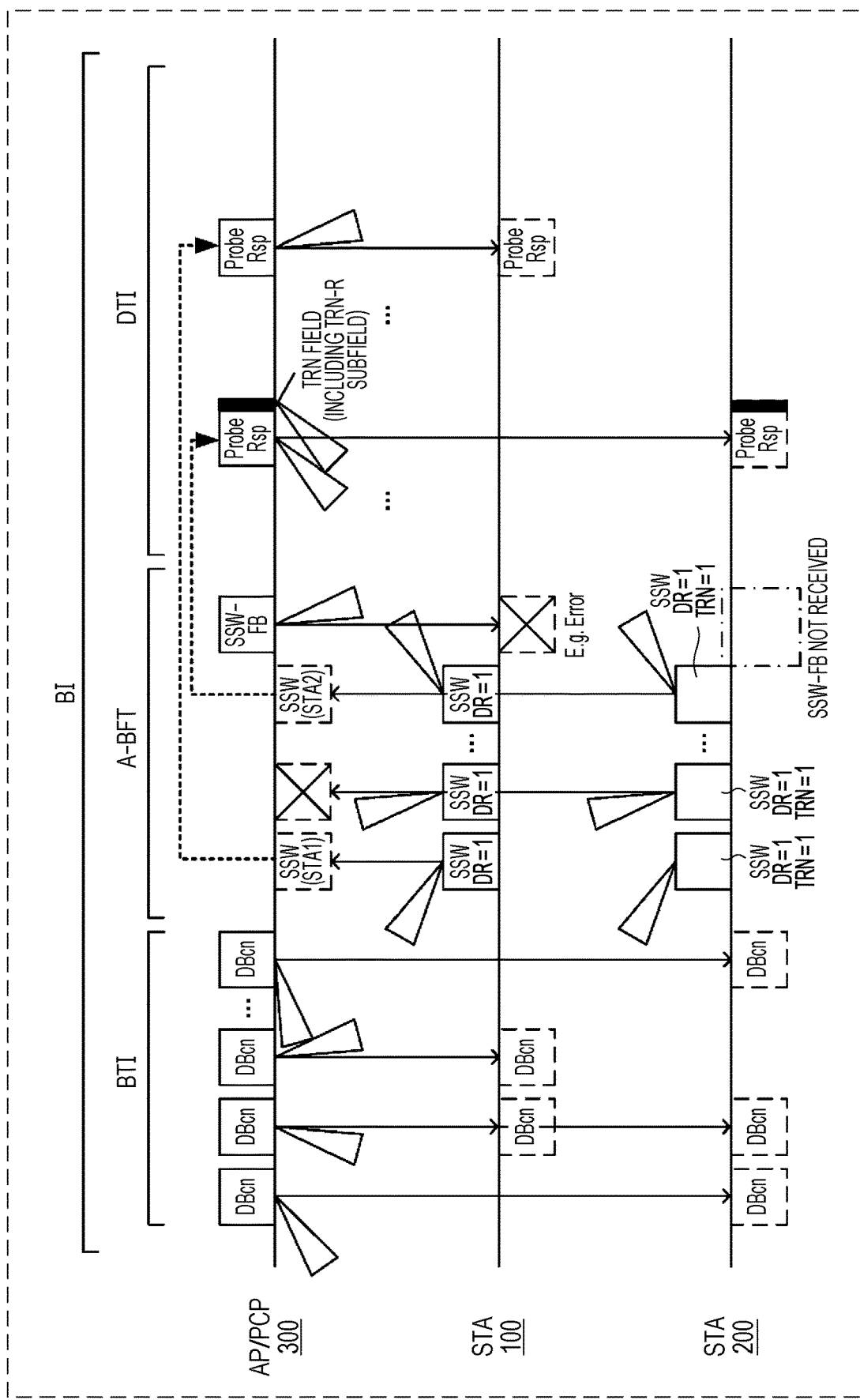
FIG. 14 is a diagram illustrating an example of procedures of a STA performing an active scan with regard to an AP/PCP.

The STA 100 and STA 200 may include a field or subfield indicating a TRN-R (Receive training) subfield count in the SSW frame and transmit during the A-BFT period. FIG. 14 is a diagram illustrating an example of procedures of the STA 100 and STA 200 performing active scanning with regard to the AP/PCP 300. TRN=1 has been added to an SSW frame that the STA 200 transmits during the A-BFT period, and a TRN-R subfield has been added to the probe response addressed to the STA 200.

Figure 15:
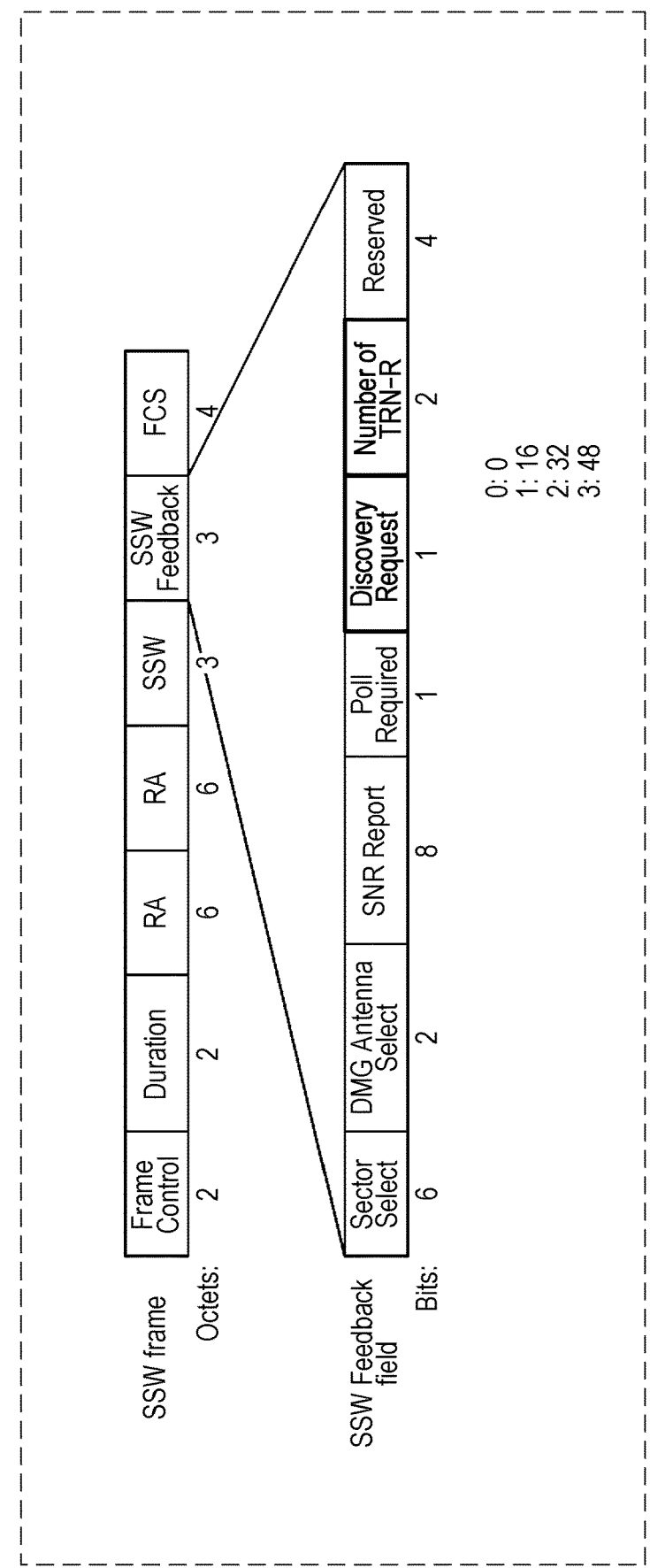
FIG. 15 is a diagram illustrating an example of a format of an SSW frame.

FIG. 15 is a diagram illustrating an example of the format of an SSW frame. The SSW frame in FIG. 15 includes a Number of TRN-Rs subfield and has fewer bits in the Reserved subfield, in comparison with the SSW frame in FIG. 4.

The STA 200 includes a value corresponding to a receiving antenna sector count of the STA 200 in the Number of TRN-Rs subfield in the SSW frame in FIG. 15, and transmits. For example, a value where the value of the Number of TRN-Rs subfield is multiplied by 16 may indicate the reception sector count of the STA 200.

In a case where the STA 200 has set the value of the Number of TRN-Rs subfield to 1 or greater and transmitted the SSW frame, the AP/PCP 300 that has received the SSW frame adds a TRN field including TRN-R subfields of a count corresponding to the value of the Number of TRN-Rs subfield to a probe response and transmits during the DTI.

In a case of having received a probe response where the TRN field has been added, the STA 200 may receive the TRN-R subfields using reception sectors switched for each TRN field, measure reception quality, and perform BFT of the receiving antenna. The STA 200 may select the best receiving antenna and reception sector by reception beamforming.

In a case of having antenna pattern reciprocity, where the directionality characteristics of the transmitting antenna and the directionality characteristics of the receiving antenna are known, or the like, the STA 200 may select the best transmitting antenna and transmission sector based on the beamforming results of the receiving antenna.

Note that antenna reciprocity means an antenna configuration where, in a case of the STA 200 having multiple transmitting antennas and multiple receiving antennas, the probability that the antenna No. where the best transmission sector belongs and the antenna No. where the best reception sector belongs are the same is high.

For example, in a case where a first transmitting antenna and a first receiving antenna have the same cover region (e.g., the communication area is in the frontal direction), and a second transmitting antenna and a second receiving antenna have the same cover region (e.g., the communication area is in the rear direction), and also there is little overlapping in the cover ranges of the first transmitting antenna and first receiving antenna and the second transmitting antenna and second receiving antenna, the STA 200 has antenna reciprocity. Note that the first transmitting antenna and first receiving antenna may be a first antenna shared between transmission and reception. Also, the second transmitting antenna and second receiving antenna may be a second antenna shared between transmission and reception.

Note that antenna pattern reciprocity means an antenna configuration where the probability that the sector No. of the best transmission sector and the sector No. of the best reception sector are the same is high. For example, the first transmitting antenna and first receiving antenna have the same directionality pattern. Also, for example, the first antenna shared between transmission and reception (the antenna array in FIG. 8) has the same directionality pattern when transmitting and when receiving.

The STA 200 performs BFT of the receiving antenna using the TRN-R subfield, and selects the best reception sector. Accordingly, the STA 200 can increase communication performance with the AP/PCP 300, and can perform processing after the probe response (e.g., reception of association response frame omitted from illustration) at high speed and/or low error rate.

The STA 200 also selects the best transmission sector using the result of having performed BFT of the receiving antenna using the TRN-R subfield. Accordingly, the STA 200 can improve communication performance with the AP/PCP 300 even in a case of not receiving a SSW-FB frame, and can perform processing after the probe response (e.g., transmission of association request frame omitted from illustration) at high speed and/or low error rate.

Modification 1-4

Figure 16:
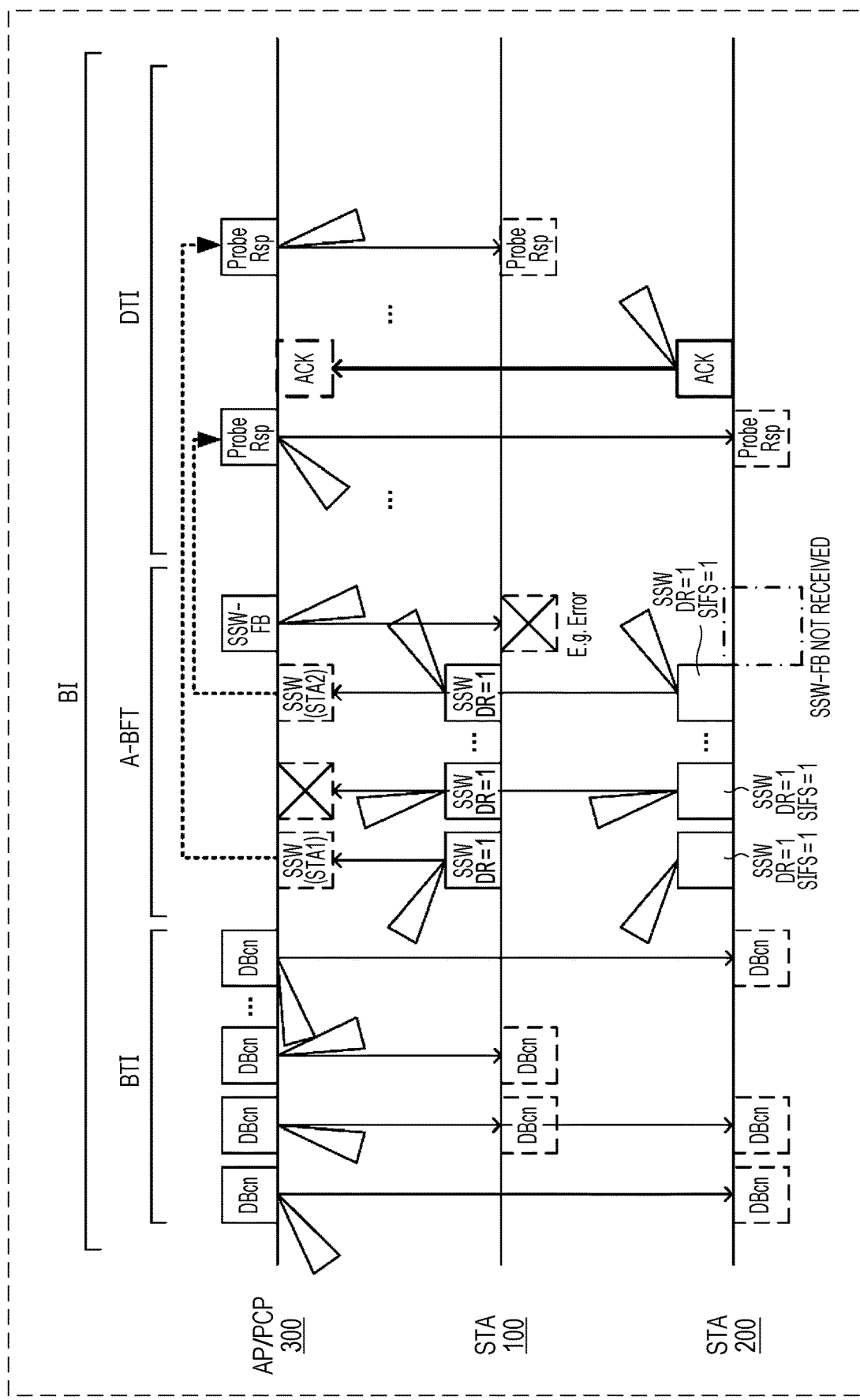
FIG. 16 is a diagram illustrating an example of procedures of a STA performing an active scan with regard to an AP/PCP.

The STA 100 and STA 200 may transmit an SSW frame including a SIFS turnover field or subfield during the A-BFT period. FIG. 16 is a diagram illustrating an example of procedures of the STA 100 and STA 200 performing active scanning with regard to the AP/PCP 300. SIFS=1 has been added to an SSW frame that the STA 200 transmits during the A-BFT period in FIG. 16.

Figure 17:
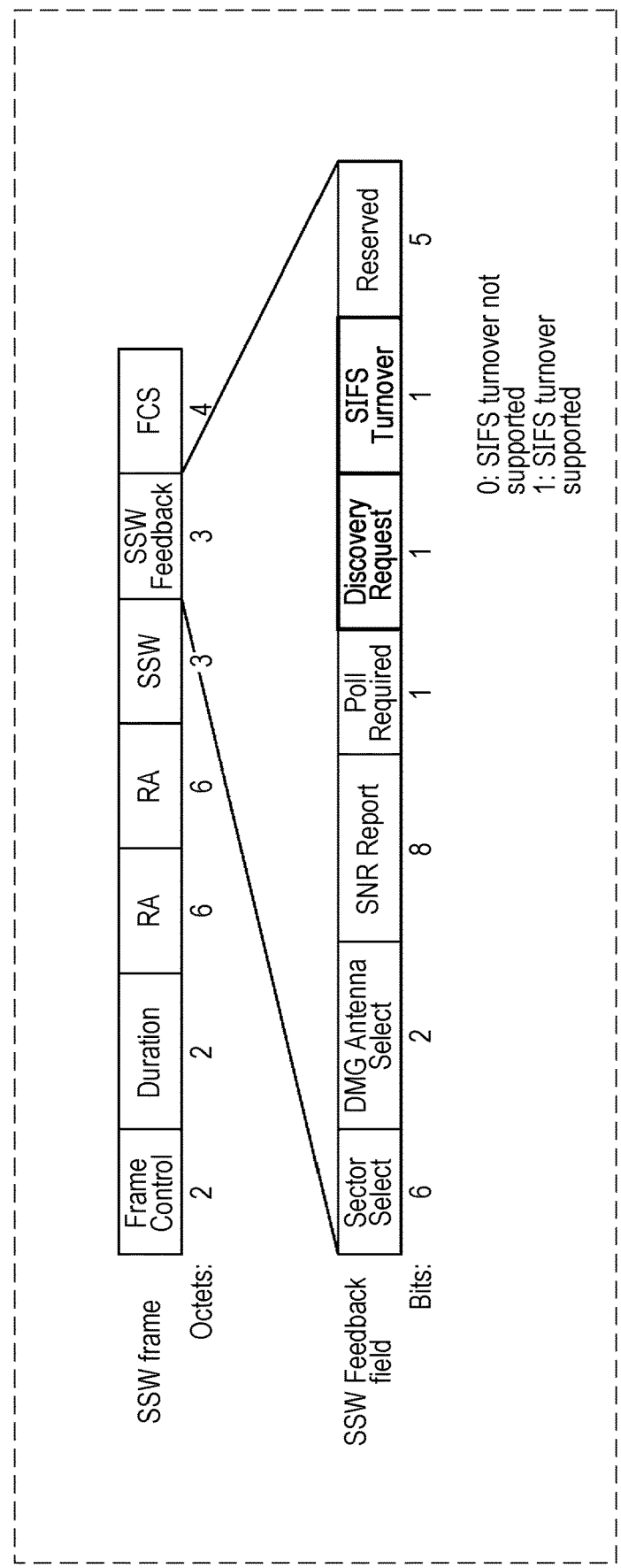
FIG. 17 is a diagram illustrating an example of a format of an SSW frame.

FIG. 17 is a diagram illustrating an example of the format of an SSW frame. The SSW frame in FIG. 17 includes a SIFS turnover subfield and has fewer bits in the Reserved subfield, in comparison with the SSW frame in FIG. 4.

Figure 18:
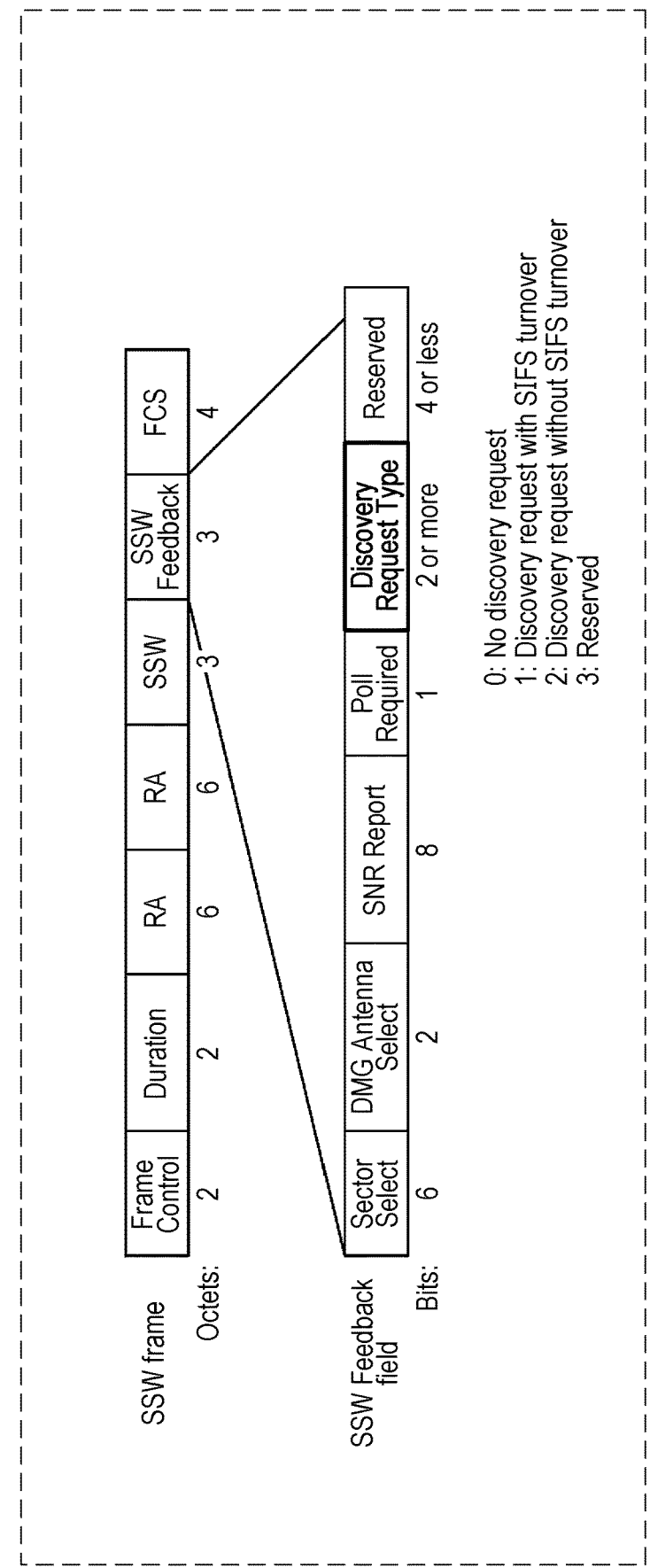
FIG. 18 is a diagram illustrating a different example of a format of an SSW frame.

FIG. 18 is a diagram illustrating a different example of the format of the SSW frame. The SSW frame in FIG. 18 includes a Discovery Request Type field, in comparison with the SSW frame in FIG. 17. The STA 100 and STA 200 may set the value of the Discovery Request Type field in FIG. 18 to 0 instead of setting the value of the Discovery Request field in FIG. 17 to 0, and transmit the SSW frame. The STA 100 and STA 200 may set the value of the Discovery Request Type field in FIG. 18 to 1 instead of setting the value of the Discovery Request field in FIG. 17 to 1 and the SIFS Turnover field to 0, and transmit the SSW frame.

The STA 100 and STA 200 may set the value of the Discovery Request Type field in FIG. 18 to 2 instead of setting the value of the Discovery Request field in FIG. 17 to 1 and the SIFS Turnover field to 1, and transmit the SSW frame. The value "3" of the Discovery Request Type field is Reserved. The Reserved settings (Discovery Request Type field value of 3) of the SSW frame in FIG. 18 may be used for future function extension.

In a case of having received an SSW frame where the value of the SIFS Turnover field has been set to 1, the AP/PCP 300 sets the recipient address of the probe response to a unicast address for the STA 200 for example, and transmits the probe response during the DTI.

In a case of having received a probe response including a unicast address in the recipient address, the STA 200 transmits an Ack frame after SIFS time (3 μsec). The STA 200 analyzes beamforming feedback information included in the probe response and determines the best sector before transmitting the Ack frame, and transmits the Ack frame with the transmission sector set to the best sector.

Figure 19:
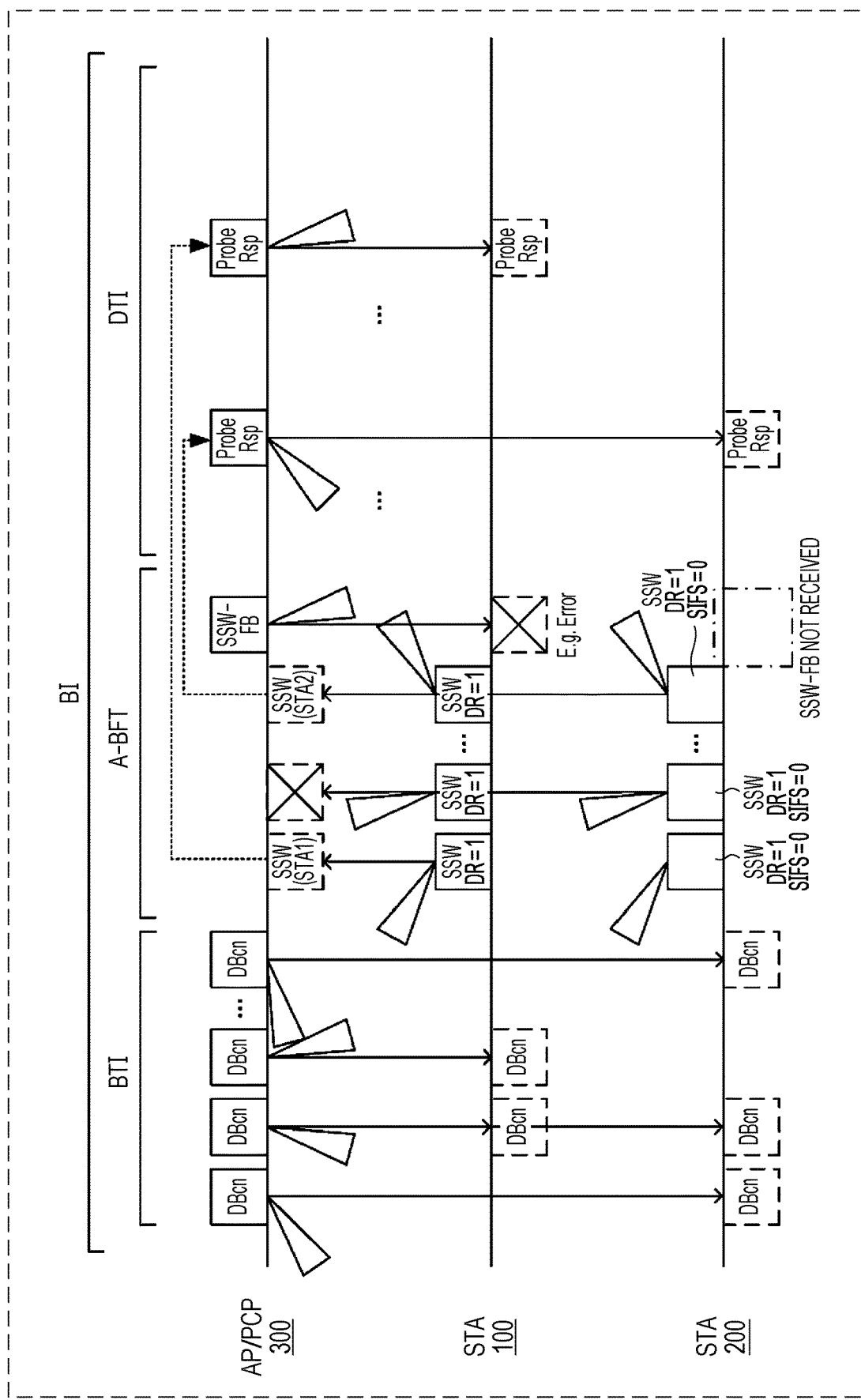
FIG. 19 is a diagram illustrating an example of procedures of a STA performing an active scan with regard to an AP/PCP.

FIG. 19 is a diagram illustrating an example of procedures of the STA 100 and STA 200 performing active scanning with regard to the AP/PCP 300. In a case of having received an SSW frame with the value of the SIFS Turnover subfield set to 0, the AP/PCP 300 transmits a probe response during the DTI with the recipient address of the probe response set to a broadcast address.

In a case of having received a probe response including a broadcast address in the recipient address, the STA 100 determines whether the address of the beamforming feedback information included in the probe response (a MAC address field in FIG. 29, which will be described later) is addressed to the STA 100 or not, and in a case of being addressed to the STA 100, analyzes the beamforming feedback information and determines the best sector.

In a case of receiving a probe response including a unicast address in the recipient address during the DTI, the STA 200 may transmit an Ack that is omitted from illustration, after having performed analysis of beamforming feedback information and setting of transmission sector in the SIFS time. Transmission of an Ack enables the STA 200 to perform highly reliable communication. For example, in a case where the AP/PCP 300 transmits a probe response including a unicast address as the recipient address and no Ack frame is received after the SIFS time, the AP/PCP 300 may retransmit the probe response.

In a case of having received a probe response including a broadcast address as the recipient address during the DTI, the STA 100 may analyze the beamforming feedback information in time longer than SIFS. Accordingly, even STAs with low processing capabilities can perform reception processing of probe responses including beamforming feedback information, and can complete discovery.

In a case of receiving an SSW frame from the STA 100 with the value of the SIFS Turnover subfield set to 0 during the A-BFT period, the AP/PCP 300 may transmit an SSW-FB frame to the STA 100, and not include beamforming feedback information in the probe response in the DTI but set the recipient address to a unicast address for the STA 100 and transmit the probe response.

After having received the SSW-FB frame, the STA 100 analyzes the beamforming feedback information. Accordingly, the analysis of the beamforming feedback information at the time of receiving the probe response may be omitted. Accordingly, the STA 100 can transmit an Ack frame after SIFS time even if the processing capabilities are low.

In a case of having received an SSW frame from the STA 100 with the value of the SIFS Turnover subfield set to 0, and omitting transmission of an SSW-FB frame to the STA 100, the AP/PCP 300 may transmit a probe response including beamforming information for the STA 100 with the recipient address set to a broadcast address.

The STA 100 and STA 200 may set the value of the SIFS Turnover subfield in accordance with processing capabilities regarding the beamforming feedback information. Accordingly, even in a case where processing capabilities are low with regard to beamforming feedback information, reception processing of a probe response including beamforming feedback information can be performed. Thus, delay required for discovery can be shortened.

Modification 1-5

Figure 20:
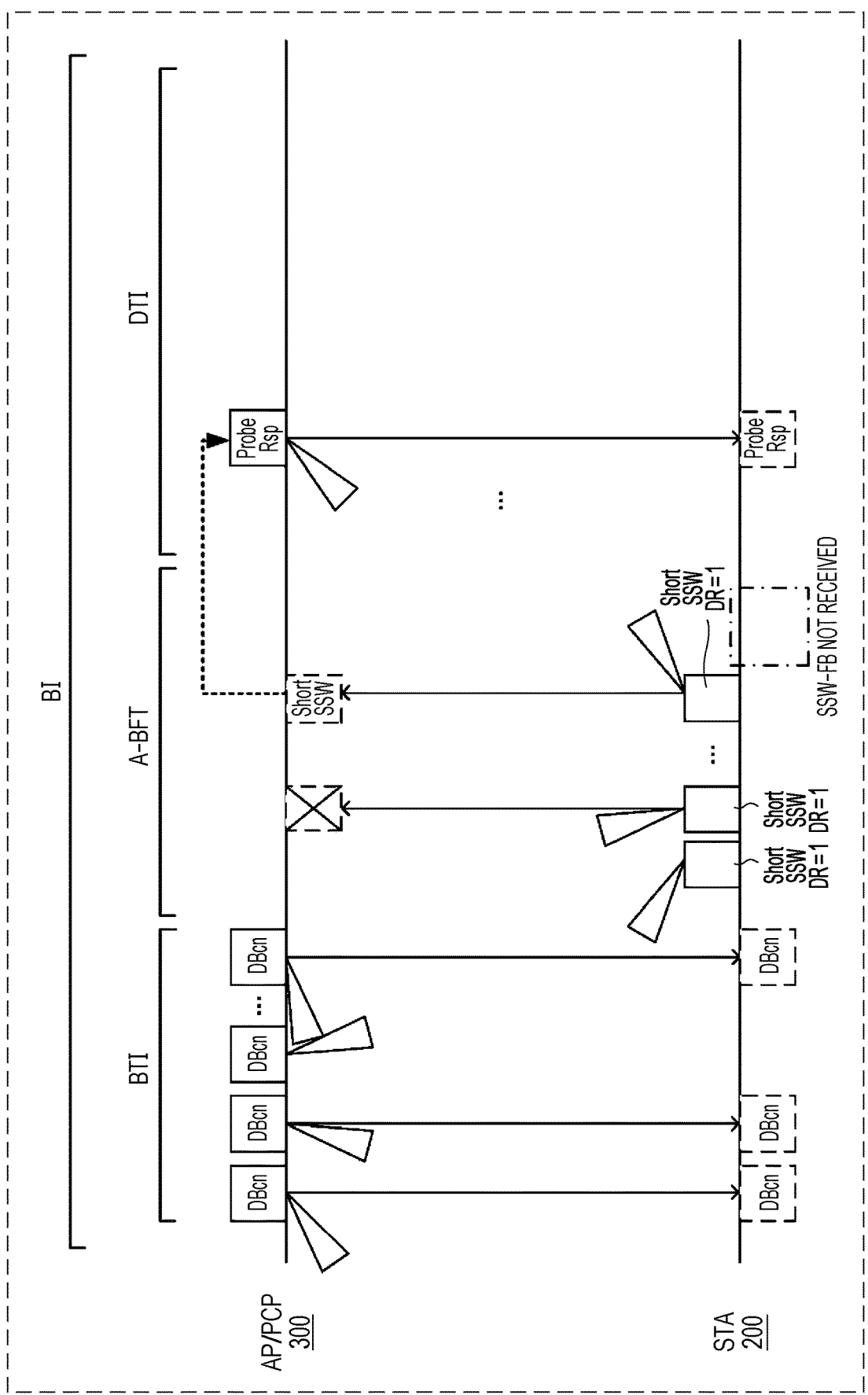
FIG. 20 is a diagram illustrating an example of procedures of a STA performing an active scan with regard to an AP/PCP.
Figure 21:
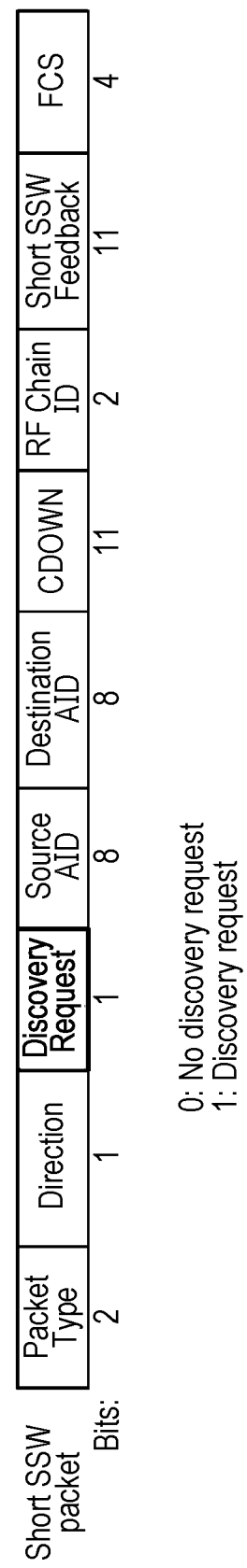
FIG. 21 is a diagram illustrating an example of a format of a Short SSW packet.

FIG. 20 is a diagram illustrating an example of procedures of the STA 200 performing active scanning with regard to the AP/PCP 300. In FIG. 20, the STA 200 may transmit a Short SSW packet, including a field indicating the discovery request instead of an SSW frame, during the A-BFT period. FIG. 21 is a diagram illustrating an example of the format of a Short SSW packet. The field indicating a discovery request is the same as the discovery request subfield in FIG. 4.

A Short SSW packet is shorter in packet length than a packet including an SSW frame, so the STA 200 transmits a greater number of Short SSW packets than SSW frames during the A-BFT period, switching the transmission sector for each Short SSW packet. The STA 200 can perform training of a great number of transmission sectors during the A-BFT period, so precision of beamforming improves. Accordingly, communication quality with the AP/PCP 300 (after reception of the probe response) improves.

The Short SSW packet that the STA 200 transmits is short in packet length, so the probability of causing interference at other STAs (e.g., STA 100 omitted from illustration), and/or the probability of receiving interference from other STAs, are reduced. Accordingly, the probability of the AP/PCP 300 receiving valid SSW frames and Short SSW packets from multiple STAs increases.

The STA 200 sets a field indicating discovery request in the Short SSW packet illustrated in FIG. 21 to DR=1, and transmits the Short SSW packet. In a case of having received valid SSW frames and Short SSW packets from multiple STAs, the AP/PCP 300 performs the following processing. That is to say, the AP/PCP 300 transmits a Probe Response frame including BF feedback to the STAs where the field indicating discovery request in the SSW frames or Short SSW packets has been set to DR=1 and transmitted. The STA 200 can receive the Probe Response frame and complete BFT and discovery with regard to the AP/PCP 300.

Thus, the STA 200 transmits a Short SSW packet including a discovery request. Accordingly, there is a high probability that delay will be shortened from reception of a Probe Response frame until completion of BFT and discovery with regard to the AP/PCP 300, in a case where multiple STAs perform BFT during an A-BFT period.

Modification 1-6

Figure 22:
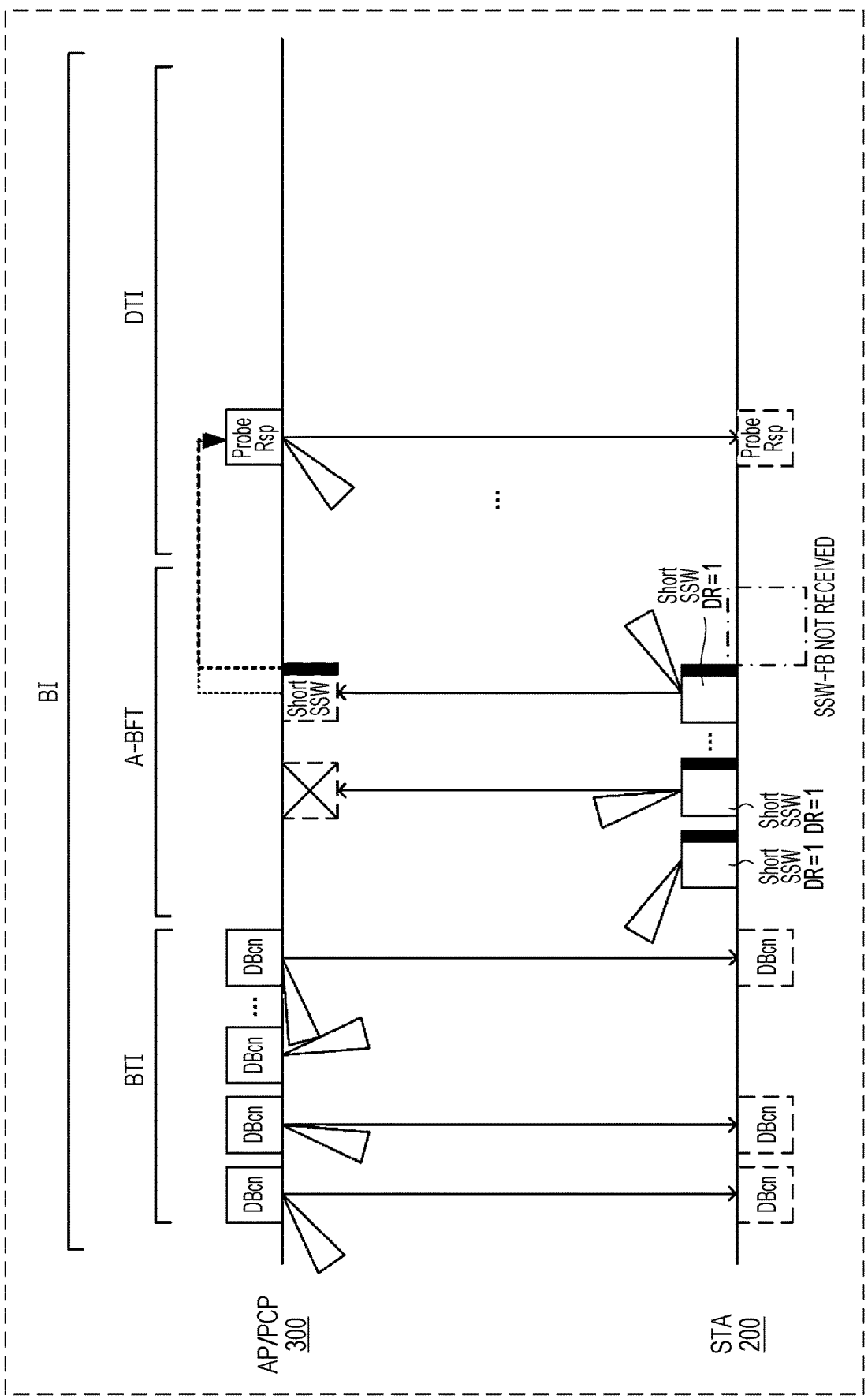
FIG. 22 is a diagram illustrating an example of procedures of a STA performing an active scan with regard to an AP/PCP.

The STA 200 may transmit a Short SSW packet including a field indicating a discovery request and a control trailer (Control Trailer), instead of an SSW frame, during the A-BFT period. FIG. 22 is a diagram illustrating an example of procedures of the STA 200 performing active scanning with regard to the AP/PCP 300. DR=1 is added to the Short SSW packet that the STA 200 transmits during the A-BFT period in FIG. 22.

Figure 23:
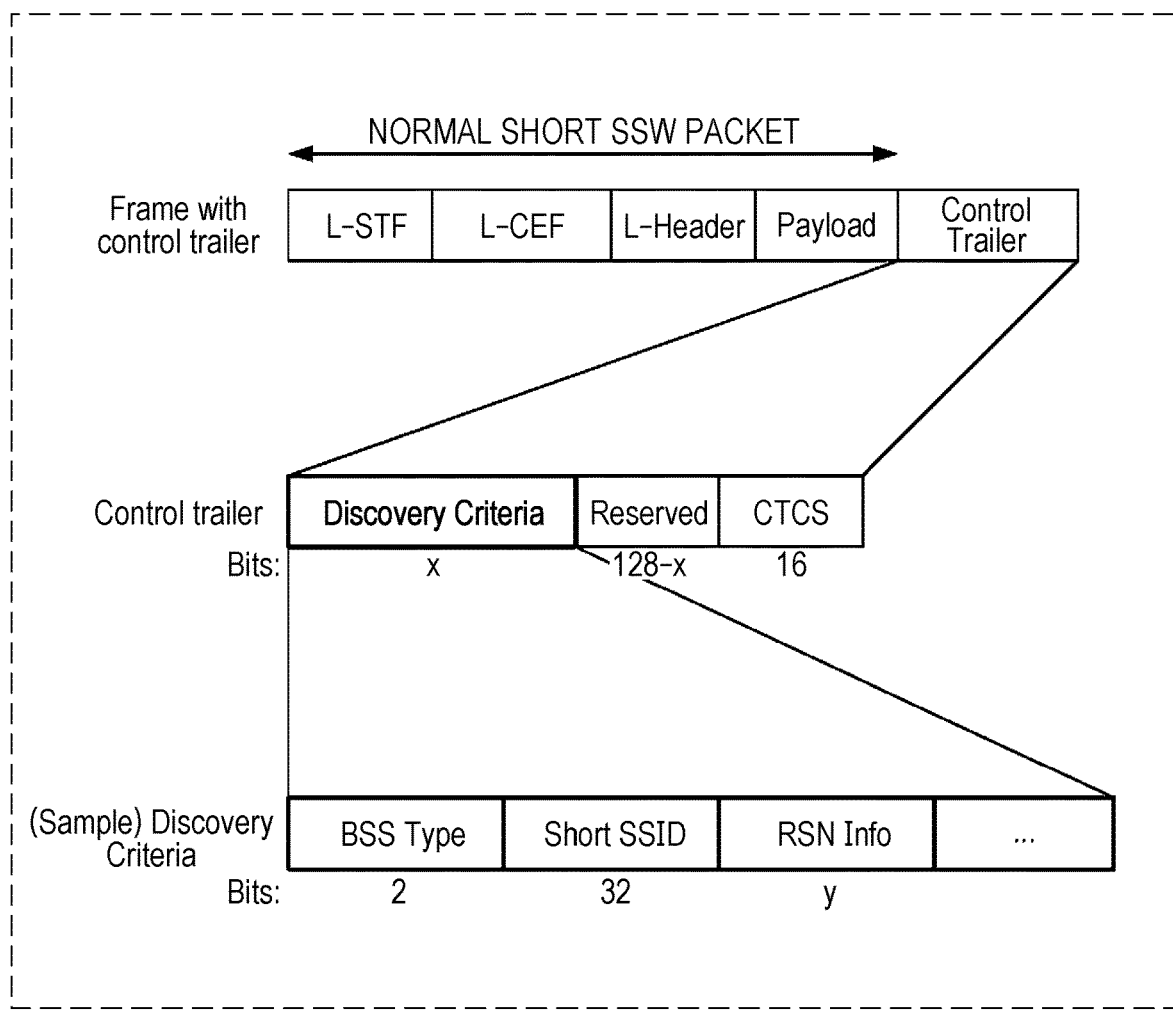
FIG. 23 is a diagram illustrating an example of a format of a Short SSW packet.

FIG. 23 is a diagram illustrating an example of the format of a Short SSW packet. The Short SSW packet that the STA 200 uses in FIG. 20 (normal Short SSW packet) has an L-STF (Legacy Short Training Field), an L-CEF (Legacy Channel Estimation Field), an L-Header (Legacy Header), and a Payload. Note that FIG. 21 is a diagram illustrating the format of the Payload of the Short SSW packet. The Short SSW packet in FIG. 23 includes the control trailer in comparison with the Short SSW packet in FIG. 20.

The control trailer includes a Discovery Criteria field that is additional information for performing discover, a Reserved field, and an error detection code field (control trailer check sequence (CTCS)). The Discovery Criteria field includes a BSS Type subfield, a Short Service Set IDentifier (SSID) subfield, and an RNS Info subfield.

The STA 200 sets the value of the BSS Type subfield to a value indicating Infrastructure BSS (BSS Type=3) and transmits a Short SSW packet. In a case where the basic service set (BSS) is Infrastructure BSS, the AP/PCP 300 performs a response to the STA 200 (transmission of probe response), and in a case where the BSS is not Infrastructure BSS (e.g., Personal BSS (PBSS, BSS Type=2) or independent BSS (IBSS, BSS Type=1), response to the STA 200 may be omitted.

In a case where the value of the BSS Type subfield in the received Short SSW packet indicates the same type as the BSS of the AP/PCP 300, the AP/PCP 300 responds to the STA 200, and in a case of indicating a different type, may omit the response.

The STA 200 may select the BSS for connection and set the value of the BSS Type subfield in accordance with the application using communication. Thus, responses from access points regarding which connection is not intended can be suppressed, delay in discovery can be reduced, and transmission of unnecessary packets by the AP/PCP 300 can be reduced.

For example, in a case where the application that the STA 200 uses is an Internet browser, the STA 200 may connect to an Infrastructure BSS access point for transmitting IP packets. In a case where the application that the STA 200 uses is video transmission to a large-screen display, the STA 200 may connect to a PCP of a PBSS for performing one-on-one communication with the display.

The STA 200 may set the value of the Short SSID field to a 32-bit hash value of the SSID (an identifier for identifying the BSS) of an access point to which connection is planned, and transmit a Short SSW packet. In a case where the value of the Short SSID subfield of the received Short SSW packet matches the hash value of the SSID of the BSS of the AP/PCP 300, the AP/PCP 300 responds to the STA 200, and in a case of not matching, may omit the response to the STA 200.

The STA 200 specifies an AP/PCP from an SSID value obtained from a list of SSIDs of nearby AP/PCPs that another AP/PCP (omitted from illustration) provides, or obtained by another communication method, and performs discovery. Accordingly, processing of handling responses for AP/PCPs that have not been specified can be omitted, and delay in discovery can be shortened.

The STA 200 may set the value of the RSN Info field so that part of the field within the RSN element stipulated in the 11ad standard is included. The value of the RSN Info field includes information relating to support or no support of securing function relating to wireless connection (e.g., relating to security and authentication) and/or parameters.

In a case of supporting the security functions that the RSN Info field of the Short SSW packet that has been received indicates, the AP/PCP 300 responds to the STA 200, and in a case of not supporting these, may omit response to the STA 200.

Thus, the STA 200 transmits a Short SSW frame including the value of the Discovery Criteria field. Accordingly, processing regarding responses from AP/PCPs of BSSs that do not match the application, and AP/PCPs not specified, can be omitted, and delay of discovery can be shortened.

Modification 1-7

Figure 24:
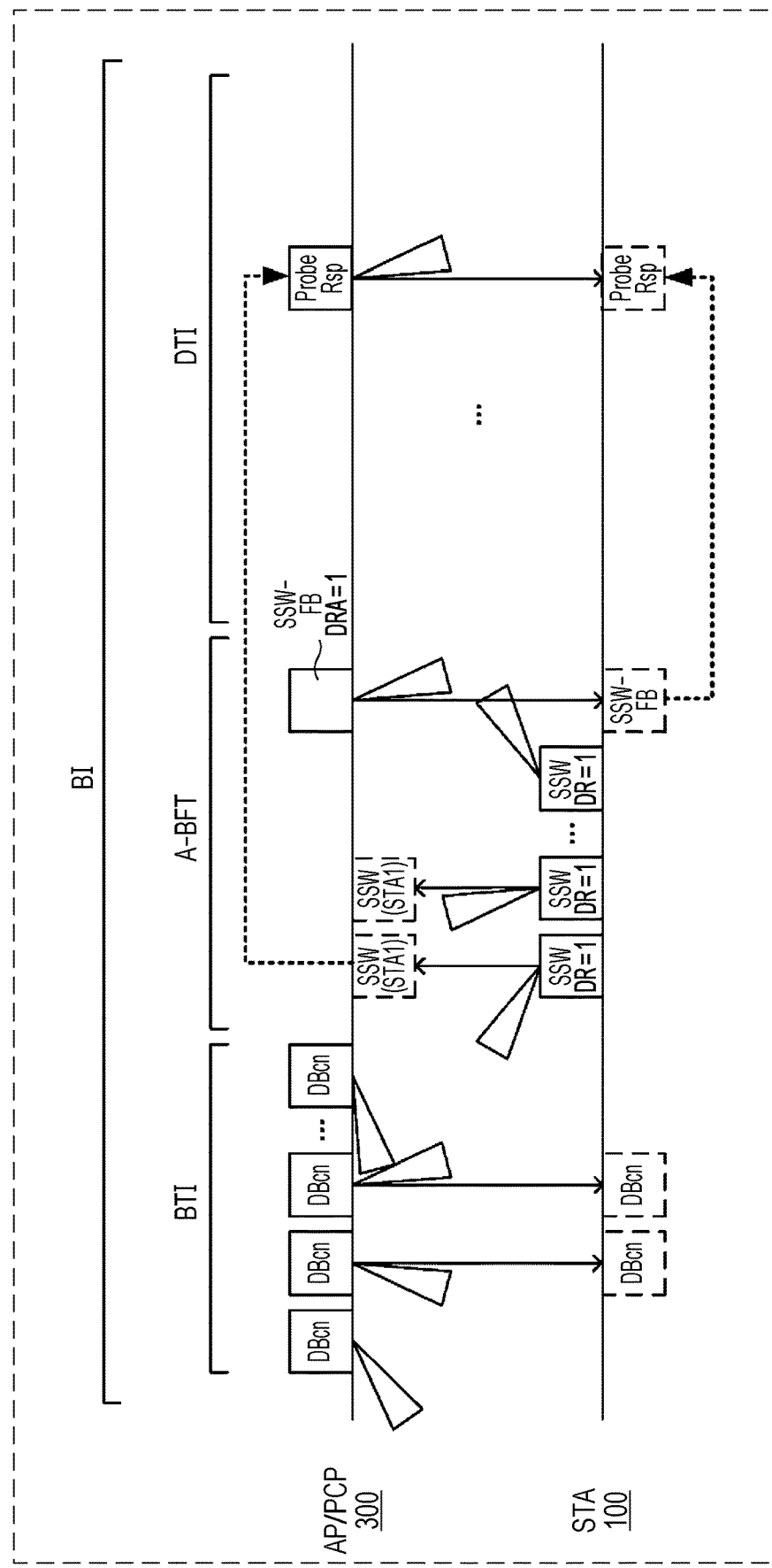
FIG. 24 is a diagram illustrating an example of procedures of a STA performing an active scan with regard to an AP/PCP.

The AP/PCP 300 may transmit an SSW-FB frame during the A-BFT period with a Discovery Request Ack field indicating that an SSW frame including DR=1 has been received included. FIG. 24 is a diagram illustrating an example of procedures of the STA 100 performing active scanning with regard to the AP/PCP 300. DR=1 is added to the Short SSW field that the STA 100 transmits during the A-BFT period, and DRA=1 is added to the SSW-FB field that the AP/PCP 300 transmits during the A-BFT period, in FIG. 24.

Figure 25:
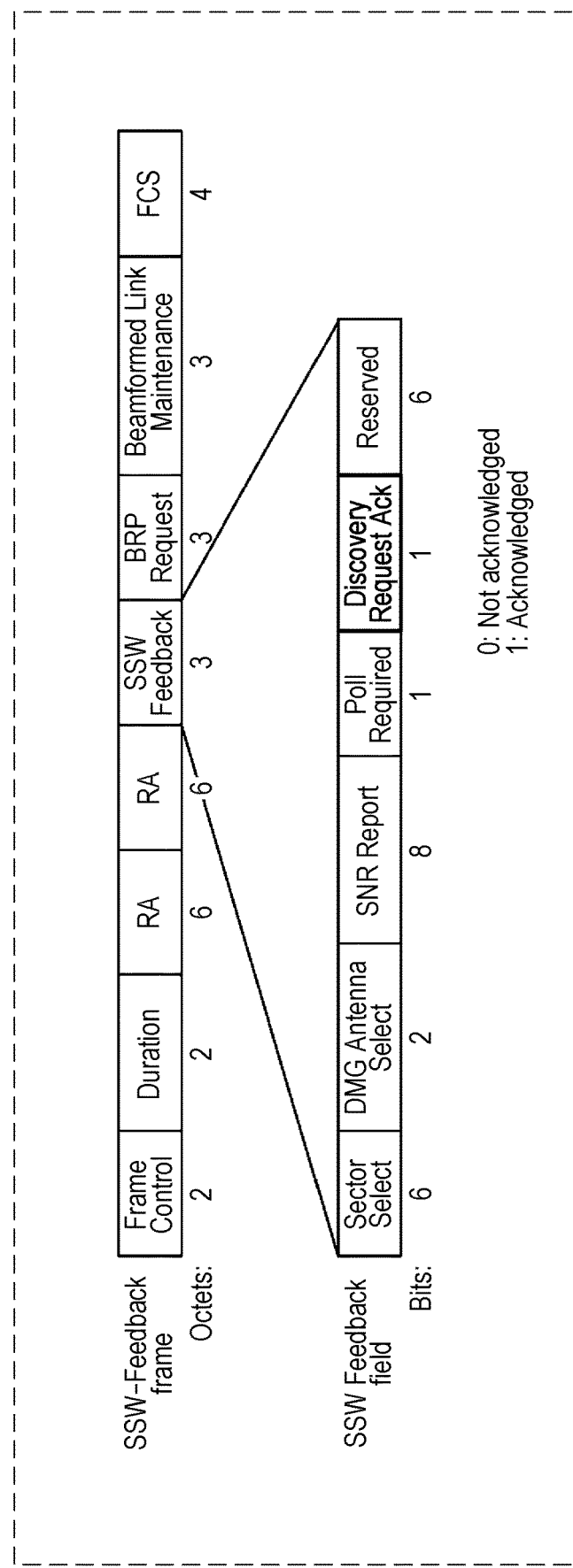
FIG. 25 is a diagram illustrating an example of a format of an SSW-feedback (FB) frame.

FIG. 25 is a diagram illustrating an example of the format of an SSW-FB frame. The SSW-FB frame includes a Frame Control field, a Duration field, an RA field, an SSW Feedback (SSW-FB) field, a BRP Request field, a Beamformed Link Maintenance field, and an FCS field.

The SSW Feedback field includes a Sector Select subfield, a DMG Antenna Select subfield, an SNR Report subfield, a Poll Required subfield, a Discovery Request ACK (DRA) subfield, and a Reserved subfield.

In a case of having received an SSW frame including DR=1 from the STA 100 during the A-BFT period, the AP/PCP 300 transmits an SSW-FB frame with the value of the Discovery Request Ack subfield set to DRA=1 to the STA 100.

In a case of having received an SSW frame including DR=0 from the STA 100 during the A-BFT period, the AP/PCP 300 transmits an SSW-FB frame with the value of the Discovery Request Ack subfield set to DRA=0 to the STA 100.

Also, in a case of having received an SSW frame including DR=1 from the STA 100 during the A-BFT period, but the AP/PCP 300 is not going to transmit a probe response to the STA 100, the AP/PCP 300 transmits an SSW-FB frame with the value of the Discovery Request Ack subfield set to DRA=0 to the STA 100 during the A-BFT period.

Note that "a case . . . the AP/PCP 300 is not going to transmit a probe response to the STA 100" includes a case where an SSW frame including DR=1 has been received but functions of transmitting a probe response (see first embodiment) are not supported.

Also, "a case . . . the AP/PCP 300 is not going to transmit a probe response to the STA 100" includes, for example, a case the value of the Discovery Criteria field (see FIG. 23) included in the SSW frame containing DR=1 does not match the conditions of the AP/PCP 300 (e.g., BSS Type is different).

Note that in a case where no SSW frame is received, the AP/PCP 300 does not have to transmit an SSW-FB frame.

In a case of having received an SSW-FB frame including a Discovery Request Ack subfield the STA 100 judges whether or not to stand by to receive a probe response during the DTI.

In a case where the value of the Discovery Request Ack subfield is DRA=1, the STA 100 stands by to receive a probe response. Accordingly, the STA 100 can avoid transmission of unnecessary probe requests.

In a case where the value of the Discovery Request Ack subfield is DRA=0, the STA 100 performs transmission of a probe request. Accordingly, the STA 100 can avoid delay due to unnecessary standby for a probe response.

In a case where the value of the Discovery Request Ack subfield has been set to DRA=1 and an SSW-FB frame has been transmitted to the STA 100, the AP/PCP 300 does not transmit a probe response to the STA 100 until a probe request has been received. Thus, the AP/PCP 300 can avoid transmission of unnecessary probe responses.

Modification 1-8

After having transmitted an SSW-FB frame during the A-BFT period, the AP/PCP 300 may further transmit a frame instead of the SSW-FB frame, indicating that an SSW frame including DR=1 has been received (e.g., an announcement traffic indication message (ATIM) frame or SSW-ACK frame) during the DTI.

Figure 26:
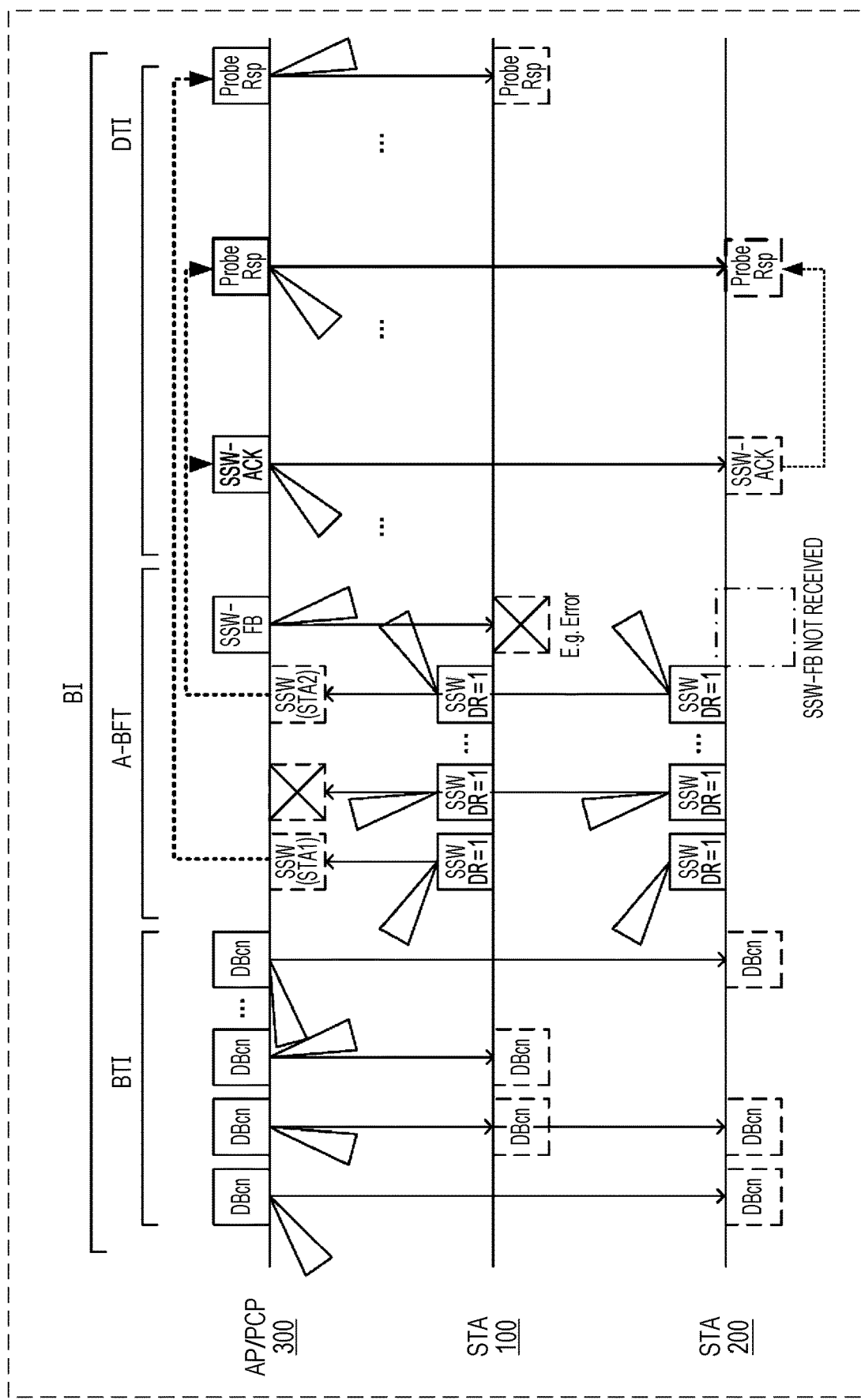
FIG. 26 is a diagram illustrating an example of procedures of a STA performing an active scan with regard to an AP/PCP.

FIG. 26 is a diagram illustrating an example of procedures of the STA 100 and STA 200 performing active scanning with regard to the AP/PCP 300. The AP/PCP 300 receives SSW frames including DR=1 from the STA 100 and STA 200 during the A-BFT period. The AP/PCP 300 may transmit an SSW-FB frame to either of the transmission source STAs of the SSW frames (STA 100 in FIG. 26).

The AP/PCP 300 may transmit an SSW-ACK frame to the STA 200 during the DTI. The AP/PCP 300 may transmit an SSW-ACK frame to the one of the STAs 100 and 200 of the SSW frames to which the SSW-FB frame was not transmitted. Note that the AP/PCP 300 may transmit an ATIM frame to the STA 200 instead of the SSW-ACK frame during the DTI.

In a case of having received the SSW-ACK frame from the AP/PCP 300, the STA 200 stands by to receive a probe response. In a case of having not received an SSW-ACK frame from the AP/PCP 300, the STA 200 may judge that BFT was not completed during the A-BFT period, and execute different procedures, such as beamforming in the DTI, for example. Accordingly, the STA 200 can avoid standby for reception of a probe response, and can avoid increase of delay. Also, the STA 200 can reduce electric power consumption by transitioning to a sleep (power saving) mode where standby is stopped until the next BTI.

Note that the AP/PCP 300 may transmit an SSW-ACK frame at the start of the DTI. The standby time for reception of an SSW-ACK frame may be shorter than the standby time for reception of a probe response. Accordingly, the STA 200 can judge whether or not BFT has been completed at an early stage, and can shorten standby time.

The AP/PCP 300 may also set an announcement transmission interval (ATI) between the A-BFT period and DTI, and transmit an ATIM frame. The ATI may be set to be a shorter period than the DTI. The standby time for reception of an ATIM frame in ATI is shorter than the standby time for reception of a probe response during the DTI, so the STA 200 can judge whether or not BFT has been completed at an early stage, and can shorten standby time.

Modification 1-9

Figure 27:
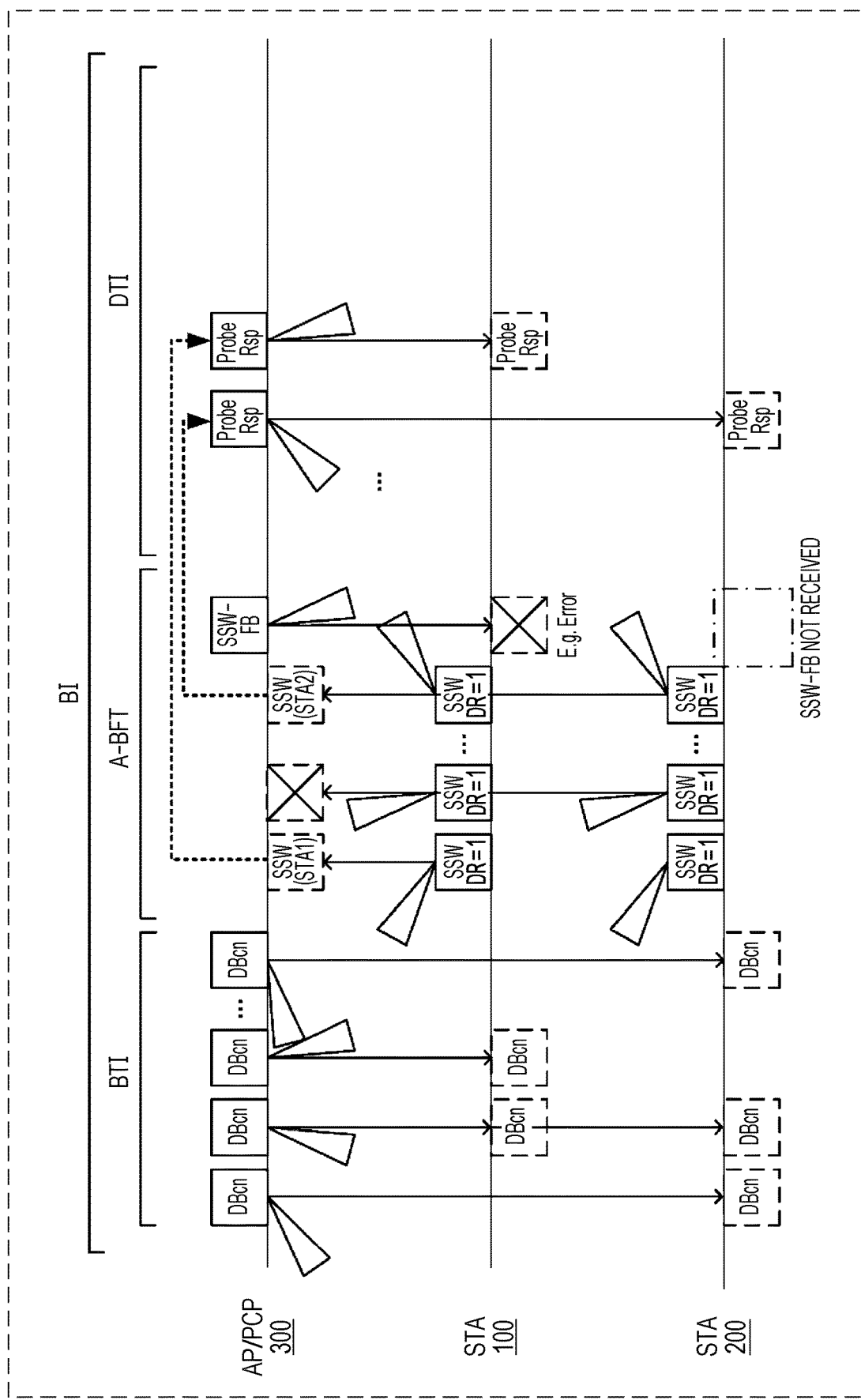
FIG. 27 is a diagram illustrating an example of procedures of a STA performing an active scan with regard to an AP/PCP.

The AP/PCP 300 may consecutively transmit probe responses addressed to the STA 100 and addressed to the STA 200 during the DTI, at short beamforming interframe space (SBIFS) intervals (1 μsec), in the same way as with transmission of DMG beacons and transmission of SSW frames. FIG. 27 is a diagram illustrating an example of procedures of the STA 100 and STA 200 performing active scanning with regard to the AP/PCP 300.

The AP/PCP 300 receives SSW frames including DR=1 from multiple STAs during the A-BFT period.

The AP/PCP 300 transmits probe responses addressed to the STAs in short intervals such as SBIFS intervals (1 μsec) or SIFS intervals (3 μsec) during the DTI.

Note that the AP/PCP 300 may set the recipient address of a probe response to a broadcast address. Accordingly, the STA that has received a probe response can omit transmission of an ACK frame, so the AP/PCP 300 can transmit probe responses at shorter intervals.

Thus, the AP/PCP 300 can effectively transmit probe responses to multiple STAs, and the STA 100 and STA 200 can shorten time required for standby to receive probe responses.

Modification 1-10

Figure 28:
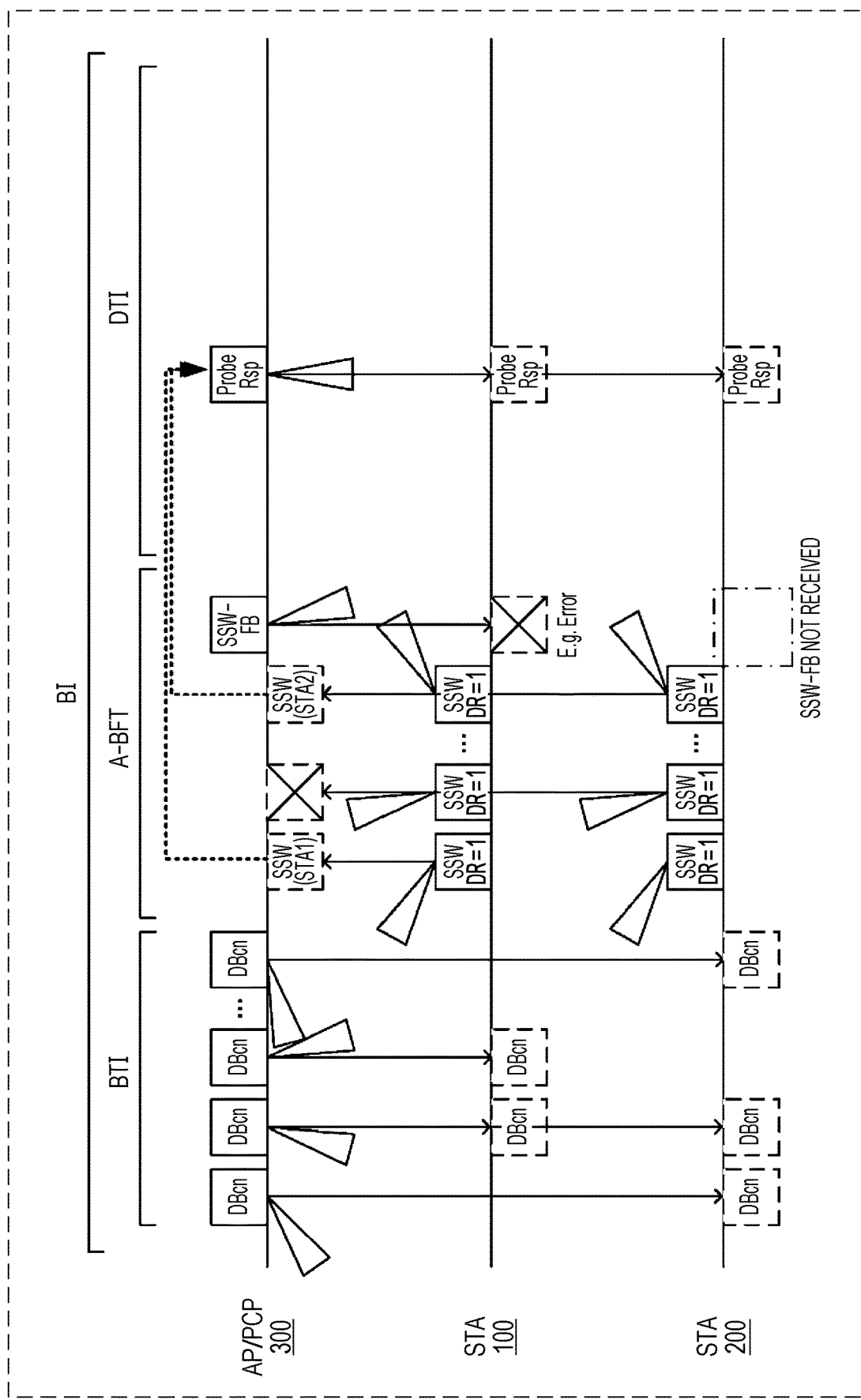
FIG. 28 is a diagram illustrating an example of procedures of a STA performing an active scan with regard to an AP/PCP.

The AP/PCP 300 may include beamforming feedback information of multiple STAs (e.g., STA 100 and STA 200) in the probe response and transmit during the DTI. FIG. 28 is a diagram illustrating an example of procedures of the STA 100 and STA 200 performing active scanning with regard to the AP/PCP 300.

Figure 29:
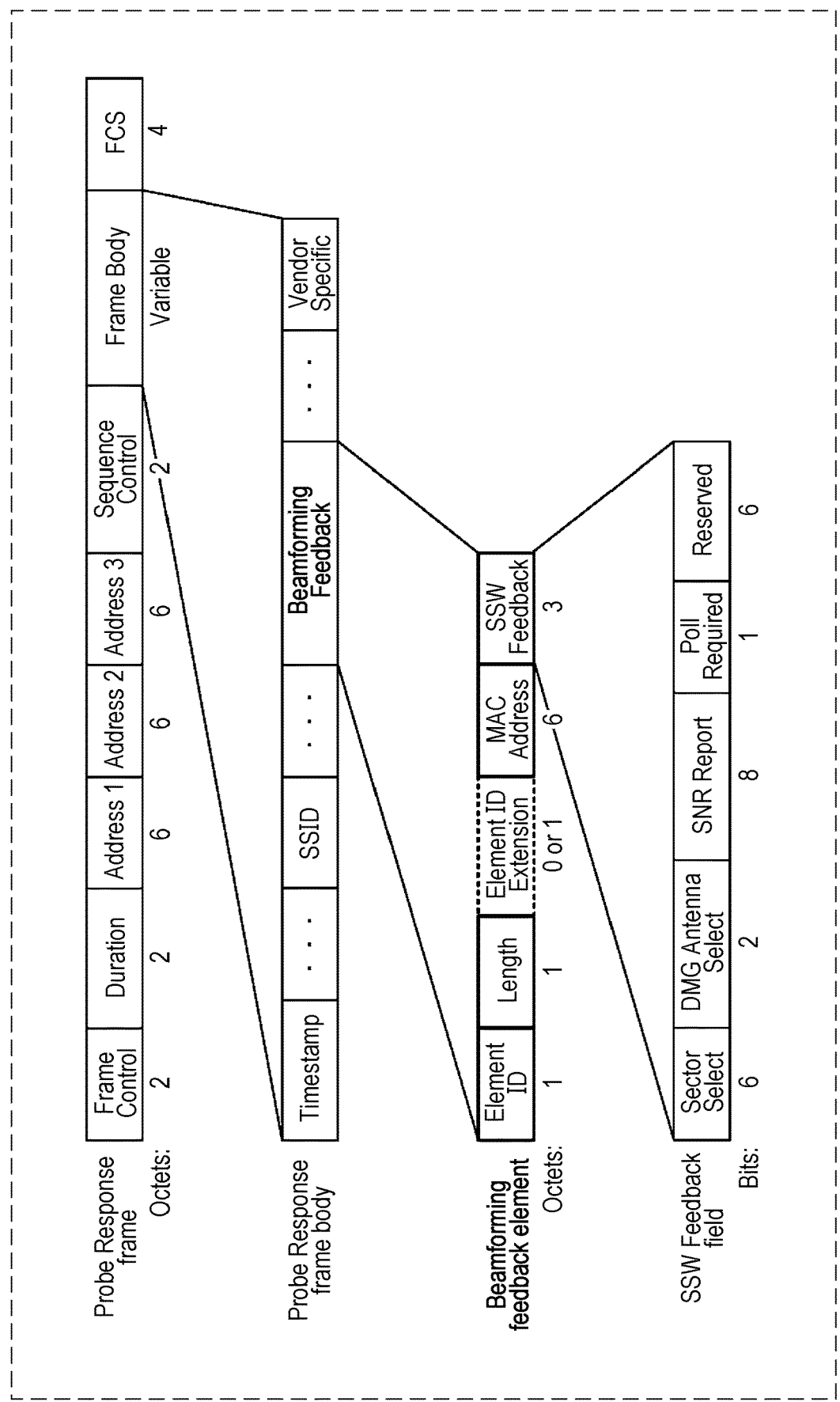
FIG. 29 is a diagram illustrating an example of a format of a probe response.

FIG. 29 is a diagram illustrating an example of the format of a probe responses. The probe response in FIG. 29 has a MAC address field added to the Beamforming Feedback element, as compared with the probe response in FIG. 5.

In FIG. 29, the AP/PCP 300 may include multiple Beamforming Feedback fames in the Probe Response frame body of the probe response. For example, the AP/PCP 300 may include two Beamforming Feedback frames in the Probe Response frame body, and include beamforming feedback information relating to the STA 100 in the first Beamforming Feedback frame, and set the MAC address field to the MAC address of the STA 100. The AP/PCP 300 may also include beamforming feedback information relating to the STA 200 in the second Beamforming Feedback frame, and set the MAC address field to the MAC address of the STA 200.

In a case where the sector used for transmission of a frame addressed to the STA 100 and the sector used for transmission of a frame addressed to the STA 200 are the same, the AP/PCP 300 may include the beamforming feedback information for the STA 100 and STA 200 in a single probe response, and transmit using the same sector. For example, in a case where the best sector for the AP/PCP 300 that the feedback information the STA 100 includes in an SSW frame and the best sector for the AP/PCP 300 that the feedback information the STA 200 includes in an SSW frame are the same, the AP/PCP 300 may set the same sector for the sector used to transmit frames addressed to the STA 100 and the sector used to transmit frames addressed to the STA 200.

Thus, the AP/PCP 300 includes information for probe responses addressed to multiple STAs in respective Beamforming Feedback frames of a single probe response. Accordingly, delay required for transmission of multiple probe responses (including carrier sense and backoff for each frame) can be shortened to the delay required for transmitting one probe response.

Modification 1-11

Figure 30:
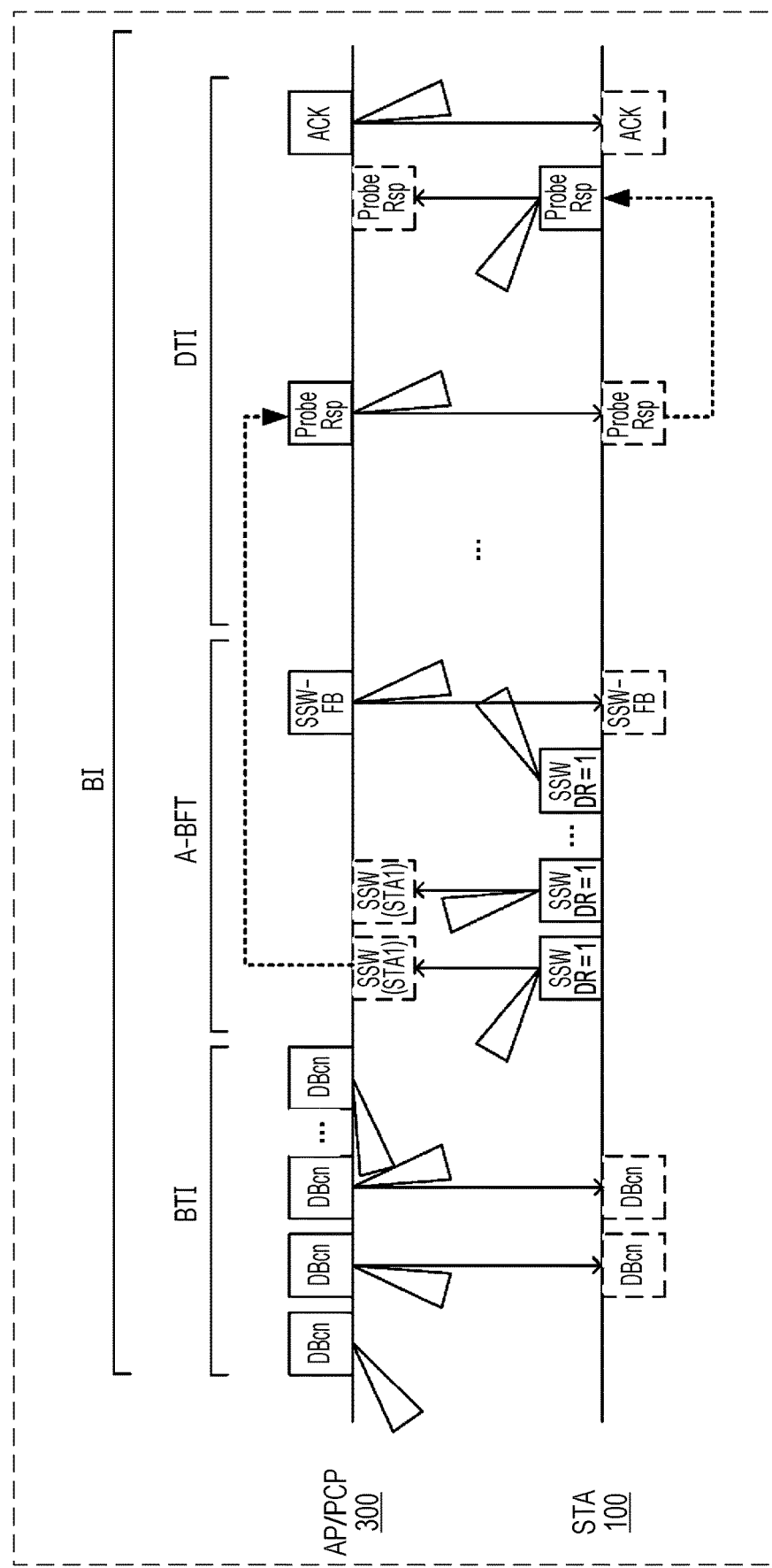
FIG. 30 is a diagram illustrating an example of procedures of a STA performing an active scan with regard to an AP/PCP.

The AP/PCP 300 may include information requesting a probe response from the STA 100 in a probe response and transmit during the DTI. FIG. 30 is a diagram illustrating an example of procedures of the STA 100 performing active scanning with regard to the AP/PCP 300.

The AP/PCP 300 transmits a probe response including information requesting a probe response from the STA 100 during the DTI. For example, a 1-bit Solicit Probe Response subfield is added to the Beamforming Feedback field in the probe response in FIG. 29, and the value of the subfield is set to 1. The Beamforming Feedback field is one example, and the Solicit Probe Response subfield may be added to a field other than the Beamforming Feedback field. Also, a Reserved subfield other than in the Beamforming Feedback field may be replaced by the Solicit Probe Response subfield.

In a case of having received a probe response where 1 is set to the Solicit Probe Response subfield, the STA 100 transmits a probe response addressed to the AP/PCP 300 after having acquired a transmission right (e.g., perform carrier sensing).

The AP/PCP 300 omits transmission of the probe request addressed to the STA 100 and receives a probe response. Accordingly, the AP/PCP 300 can acquire information of the STA 100 while reducing consumption of wireless resources.
Modification 1-12

Figure 31:
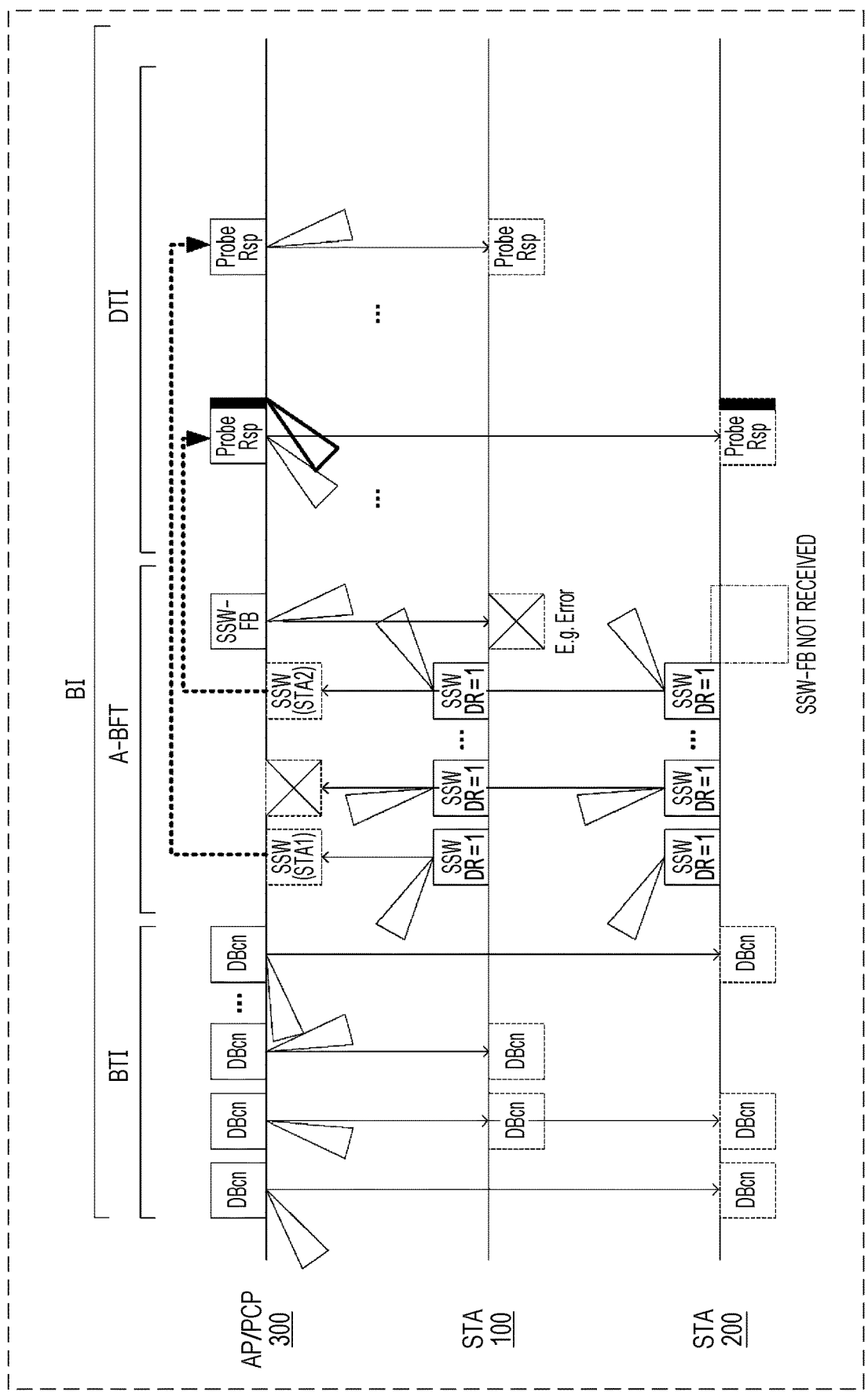
FIG. 31 is a diagram illustrating an example of procedures of a STA performing an active scan with regard to an AP/PCP.

The AP/PCP 300 may add a TRN field including a TRN-R subfield in a probe response and transmit during the DTI. The TRN-R subfield has already been described in the description of FIG. 22, so description will be omitted here. FIG. 31 is a diagram illustrating an example of procedures of the STA 100 and STA 200 performing active scanning with regard to the AP/PCP 300.

The STA 200 may switch the reception sector for each TRN-R subfield received during the DTI, to perform reception beamforming training. The STA 200 determines the best reception sector in accordance with the results of the reception beamforming training.

Note that in a case of having antenna pattern reciprocity, and a case where correlation of the directionality patterns of the transmitting antenna and the receiving antenna is known, the STA 200 may select the best transmission sector from the results of reception beamforming training. The best transmission sector decided in this way can be more highly precise as compared to feedback information in probe responses. Accordingly, the STA 200 can improve communication quality.

Figure 32:
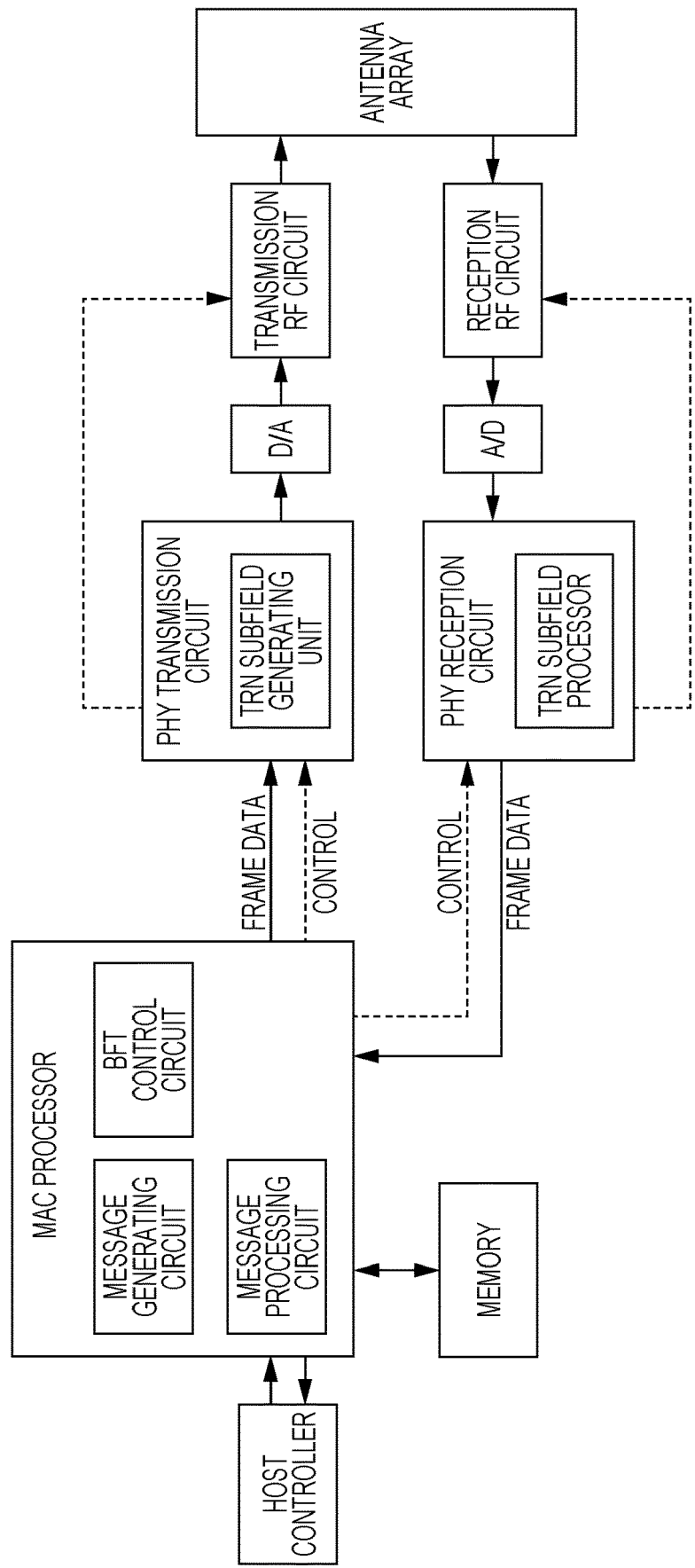
FIG. 32 is a block diagram illustrating an example of the configuration of a communication apparatus (AP/PCP and STA)

FIG. 32 is a block diagram illustrating an example of the configuration of a communication apparatus (AP/PCP 300 and STA 200). This is the same as in FIGS. 8 and 9, but details of the PHY transmission circuit and PHY reception circuit are described.

In a case of transmitting a probe response during a DTI, a message generating circuit in the MAC processor of the AP/PCP 300 generates frame data of a probe response (see FIG. 5) and inputs this to the PHY transmission circuit. The PHY transmission circuit performs encoding and modulation of the frame data, thereby generating frame data.

The PHY transmission circuit also includes a TRN subfield generating unit. The TRN subfield generating unit generates a TRN-R subfield. The PHY transmission circuit joins the frame data and the TRN-R subfield, converts into analog signals at the D/A, and transmits from the transmission RF circuit.

In a case of having received a probe response with the TRN-R subfield added, the BFT control circuit of the MAC processor of the STA 200 controls the PHY reception circuit so as to switch the reception sector for each TRN-R subfield. An example of control signals (CONTROL) output from the MAC processor to the PHY reception circuit is a list of reception sector Nos. used for reception of TRN-R subfields.

The PHY reception circuit controls the reception RF circuit based on control signals input from the MAC processor, and information of a PHY header attached to a probe response, to control switching of reception sectors.

The PHY reception circuit also includes a TRN subfield processor. The TRN subfield processor calculates reception quality for each reception sector from the signals of the received TRN-R field (e.g., reception signal strength, S/N ratio).

The PHY reception circuit notifies (omitted from illustration in the block diagram) the MAC processor of the reception quality of each reception sector calculated by the TRN subfield processor. The BFT control circuit of the MAC processor determines the best reception sector from the reception quality for each reception sector, and further may decide the best transmission sector from information of antenna pattern reciprocity.

Second Embodiment

In the first embodiment, description has been made regarding a case where the STA performs BFT (transmission of SSW frames) during an A-BFT period, and the AP/PCP receives. In a second embodiment, description will be made regarding the operations of a STA and AP/PCP in (1) a case where the STA does not perform BFT (transmission of SSW frames) during an A-BFT period, and (2) a case where the STA performed BFT (transmission of SSW frames) during an A-BFT period, but the AP/PCP did not receive an SSW frame due to contention in transmission with other STAs or the like, or a reception error occurred.

Figure 33A:
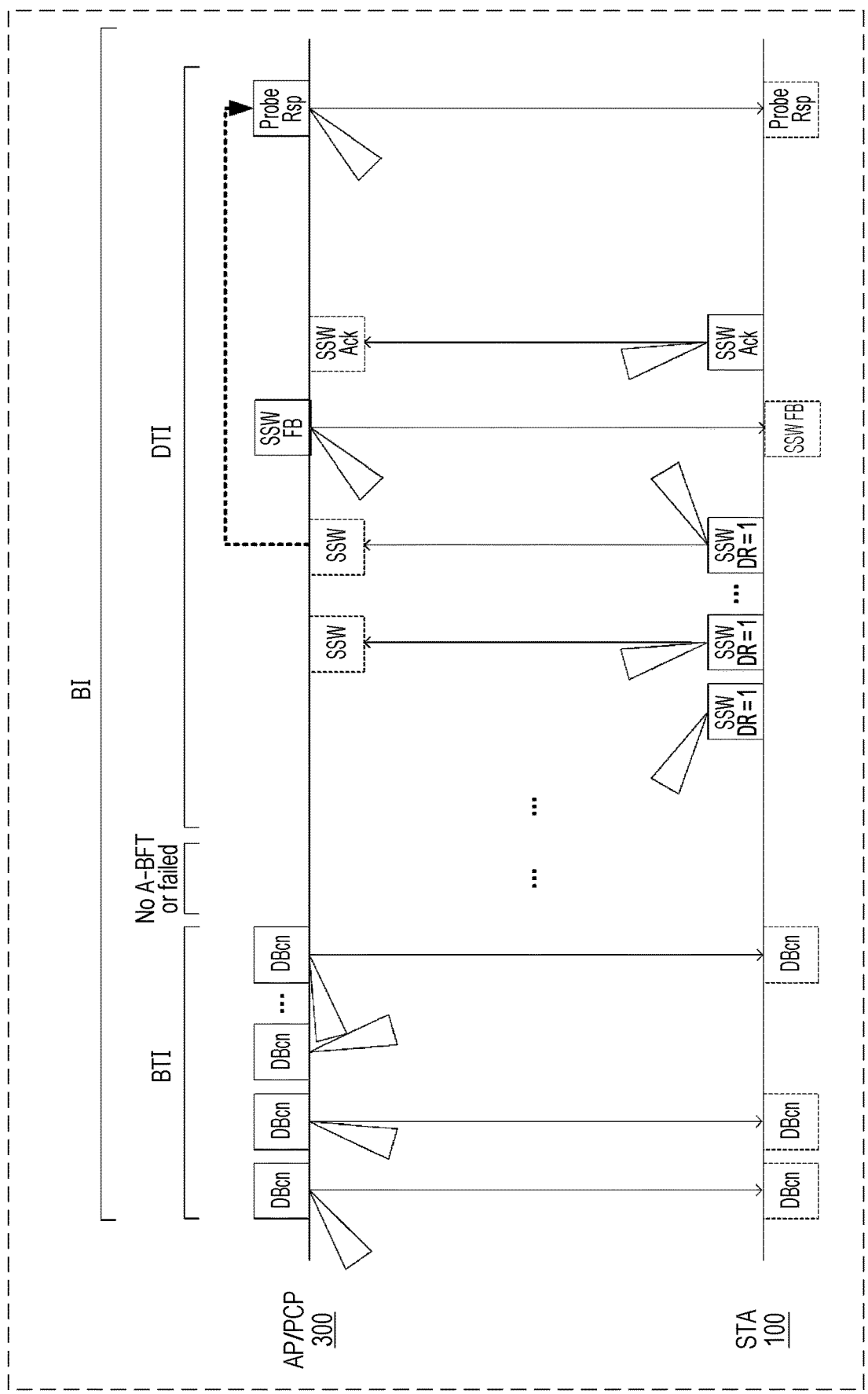
FIG. 33A is a diagram for describing procedures of a STA performing an active scan with regard to an AP/PCP according to a second embodiment.

FIG. 33A is a diagram illustrating procedures of the STA 100 performing active scanning with regard to the AP/PCP 300, according to the second embodiment. FIG. 33A illustrates a case of an AP transmitting an SSW-FB frame, and FIG. 33B illustrates a case where the AP does not transmit an SSW-FB frame.

Figure 33B:
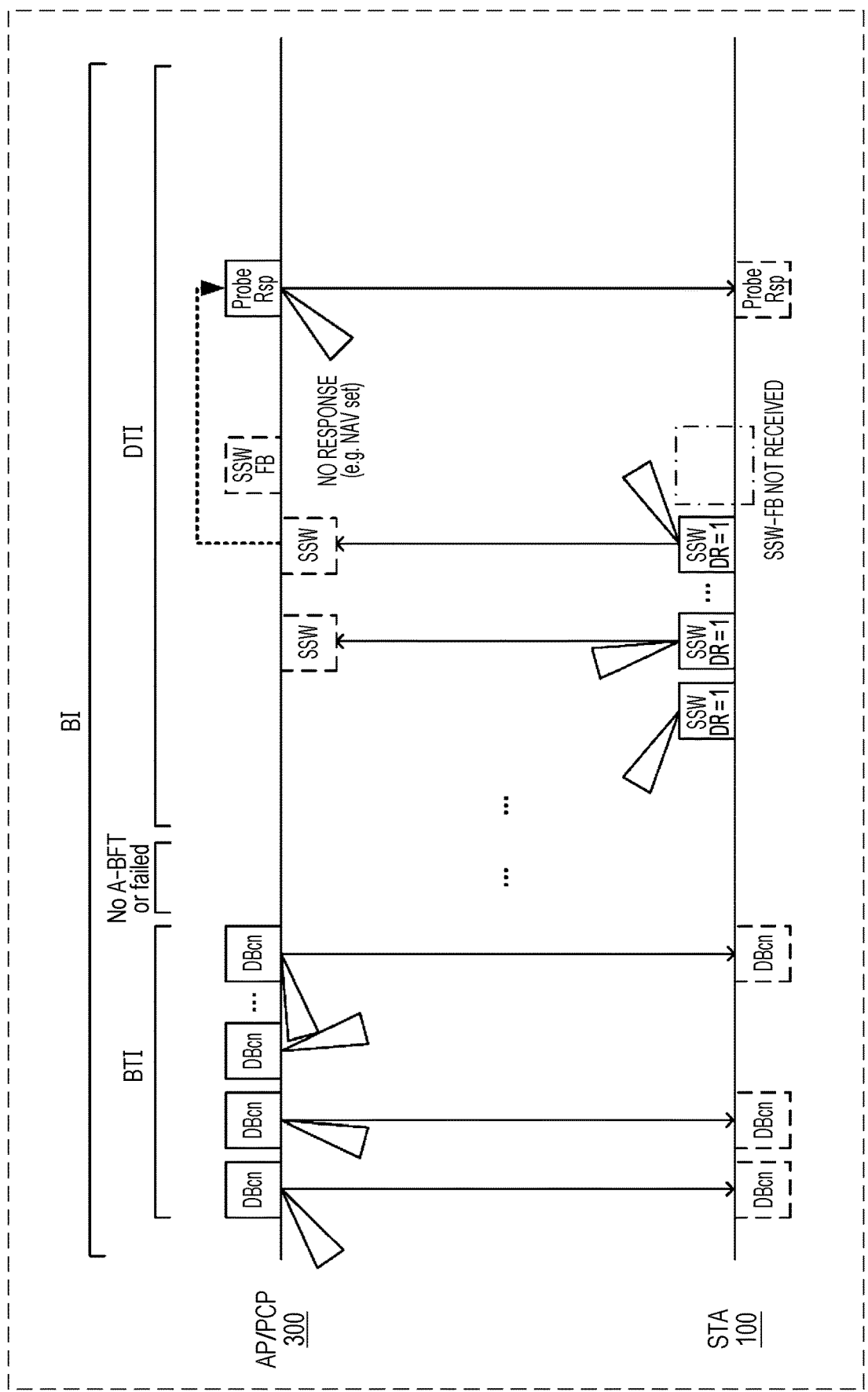
FIG. 33B is a diagram illustrating an example of procedures of a STA performing an active scan with regard to an AP/PCP.

The AP/PCP 300 changes the transmission sector for each DMG beacon during the BTI in FIGS. 33A and 33B, transmitting one or more DMG beacons.

The STA 100 receives a DMG beacon during the BTI in FIGS. 33A and 33B. Other STAs (STA 200) may receive DMG beacons in the same BTI.

The following can be given as operations of the STA 100 in the A-BFT period.

(1) In a case where the STA 100 does not perform BFT (transmission of SSW frames) in an A-BFT period, the AP/PCP 300 does not transmit SSW-FB frames.

(2) In a case where the STA has performed BFT (transmission of SSW frames) during an A-BFT period, but the AP/PCP did not receive a SSW frame due to contention in transmission with other STAs or the like, or a reception error occurred, the AP/PCP 300 does not transmit SSW-FB frames.

(3) The STA 100 transmits a SSW frame that does not include DR=1 during an A-BFT period and the AP/PCP 300 transmits an SSW-FB frame but the STA 100 does not receive.

The following procedures may be applied by the STA 100 in the state of the above-described (1), (2), and (3).

The STA 100 transmits SSW frames including a field indicating discovery request (DR=1) during the DTI, changing the transmission sector for each SSW frame. The format of SSW frames is the same as in FIG. 4, so description will be omitted here.

The AP/PCP 300 receives one or more SSW frames during the DTI. The AP/PCP 300 determines the transmission sector ID of the SSW frame that has the best reception quality out of the received SSW frames to be the best sector of the transmission source STA.

The AP/PCP 300 includes information of the best sector that has been decided, in an SSW-FB frame, and transmits to the STA 100.

In a case of having received the SSW-FB frame, the STA 100 transmits an SSW-ACK frame using the best sector included in the SSW-FB frame.

In a case where the SSW frame received during the DTI includes a field indicating discovery request (DR=1), the AP/PCP 300 acquires a transmission opportunity (TXOP) after having received the SSW-Ack regarding the SSW-FB, and transmits a probe response. The AP/PCP 300 may include beamforming feedback information in the probe response. The AP/PCP 300 may also omit the beamforming feedback information, and shorten the probe response.

The STA 100 receives a Probe Response frame including beamforming feedback (Beamforming Feedback element) during the DTI, and determines the best sector for communication with the AP/PCP 300 based on the information included in the beamforming feedback (e.g., value of Sector Select field). Note that the STA 100 has received the probe response from the AP/PCP 300, and accordingly discovery by active scanning procedures as to the AP/PCP 300 is completed (successful).

Even in a case where the STA 100 performs BFT (sector sweeping) during the A-BFT period but does not receive an SSW-FB frame, a probe response can be received during the DTI. Accordingly, the STA 100 can omit reattempting BFT, and delay required for discovery can be reduced. Also, the STA 100 can omit transmission of a probe request, and delay required for discovery can be reduced.

FIG. 33B is a diagram illustrating an example of procedures of the STA 100 performing active scanning with regard to the AP/PCP 300, according to the second embodiment. In a case of detecting signals from other STAs (omitted from illustration) at the receiving antenna of the AP/PCP 300 before transmitting an SSW-FB frame including best sector information to the STA 100 during the DTI, the AP/PCP 300 does not transmit the SSW-FB frame, in order to avoid collision of transmission signals.

Also, in a case where the AP/PCP 300 has received an RTS frame and DMG CTS frame from another STA 200 omitted from illustration, before or after reception of an SSW frame from the STA 100, and detected that the STA 200 has acquired transmission rights, and further the transmission rights of the STA 200 have not expired, the AP/PCP 300 does not transmit an SSW-FB frame. The STA 100 does not receive an SSW-FB frame from the AP/PCP 300, and accordingly does not transmit an SSW-ACK frame.

In a case where a field indicating a discovery request (DR=1) is included in the received SSW frame, the AP/PCP 300 acquires transmission rights for with the STA 100 after the transmission rights that the STA 100 holds (used by the STA 100 to transmit SSW frames and receive SSW-FB frames) has expired, and transmits a probe response with beamforming feedback information included.

In a case where the AP/PCP 300 has transmitted an SSW-FB frame but no SSW-ACK frame has been received from the STA 100, the AP/PCP 300 may transmit a probe response with beamforming feedback information included.

The STA 100 receives the probe response including the beamforming feedback (Beamforming Feedback element) during the DTI, and determines the best sector to be used for communication with the AP/PCP 300, based on information included in the beamforming feedback (e.g., value of Sector Select field). Also, the probe response has been received from the AP/PCP 300, so discovery by active scanning procedures as to the AP/PCP 300 is completed (successful).

In FIG. 33B, the STA 100 performs BFT (e.g., sector sweeping) during the DTI, and can receive a probe response from the AP/PCP 300 even in a case where no SSW-FB frame is received from the AP/PCP 300. Accordingly, the STA 100 can omit reattempting BFT, and delay required to start of data communication due to discovery can be reduced. Also, the STA 100 can omit transmission of a probe request, and delay required for discovery can be reduced.

Figure 34:
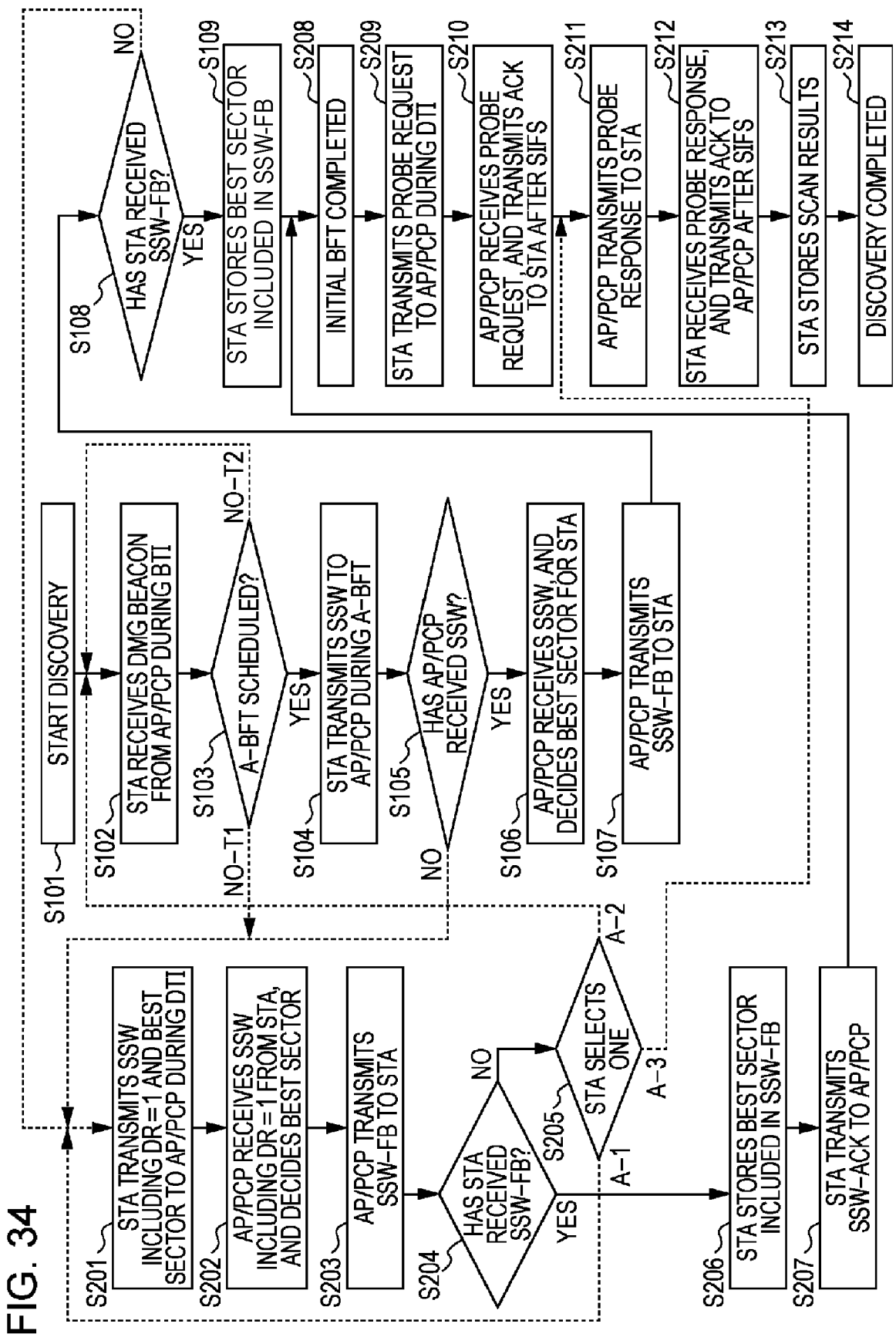
FIG. 34 is a flowchart illustrating an example of procedures of a STA performing discovery.

FIG. 34 is a flowchart illustrating an example of procedures where the STA 100 performs discovery in FIGS. 33A and 33B.

First, the STA 100 starts discovery (S101).

Next, the STA 100 receives a DMG beacon transmitted from the AP/PCP 300 (S102). Note that the AP/PCP 300 may transmit DMG beacons to perform sector sweeping. That is to say, the AP/PCP 300 may transmit one or more DMG beacons while switching the transmission direction of wireless signals (DMG beacons) by switching the transmission sector for each DMG beacon. The AP/PCP 300 may also include information elements and fields indicating whether or not an A-BFT period is scheduled after the BTI in DMG beacons and transmit.

Next, in a case where no A-BFT period is scheduled at the STA 100 (S103: NO-T1), the flow advances to S201, and the STA 100 performs beamforming during the DTI. Alternatively, in a case where a transmission opportunity (TXOP) cannot be obtained at the STA 100 (S103: NO-T2), the flow returns to S102, and the STA 100 may stand by for the next BTI without performing beamforming during the DTI.

In S201, the STA 100 transmits SSW frames including a field indicating discovery request (DR=1) during the DTI, changing the transmission sector for each SSW frame for BFT (see FIGS. 33A and 33B). The format of the SSW frame is the same as in FIG. 4. Now, the STA 100 may decide the best sector for the AP/PCP 300 from the reception quality of DMG beacons received in S102 during the BTI, and include the sector ID of the best sector in the Sector Select subframe of the SSW frame and transmit.

On the other hand, the AP/PCP 300 receives an SSW frame including the field indicating discovery request (DR=1) from S201, determines the best sector of the STA 100, and stores information of the best sector in memory, in preparation for communication with the STA 100 (S202).

Next, the AP/PCP 300 transmits an SSW-FB frame to the STA 100 (S203). The AP/PCP 300 may transmit the SSW-FB frame to other STAs as well (see FIG. 33A). The AP/PCP 300 may also transmit the SSW-FB frame using the best sector notified by the SSW frame. The AP/PCP 300 may also include the best sector for the STA 100 in the SSW-FB frame and transmit. In a case where the AP/PCP 300 has detected signals from another STA (omitted from illustration) for example, the SSW-FB frame may not be transmitted, as described earlier (see FIG. 33B).

On the other hand, in a case of not having received the SSW-FB frame from the AP/PCP 300 (S204: NO), the STA 100 advances to the later-described S211 (S205: A-3), and stands by for reception of a probe response. Note that in a case where the STA 100 does not receive a probe response within a predetermined amount of time, the flow may advance to S201 and the STA 100 may reattempt sector sweeping during the DTI in the same way with a STA in the conventional 11ad standard (S205: A-1) (omitted from illustration in FIGS. 33A and 33B), or may advance to S102 and reattempt sector sweeping in the next A-BFT period (S205: A-2) (omitted from illustration in FIGS. 33A and 33B). Now, cases where no SSW-FB frame is received includes a case where the AP/PCP 300 does not transmit the SSW-FB frame.

In a case of having received an SSW-FB frame from the AP/PCP 300 (S204: YES), the STA 100 stores information of the best sector included in the SSW-FB frame, in preparation for communication with the AP/PCP 300 (S206) (see FIG. 33A).

Next, the STA 100 transmits an SSW-ACK frame (S207) to notify the AP/PCP 300 that the SSW-FB frame has been received without error, and the flow advances to the later-described S208.

On the other hand, in a case where an A-BFT period is scheduled at the STA 100 (S103: YES), the STA 100 transmits an SSW frame with the AP/PCP 300 as a transmission destination during the A-BFT period (S104) (omitted from illustration in FIGS. 33A and 33B). Note that the STA 100 may transmit SSW frames for sector sweeping. That is to say, the STA 100 may transmit one or more SSW frames while switching the transmission sector for each SSW frame and switching the transmission direction of wireless signals (SSW frames). This is referred to as responder BFT, since the STA 100 performs sector sweeping in response to sector sweeping by the AP/PCP 300 using DMG beacons. Also, the STA 100 may decide the best sector for the AP/PCP 300 based on the reception quality of DMG beacons received during the BTI, and include information of the best sector (e.g., sector ID) in a SSW frame and transmit.

In a case where the AP/PCP 300 has not received the SSW frame from S104 (S105: NO), the flow skips transmission of the SSW-FB frame to the STA 100 and advances to S201. Cases where the SSW frame is not received here may include a case where there is a reception error, and/or a case where the reception power is lower than a threshold value.

In a case of having received the SSW frame from S104 (S105: YES), the AP/PCP 300 determines the best sector for the STA 100, and stores information of the best sector in memory, in preparation for communication with the STA 100 (S106).

Next, the AP/PCP 300 transmits an SSW-FB frame to the STA 100 (S107). Note that the AP/PCP 300 may transmit the SSW-FB frame to other STAs that have received the SSW frame. The AP/PCP 300 may also transmit the SSW-FB frame using the best sector notified by the SSW frame. The AP/PCP 300 may also include information of the best sector of the STA 100 in the SSW-FB frame and transmit.

On the other hand, in a case where the STA 100 has not received the SSW-FB frame from S107 corresponding to the SSW frame transmitted in S104 (S108: NO), the flow advances to S201 in order to perform beamforming in the DTI.

In a case of having received the SSW-FB frame from S107 corresponding to the SSW frame transmitted in S104 (S108: YES), the STA 100 stores information of the best sector included in the SSW-FB frame, in preparation for communication with the AP/PCP 300 (S109).

In a case of having completed S207 or S109, the STA 100 judges that initial BFT between the AP/PCP 300 and the STA 100 has been completed (successful) (S208). That is to say, the STA 100 judges that communication can be performed with the AP/PCP 300 using the best sector. Note that at this point, discovery has not been completed yet.

Next, the STA 100 transmits a probe request to the AP/PCP 300 during the DTI (S209).

On the other hand, the AP/PCP 300 receives the probe request from S209 during the DTI, and in a case of having judged that there is no reception error, transmits an ACK frame to the STA 100 after SIFS (3 μsec) (S210).

The AP/PCP 300 then transmits a probe response (S211). Note that the AP/PCP 300 may include information of the best sector for the STA 100 in the probe response and transmit.

On the other hand, the STA 100 receives the probe response from S211, and in a case of having judged that there is no reception error, transmits an ACK frame after SIFS (3 μsec) (S212).

Next, the STA 100 stores in memory the AP/PCP 300 included in the probe response and information of the BSS that the AP/PCP 300 manages (scan results) (S213). Note that the MAC processor of the STA 100 may notify the host controller of the scan results.

The STA 100 then completes the above-described discovery regarding the AP/PCP 300 (S214). The STA 100 may transmission to S101 and repeat discovery on the same wireless channel, or after having switched wireless channels, in order to perform discovery regarding other AP/PCPs (omitted from illustration).

Modification of Second Embodiment

Note that in FIGS. 33A and 33B, the AP/PCP 300 may include a field indicating support of reception of SSW frames including a field indicating a discovery request (DR=1) in the DMG beacon and transmit, during the DTI (see the format of the DMG beacon in FIG. 11).

The STA 100 may include a field or subfield indicating the type of discovery request in an SSW frame and transmit during the DTI (see format of SSW frame in FIG. 13).

The STA 100 may include a field or subfield indicating a TRN-R subfield count in the SSW frame and transmit during the DTI (see format of SSW frame in FIG. 15). The AP/PCP 300 may add a TRN field including TRN-R subfields of a count corresponding to the value of the Number of TRN-Rs subfield to a probe response and transmit during the DTI (see Probe Response frame in FIG. 15).

The STA 100 may include a SIFS turnover field or subfield in an SSW frame and transmit during the DTI (see format of SSW frame in FIG. 17).

The STA 100 may also transmit a Short SSW packet including a Discovery Request field during the DTI, instead of an SSW frame (see format of Short SSW packet in FIG. 21).

The AP/PCP 300 may also include a Discovery Request Ack field indicating that an SSW frame including DR=1 has been received, in an SSW-FB frame and transmit, during the DTI.

The AP/PCP 300 may include information requesting a probe response from the STA 100 in a probe response and transmit, in the second embodiment (see FIG. 30). In a case of having received a probe response including information requesting a probe response during the DTI, the STA 100 acquires a transmission opportunity (TXOP), and transmits the probe response to the AP/PCP 300.

The AP/PCP 300 may add a TRN field including a TRN-R subfield in a probe response and transmit during the DTI (see FIG. 31). The STA 100 may perform reception sector training by receiving TRN-R subfields while switching the reception sector for each TRN-R subfield during the DTI.

In a case where no A-BFT period has been scheduled (FIGS. 33A and 33B), and in a case where BFT during the A-BFT period is not completed, the communication apparatus (STA 100) transmits SSW frames including a field indicating a discovery request (DR=1) during the DTI, changing the transmission sector for each SSW frame. In a case of having received an SSW frame including a field indicating a discovery request (DR=1), the communication apparatus (AP/PCP 300) transmits a probe response including information of BFT results to the communication apparatus (STA 100).

Accordingly, even in a case where the communication apparatus (AP/PCP 300) does not transmit an SSW-FB frame, or there is a reception error of the SSW-FB frame (FIG. 33B), the communication apparatus (STA 100) can complete beamforming and discovery. Accordingly, the period required for discovery can be shortened.

By completing beamforming during discovery, the communication apparatus (STA 100) is in a state where communication with the communication apparatus (AP/PCP 300) can be started. Thus, the period required for procedures up to starting data communication can be shortened.

Third Embodiment

An example has been illustrated in the first and second embodiments regarding a case where the STA 100 performs active scanning by receiving DMG beacons transmitted by the AP/PCP 300 (referred to as Discovery Mode=0). In a third embodiment, description will be made regarding a method where the STA 100 transmits DMG beacons to start beamforming, and performs active scanning (referred to as Discovery Mode=1).

Figure 35:
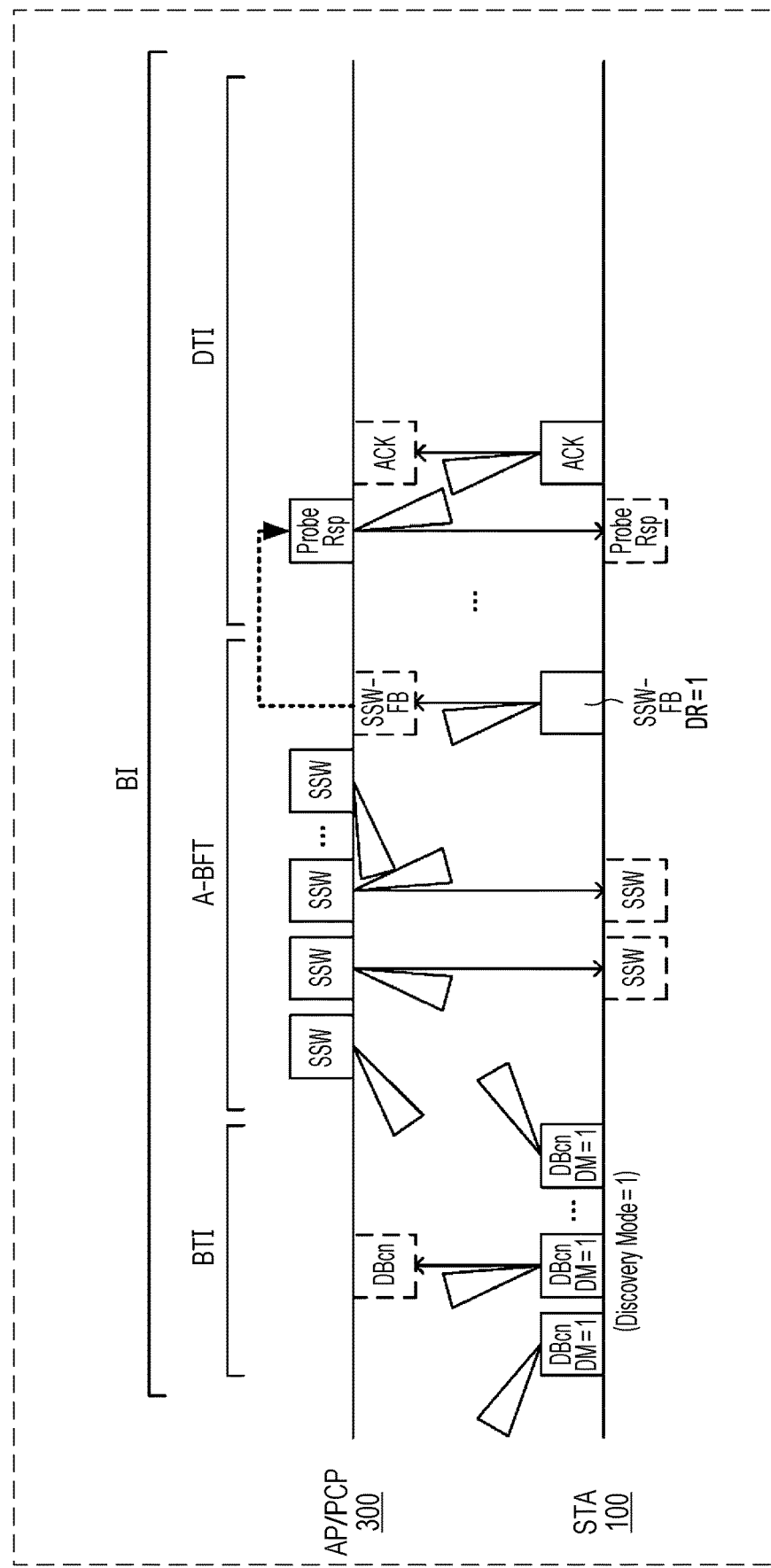
FIG. 35 is a diagram for describing procedures of a STA performing an active scan with regard to an AP/PCP according to a third embodiment.

FIG. 35 is a diagram illustrating an example of procedures of the STA 100 performing active scanning with regard to the AP/PCP 300, according to the third embodiment. The STA 100 transmits DMG beacons with the value of a Discovery Mode field set to 1 during the BTI, switching transmission sectors for each DMG beacon.

The AP/PCP 300 receives a DMG beacon with the value of the Discovery Mode field set to 1 during the BTI. The AP/PCP 300 also measures the reception quality of the received DMG beacon, and selects the best sector for the STA 100.

The AP/PCP 300 transmits SSW frames during the A-BFT period, switching the transmission sector for each SSW frame. The AP/PCP 300 may include information of the best sector of the STA 100 in the SSW frames and transmit.

The STA 100 receives a SSW frame, measures the reception quality of the received SSW frame, and selects the best sector for the AP/PCP 300 based on measurement results.

In a case of having received an SSW frame during the A-BFT period, the STA 100 transmits an SSW-FB frame with the discovery request field set to 1. The STA 100 may include information of the best sector of the AP/PCP 300 in the SSW-FB frame.

In a case of having received an SSW-FB frame with the discovery request field set to 1, the AP/PCP 300 acquires a transmission opportunity (TXOP), and transmits a probe response addressed to the STA 100.

The STA 100 receives the probe response, and replies to the AP/PCP 300 with an ACK frame. Thus, the STA 100 ends discovery of the AP/PCP 300. In this way, when performing active scanning with Discovery Mode=1, the STA 100 transmits an SSW-FB frame including a field indicating a discovery request (DR=1). Accordingly, the STA 100 can receive a probe response with transmission of a probe request omitted, and can reduced time required for discovery.

Figure 36:
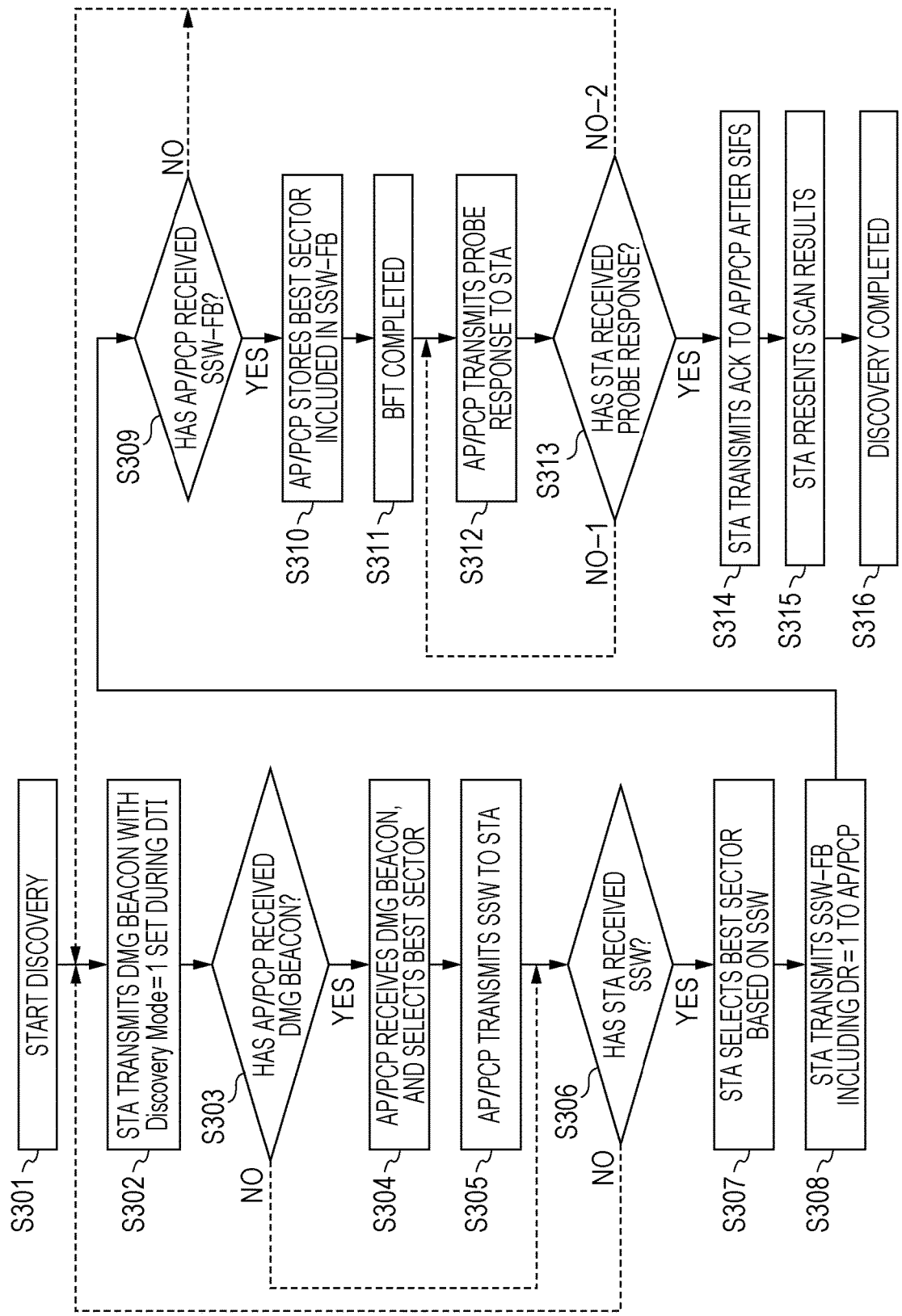
FIG. 36 is a flowchart illustrating an example of procedures of a STA performing discovery by an active scan where Discovery Mode=1.

FIG. 36 is a flowchart illustrating an example of procedures of the STA 100 performing discovery by active scanning with Discovery Mode=1 (FIG. 35).

First, the STA 100 starts discovery (S301).

Next, the STA 100 transmits DMG beacons with the value of the Discovery Mode field set to 1 during the BTI (S302). That is to say, the STA 100 may transmit one or more DMG beacons, switching the transmission direction of wireless signals (DMG beacons) by switching the transmission sector for each DMG beacon. The STA 100 may also include, in the DMG beacon, information elements and fields indicating whether or not A-BFT is scheduled after the BTI, and transmit.

On the other hand, in a case where the AP/PCP 300 does not receive a DMG beacon from S302 during the BTI (S303: NO), the flow advances to S306. In this case, the AP/PCP 300 does not perform transmission of SSW frames in S305 which will be described later.

In a case of having received a DMG beacon from S302 during the BTI (S303: YES), the AP/PCP 300 measures the reception quality of the DMG beacon that has been received, and selects the best sector for the STA 100 in accordance with the measurement results (S304).

Next, the AP/PCP 300 transmits SSW frames to the STA 100 during the A-BFT period (S305). The AP/PCP 300 here may transmit one or more SSW frames, switching the transmission sector for each SSW frame. The AP/PCP 300 may also include information of the best sector for the STA 100 (e.g., reception quality measured in S303) in the SSW frame and transmit. The flow then advances to S306.

In a case where the STA 100 has not received an SSW frame during the A-BFT period in S306 (S306: NO), the flow returns to S302, and DMG beacons may be retransmitted. This case of not receiving an SSW frame may include a case of the AP/PCP 300 not transmitting the SSW frames of S305, and/or a case where the STA 100 does not receive a SSW frame in S306 due to contention with transmission by other STAs or insufficient reception sensitivity. Note that in a case of having retransmitted DMG beacons a predetermined number of times, discovery on the current wireless channel, or discovery with regard to the AP/PCP 300, may be ended by the STA 100.

In a case of having received an SSW frame during the A-BFT period in S306 (S306: YES), the STA 100 selects the best sector for the AP/PCP 300, and stores information of the best sector in memory, to be used for communication with the AP/PCP 300 (S307).

Next, the STA 100 transmits an SSW-FB frame where the field indicating a discovery request has been set to 1 (DR=1) during the A-BFT period (S308). The STA 100 here may transmit the SSW-FB frame using the transmission best sector for the STA 100 notified from the AP/PCP 300 by an SSW frame. The STA 100 may also include information of the best sector for the AP/PCP 300 in the SSW-FB frame.

On the other hand, in a case where the AP/PCP 300 has not received the SSW-FB frame from S308 during the A-BFT period (S309: NO), the flow returns to S302, and the AP/PCP 300 stands by for reception.

In a case of having received the SSW-FB frame from S308 (S309: YES) during the A-BFT period, the AP/PCP 300 stores in memory information of the transmission best sector for the AP/PCP 300 included in the SSW-FB frame, for use in communication with the STA 100 (S310).

Next, the AP/PCP 300 judges that the BFT of itself between the AP/PCP 300 and STA 100 has been completed (S311).

Next, in a case where the field indicating a discovery request has been set to 1 (DR=1) in the SSW-FB frame received in S309, the AP/PCP 300 transmits a probe response to the STA 100 during the DTI (S312).

In a case where the STA 100 does not receive the probe response from S312 during the DTI (S313: NO-1), the flow returns to S312, and the AP/PCP 300 may retransmit the probe response. Cases where the STA 100 does not receive the probe response here include, for example, a case where the STA 100 has not transmitted an ACK frame to the AP/PCP 300. In a case where the STA 100 does not receive the probe response in S313 (S313: NO-2), the flow returns to S302, and the STA 100 may reattempt transmission of DMG beacons.

In a case of having received the probe response during the DTI (S313: YES), the STA 100 transmits an ACK frame to the AP/PCP 300 (S314).

Next, the MAC processor (see FIG. 8) of the STA 100 notifies the host controller of the scan results (e.g., information of the AP/PCP 300 included in the probe response, and reception quality) (S315).

The STA 100 then judges that discovery of the AP/PCP 300 has been completed (S316).

Note that in the third embodiment (FIG. 35), one of the Reserved bits included in the SSW-FB frame according to the 11ad standard may be changed into a field indicating a discovery request, and used.

In a case of performing discovery by active scanning with Discovery Mode=1, in step S308 the STA 100 includes the field indicating a discovery request in the SSW-FB frame, sets the value of the field to 1, and transmits. In a case of having received an SSW-FB frame including DR=1, the AP/PCP 300 transmits a probe response to the STA 100. Accordingly, the STA 100 can complete discovery of the AP/PCP 300 while omitting transmission of a probe request, and thereby can shorten the time required for discovery.

Modifications of Third Embodiment

Modification 3-1

Note that in FIG. 35, the AP/PCP 300 may include a field requesting a probe response from the STA 100 in a probe response and transmit, in the same way as in FIG. 30. In a case of having received the probe response including the field requesting a probe response from the AP/PCP 300, the STA 100 may acquire a transmission opportunity and transmit a probe response to the AP/PCP 300.

Instead of including a field indicating a discovery request (DR=1) in a SSW-FB frame and transmitting during the A-BFT period illustrated in FIG. 35, the STA 100 may include a field indicating a discovery request (DR=1) in a DMG beacon and transmit during the BTI illustrated in FIG. 35.

Figure 37:
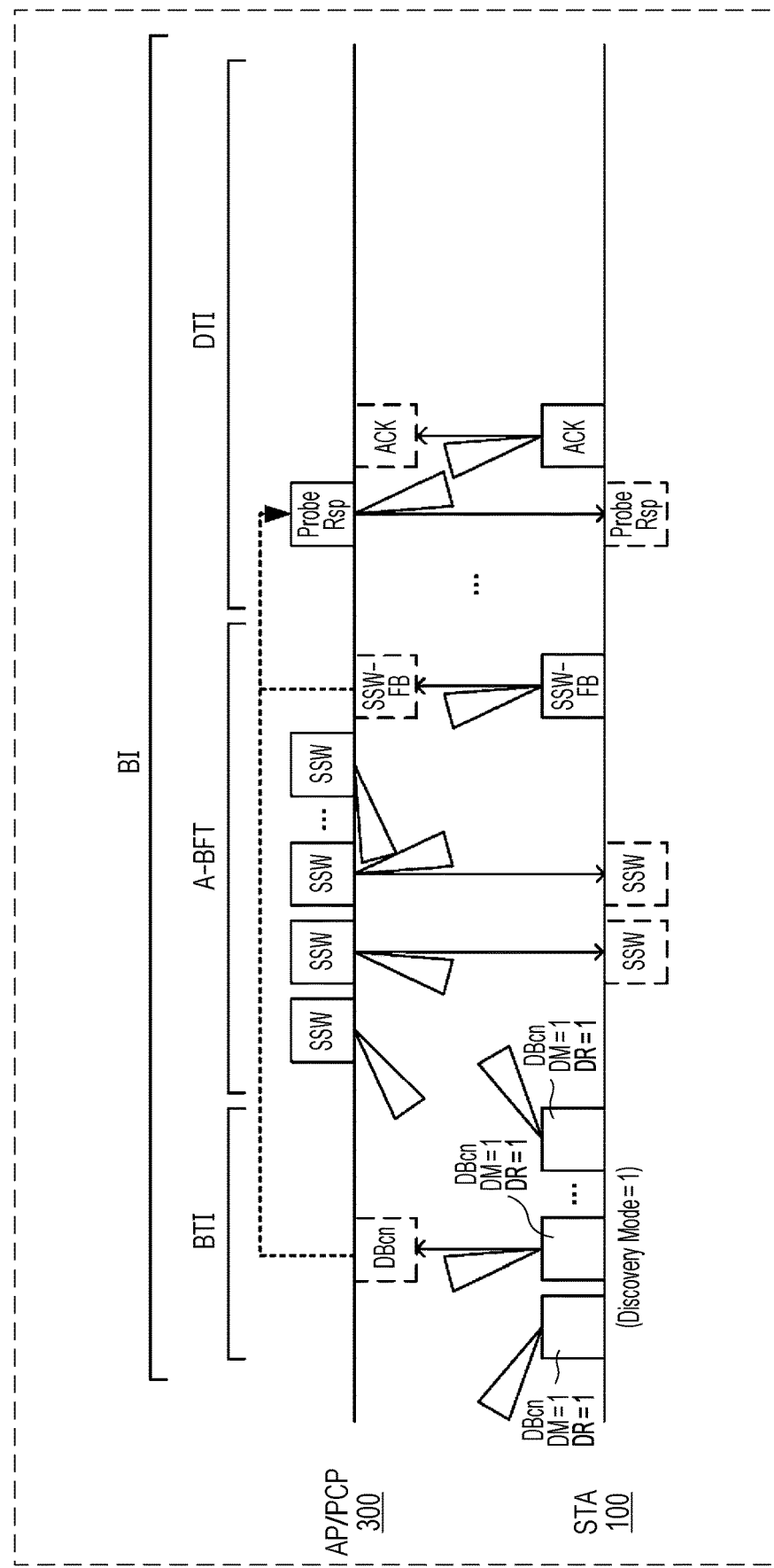
FIG. 37 is a diagram illustrating an example of procedures of a STA performing an active scan with regard to an AP/PCP.

FIG. 37 is a diagram illustrating an example of procedures of the STA 100 performing active scanning with regard to the AP/PCP 300. The STA 100 transmits DMG beacons including a field indicating a discovery request (DR=1) during the BTI.

In a case where a DMG beacon received during the BTI includes DR=1, the AP/PCP 300 transmits SSW frames during the A-BFT period, and after having received an SSW-FB frame acquires a transmission opportunity (TXOP), and transmits a probe response addressed to the STA 100 during the DTI.

In the modification 3-1, one of the Reserved bits included in the DMG beacon according to the 11ad standard may be changed into a field indicating a discovery request, and used.

As a separate method, the DMG beacon is stipulated as being extensible in the 11ad standard, so the field indicating a discovery request can be added by extension, without using the Reserved bits. Accordingly, there is no decrease in the Reserved bits of the SSW-FB frame in comparison with the third embodiment (FIG. 35), so the Reserved bits can be secured for future extension.

Modification 3-3

The STA 100 may transmit a DMG beacon including a field indicating a discovery request (DR=1) and an element indicating a discovery standard (a Requested SSID element, as one example) during the BTI, instead of transmitting an SSW-FB frame including a field indicating a discovery request (DR=1) during the A-BFT period.

Figure 38:
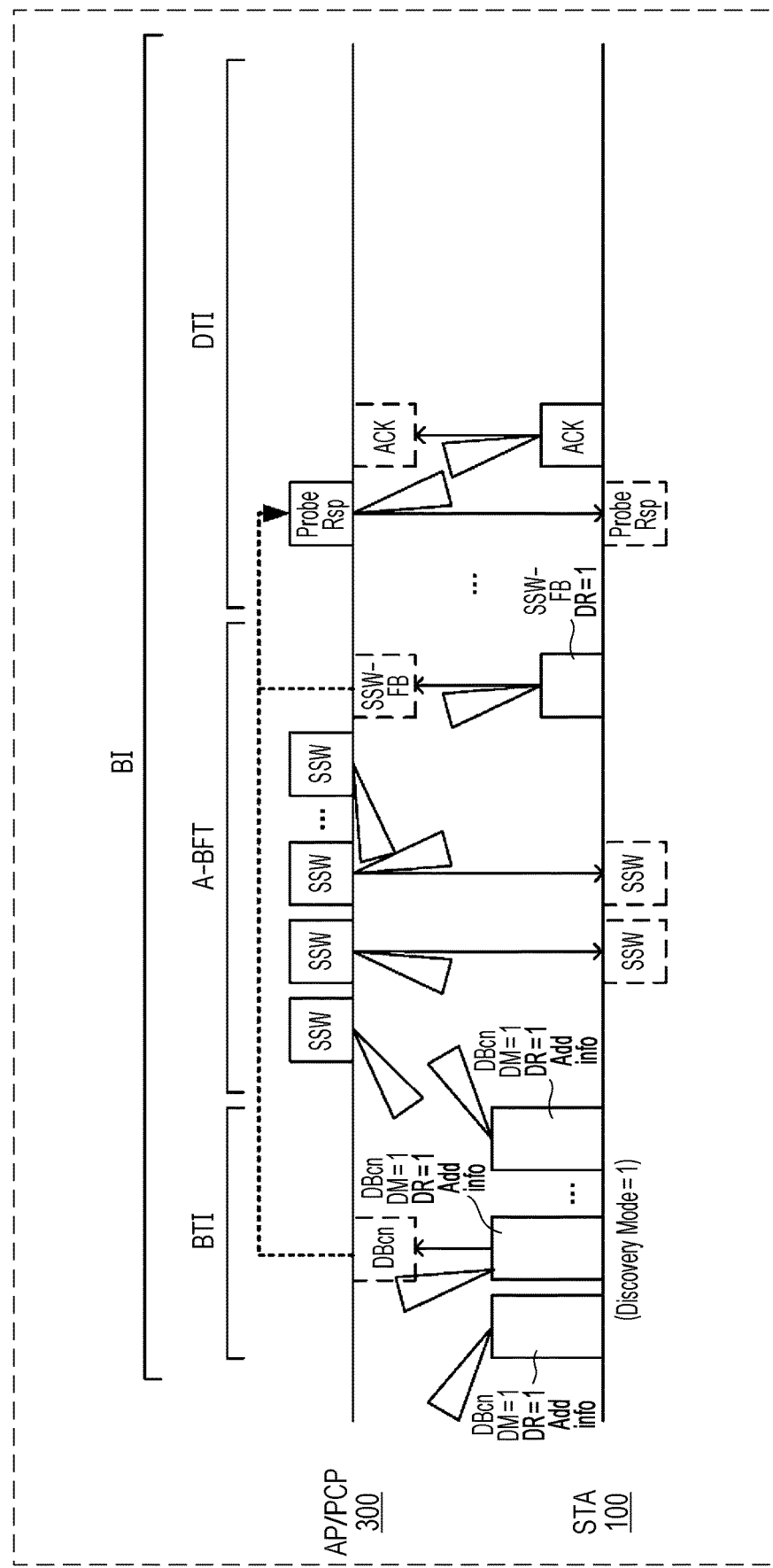
FIG. 38 is a diagram illustrating an example of procedures of a STA performing an active scan with regard to an AP/PCP.

FIG. 38 is a diagram illustrating an example of procedures of the STA 100 performing active scanning with regard to the AP/PCP 300. In a case of receiving an SSW-FB frame during the A-BFT period, the DMG beacon received during the BTI including DR=1, and the discovery standard being satisfied, the AP/PCP 300 acquires a transmission opportunity (TXOP), and transmits a probe response addressed to the STA 100.

Figure 39:
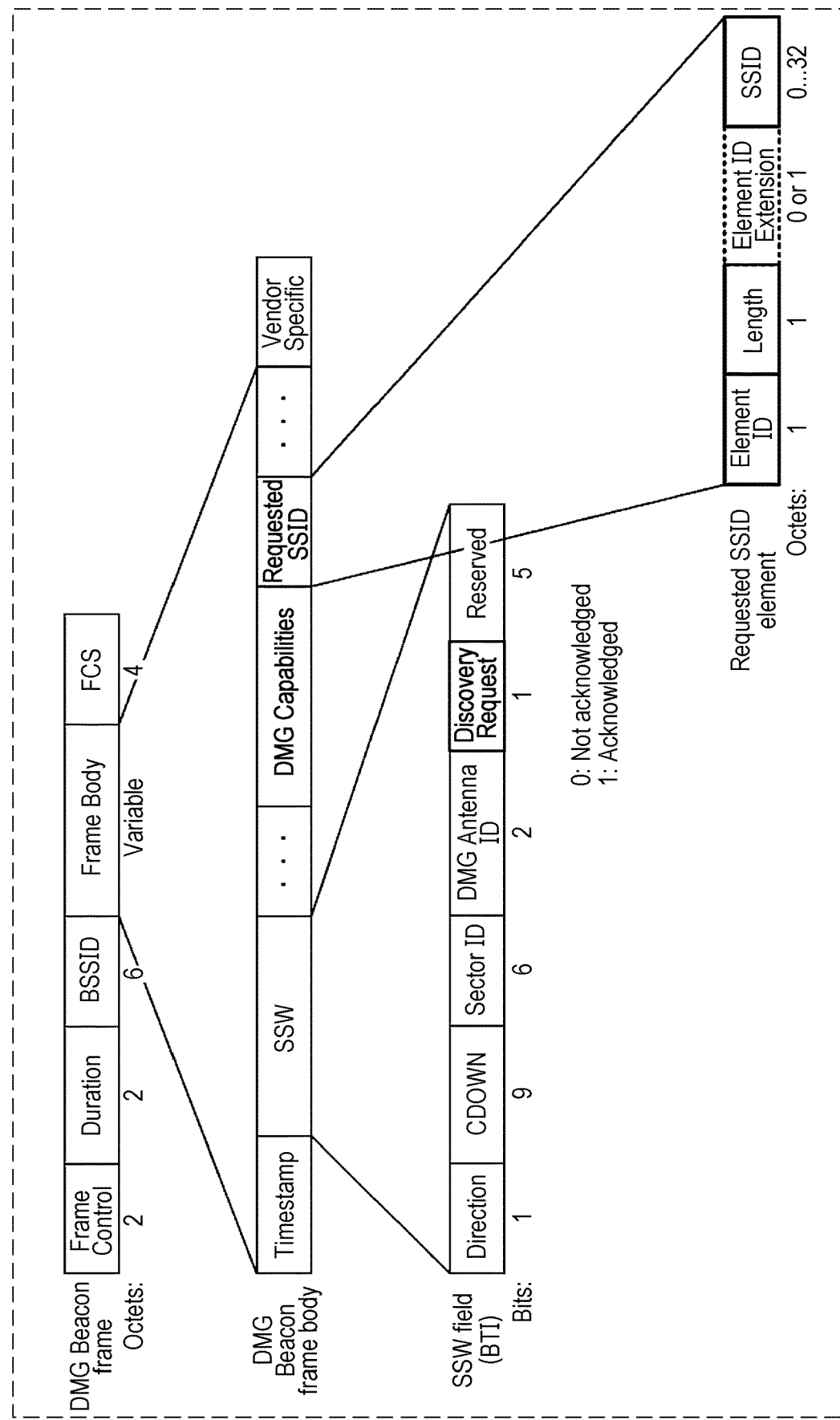
FIG. 39 is a diagram illustrating an example of a format of a DMG beacon.

FIG. 39 is a diagram illustrating an example of the format of a DMG beacon. One Reserved bit in the SSW field is used as a Discovery Request field in FIG. 39, as compared to the DMG beacon field according to the 11ad standard. In a case of setting the value of the Discovery Request field to 1, the STA 100 may include a Requested SSID element not stipulated by the 11ad standard in the DMG beacon and transmit.

A Requested SSID element includes information regarding an AP/PCP that is the object of discovery. For example, a Requested SSID element includes an SSID field, and includes the SSID value of the AP/PCP. A Requested SSID element may include a Short SSID field.

The STA 100 may also include a DMG Capabilities element in a DMG beacon and transmit.

Although a DMG Capabilities element may be included in a DMG beacon in the 11ad standard, consumption of wireless resources necessary for transmitting DMG beacons increases in a case where a STA that has a great number of sectors (e.g., the AP/PCP 300) uses the DMG Capabilities element, which is inefficient.

Note that in a case where the STA 100 has a smaller number of sectors as compared to the AP/PCP 300, the STA 100 may include the DMG Capabilities element in a DMG beacon where Discovery Mode=1. This suppresses increase in consumption of wireless resources, and the AP/PCP 300 can omit transmission of a probe request to the STA 100 when obtaining information relating to the STA 100 (included in the DMG Capabilities element).

Note that the STA 100 may transmit a DMG beacon including information restricting discovery objects (e.g., BSS Type, Short SSID, and RSN Info, in FIG. 23) instead of the Requested SSID element, or in addition to the Requested SSID element.

Thus, the STA 100 transmits a Discovery Mode=1 DMG beacon including information regarding discovery standard, so responses from AP/PCPs of BSSs not matching the application, or from unspecified AP/PCPs during the A-BFT period can be avoided. Accordingly, contention during the A-BFT period can be avoided, and increase in discovery time due to failed reception of SSW frames can be suppressed.

Modification 3-4

Figure 40:
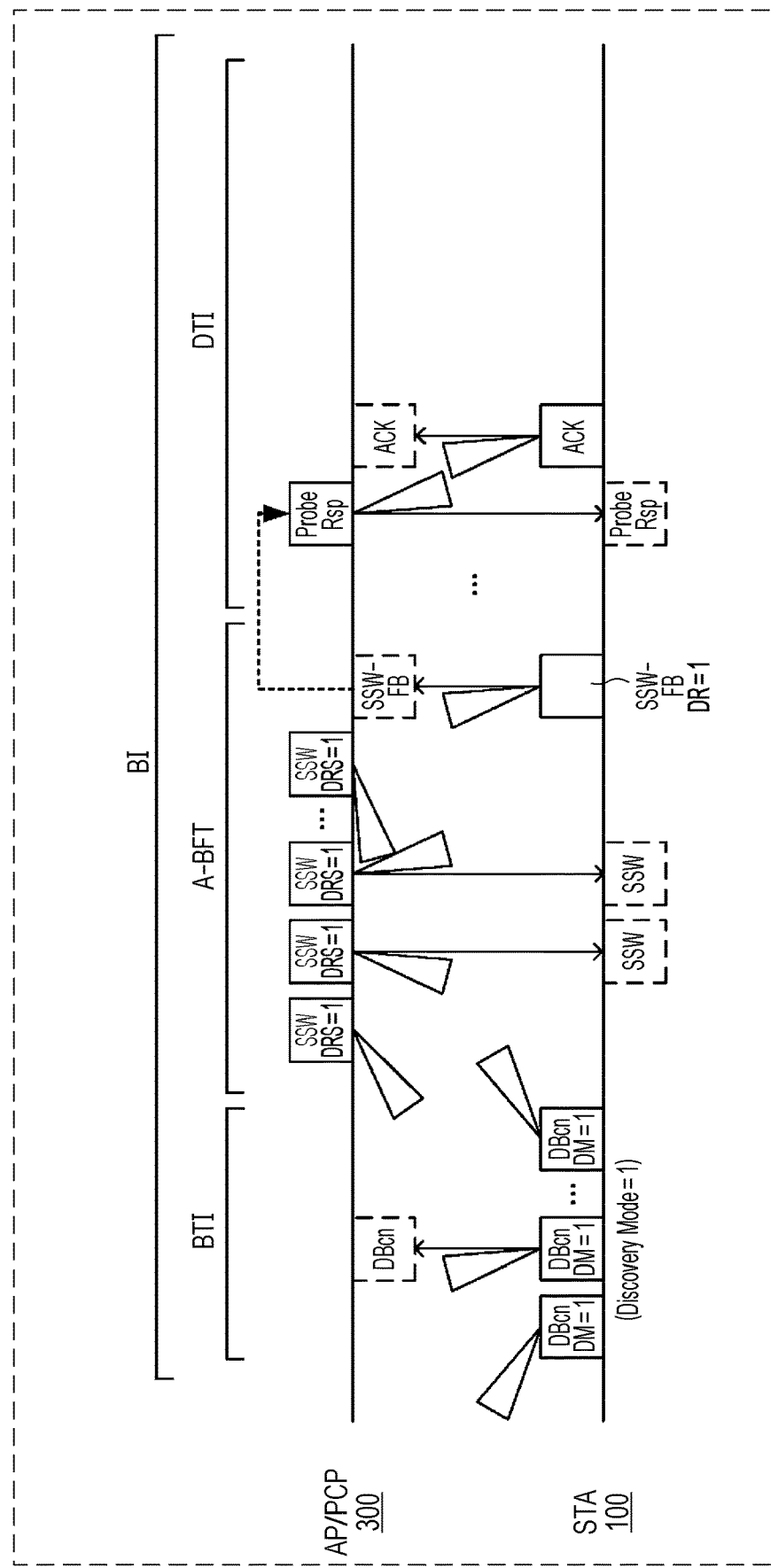
FIG. 40 is a diagram illustrating an example of procedures of a STA performing an active scan with regard to an AP/PCP.

The AP/PCP 300 may transmit SSW frames including a field indicating whether or not response to a field indicating a discovery request (DR=1) in a SSW-FB frame transmitted by the STA 100 during the A-BFT period is supported or not. FIG. 40 is a diagram illustrating an example of procedures of the STA 100 performing active scanning with regard to the AP/PCP 300.

The AP/PCP 300 transmits SSW frames including a field (DRS: Discovery Request Supported) indicating whether or not response to a field indicating a discovery request (DR=1) in a SSW-FB frame transmitted by the STA 100 during the A-BFT period is supported or not.

In a case where the value of the DRS field in a received SSW frame is 1, The STA 100 sets the field indicating the discovery request to 1 (DR=1) and transmits the SSW-FB frame during the A-BFT period, and stands by to receive a probe response.

In a case where the value of the DRS field in the received SSW frame is 0 (omitted from illustration), the STA 100 sets the field indicating the discovery request to 0 (DR=0) and transmits the SSW-FB frame during the A-BFT period, and transmits a probe request to the AP/PCP 300, for example, instead of standing by the receive a probe response.

The STA 100 can judge whether or not to standby for reception of a probe response after transmission of the SSW-FB frame in accordance with the value of the DRS included in the SSW frame, so unnecessary standby can be avoided, and time required for discovery can be reduced.

Modification 3-5

The STA 100 may add a control trailer to the SSW-FB frame including the field indicating the discovery request to be set 1 (DR=1) and transmit during the A-BFT period. The control trailer may use the format in FIG. 23 as one example. Description will be omitted here.

Figure 41:
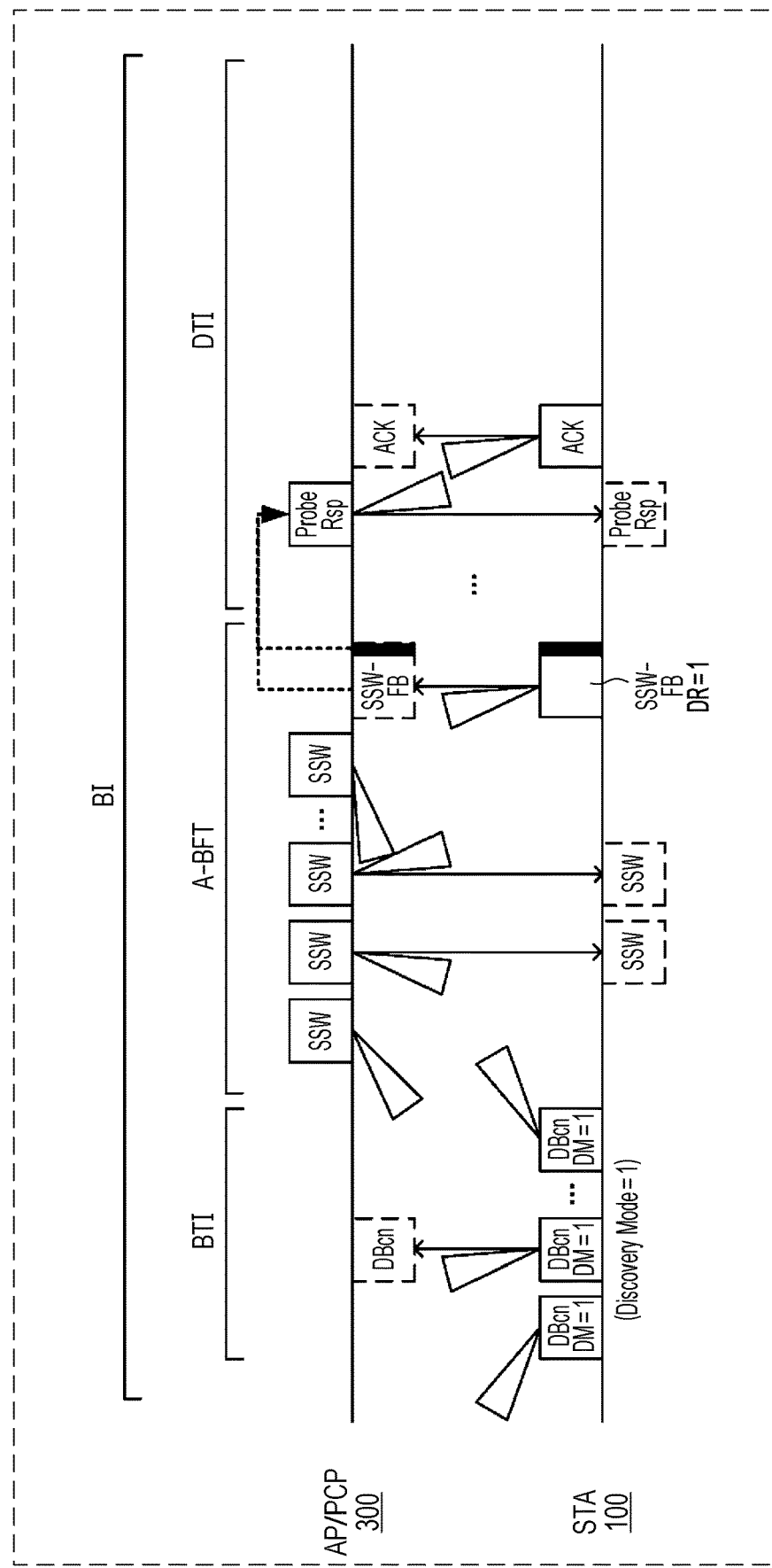
FIG. 41 is a diagram illustrating an example of procedures of a STA performing an active scan with regard to an AP/PCP.

FIG. 41 is a diagram illustrating an example of procedures of the STA 100 performing active scanning with regard to the AP/PCP 300. The AP/PCP 300 receives a SSW-FB frame with a control trailer added during the A-BFT period. In a case where the discovery standard indicated by values in the control trailer matches the AP/PCP 300 (e.g., a case where a Short SSID value matches, a case where BSS Type matches), the AP/PCP 300 may transmit a probe response during the DTI.

Thus, the STA 100 transmits an SSW-FB frame with a control trailer added that includes information relating to discovery standard. Accordingly, transmission of probe responses from AP/PCPs of BSSs not matching the application, or from unspecified AP/PCPs, for example, can be avoided, and occurrence of interference as to other STAs (omitted from illustration) can be reduced. Addition of a control trailer to an SSW-FB frame consumes fewer wireless resources as compared to a case of transmitting unnecessary probe responses, and is efficient.

Thus, in a case of performing active scanning where Discovery Mode=1, the communication apparatus (STA 100) includes a field indicating a discovery request in an SSW-FB frame and transmits. Accordingly, the STA 100 can omit transmission of a probe request, and can avoid occurrence of backoff or retransmission processing where delay is great, so increase in time required for discovery can be avoided.

Fourth Embodiment

A case has been described in the second embodiment where the STA 100 performs sector sweeping in the DTI in a case where the STA does not perform BFT (transmission of SSW frames) during an A-BFT period, and a case where the STA has performed BFT (transmission of SSW frames) during an A-BFT period, but the AP/PCP did not receive a SSW frame due to contention in transmission with other STAs or the like, or a reception error occurred. In a fourth embodiment, a case will be described where the STA 100 transmits DMG beacons where Discovery Mode=1, as one form of sector sweeping in the DTI according to the second embodiment.

Figure 42:
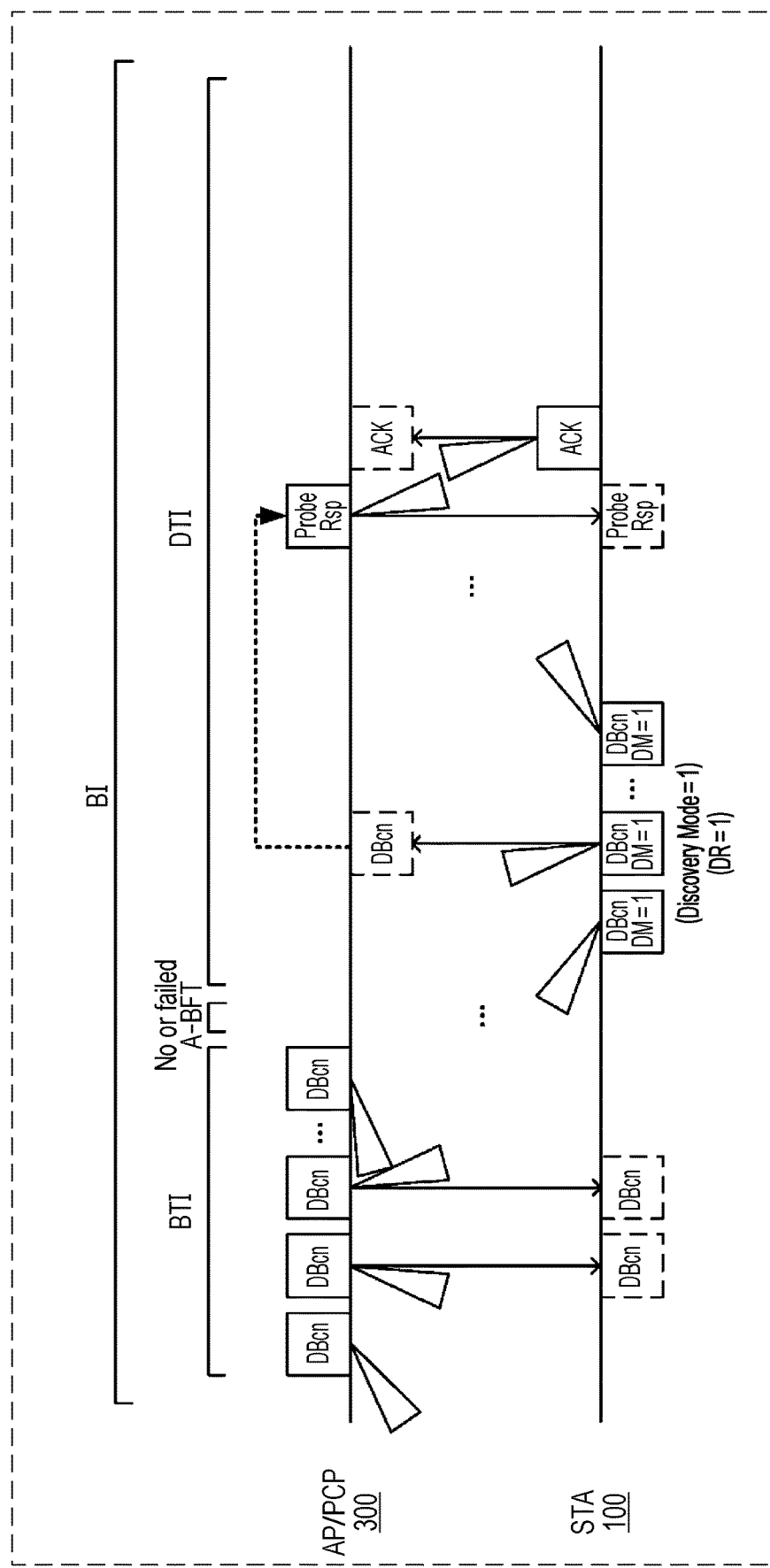
FIG. 42 is a diagram for describing procedures of a STA performing an active scan with regard to an AP/PCP according to a fourth embodiment.

FIG. 42 is a diagram illustrating an example of procedures where the STA 100 performs active scanning regarding the AP/PCP 300. The AP/PCP 300 transmits DMG beacons not including DR=1, changing the transmission sector for each DMG beacon, during the BTI in FIG. 42.

The STA 100 receives the DMG beacon during the BTI in FIG. 42. Note that other STAs (STA 200 that is omitted from illustration) may receive DMG beacons in the same BTI.

In a case where the STA does not perform BFT (transmission of SSW frames) during the A-BFT period, and a case where the STA 100 has performed BFT (transmission of SSW frames) during an A-BFT period, but the AP/PCP 300 did not receive a SSW frame due to contention in transmission with other STAs or the like, or a reception error occurred at the AP/PCP 300, the AP/PCP 300 may omit transmission of the SSW-FB frame and apply the following procedures.

The following procedures may also be applied in a case where the STA 100 has transmitted an SSW frame not including DR=1 during the A-BFT period, and the AP/PCP 300 has transmitted an SSW-FB frame but the STA 100 was not able to receive it.

The STA 100 transmits DMG beacons including a field indicating a discovery request (DR=1), changing the transmission sector for each DMG beacon. The STA 100 includes the best sector of the AP/PCP 300 in the DMG beacons and transmits.

Figure 43:
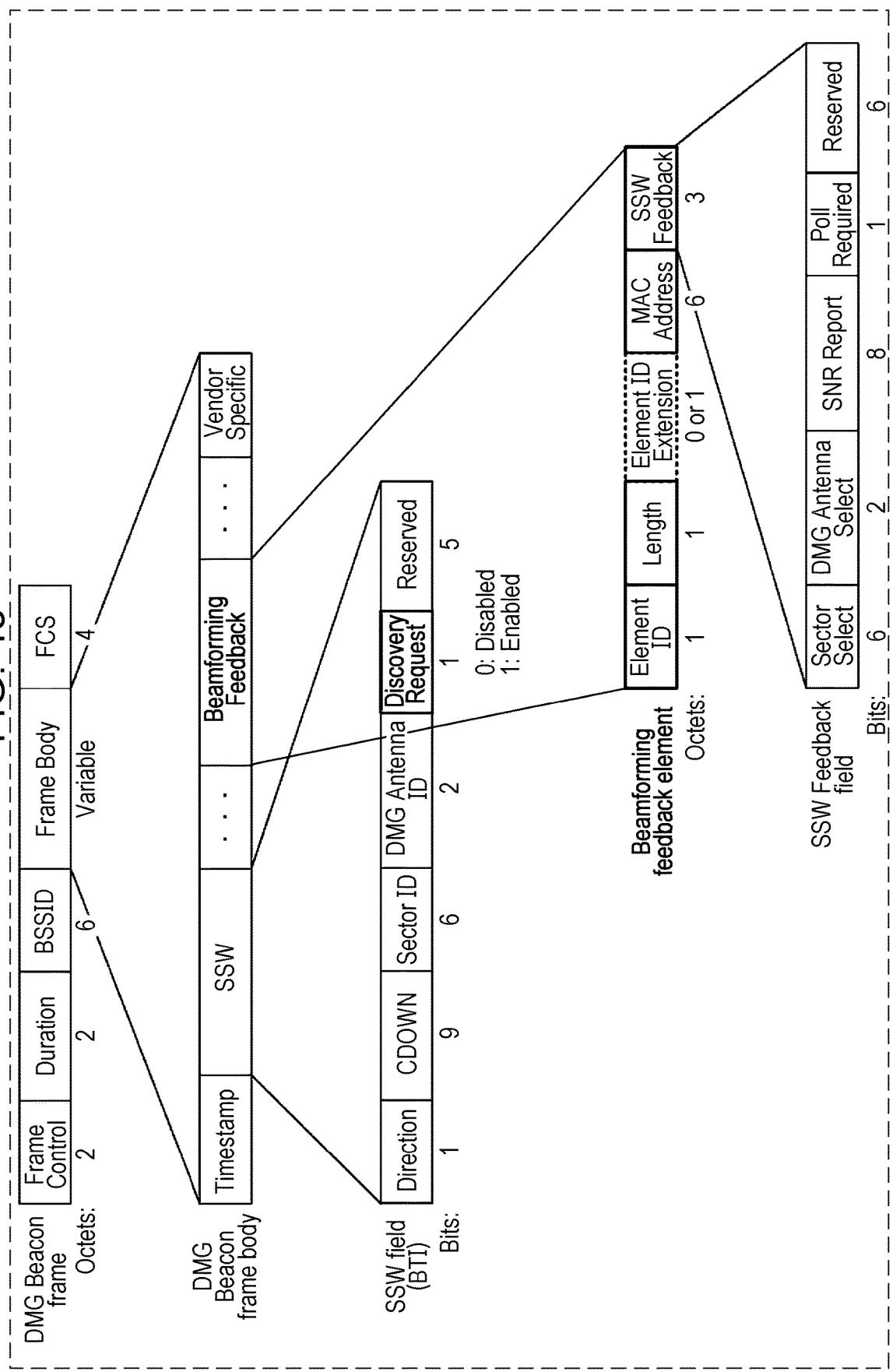
FIG. 43 is a diagram illustrating an example of a format of a DMG beacon.

FIG. 43 is a diagram illustrating an example of the format of a DMG beacon. The DMG beacon includes an SSW field for example, and includes a Discovery Request field.

The DMG beacon also includes a Beamforming Feedback element. The Beamforming Feedback element includes fields identifying the element (e.g., Element ID, Length, and Element ID Extension field), MAC address field indicating the MAC address of the AP/PCP 300, and a SSW Feedback field including beamforming feedback information.

The SSW Feedback field may include the same subfields as the SSW Feedback field in the 11ad standard. The description of FIG. 4 may be referenced for description of the subfields. Accordingly, description will be omitted here.

The STA 100 includes the Beamforming Feedback element in a DMG beacon where Discovery Mode=1. Accordingly, the STA 100 can made notification of beamforming feedback information (e.g., content of SSW Feedback field) of the STA (e.g., AP/PCP 300) that the MAC address field indicates.

Figure 44:
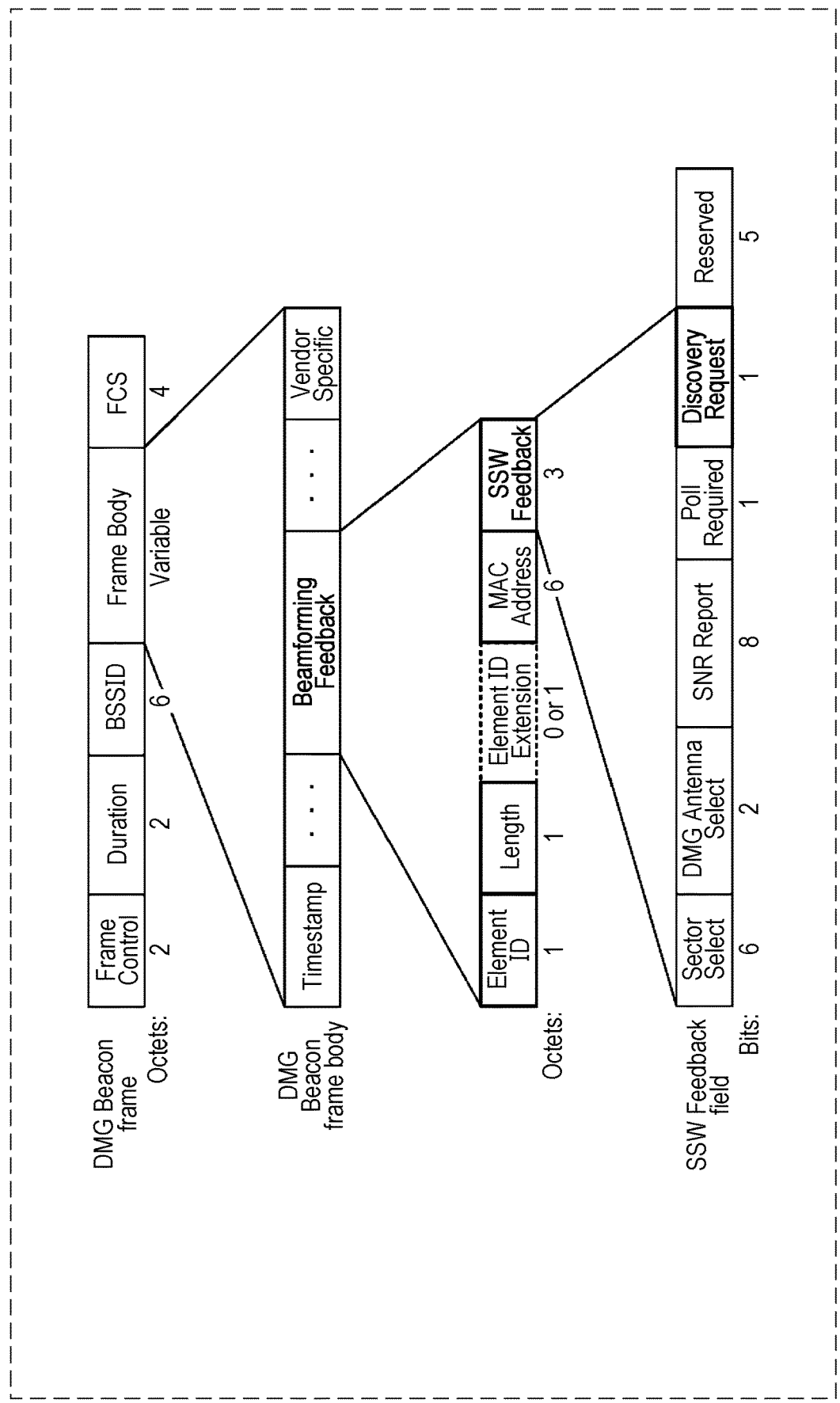
FIG. 44 is a diagram illustrating a different example of a format of a DMG beacon.

FIG. 44 is a diagram illustrating another example of the format of a DMG beacon. Unlike FIG. 43, the Discovery Request field is included in the SSW Feedback field of the Beamforming Feedback element in FIG. 44. Accordingly, the format of the SSW Feedback field is the same as that illustrated in FIG. 4, so reception processing at the AP/PCP 300 is facilitated.

In the DTI in FIG. 42, the AP/PCP 300 receives a DMG beacon including a field indicating a discovery request (DR=1) and information of the best sector, and sets the transmitting antenna to the best sector based on the information of the best sector that has been received, for communication with the STA 100.

The AP/PCP 300 transmits a probe response to the STA 100 during the DTI. The STA 100 receives the probe response and completes discovery.

The STA 100 receives a DMG beacon from the AP/PCP 300 during the BTI, and in a case BFT is not completed during the A-BFT period, transmits a DMG beacon including a field indicating a discovery request (DR=1) including information of the best sector during the DTI. Accordingly, the AP/PCP 300 can acquire information of the best sector during the DTI, and can transmit a probe response while omitting transmission of the SSW frame and reception of the SSW-FB frame (see third embodiment).

Accordingly, even in a case where BFT as to the AP/PCP 300 is not completed during the A-BFT period, the STA 100 can avoid increase in time required for discovery.

Figure 45:
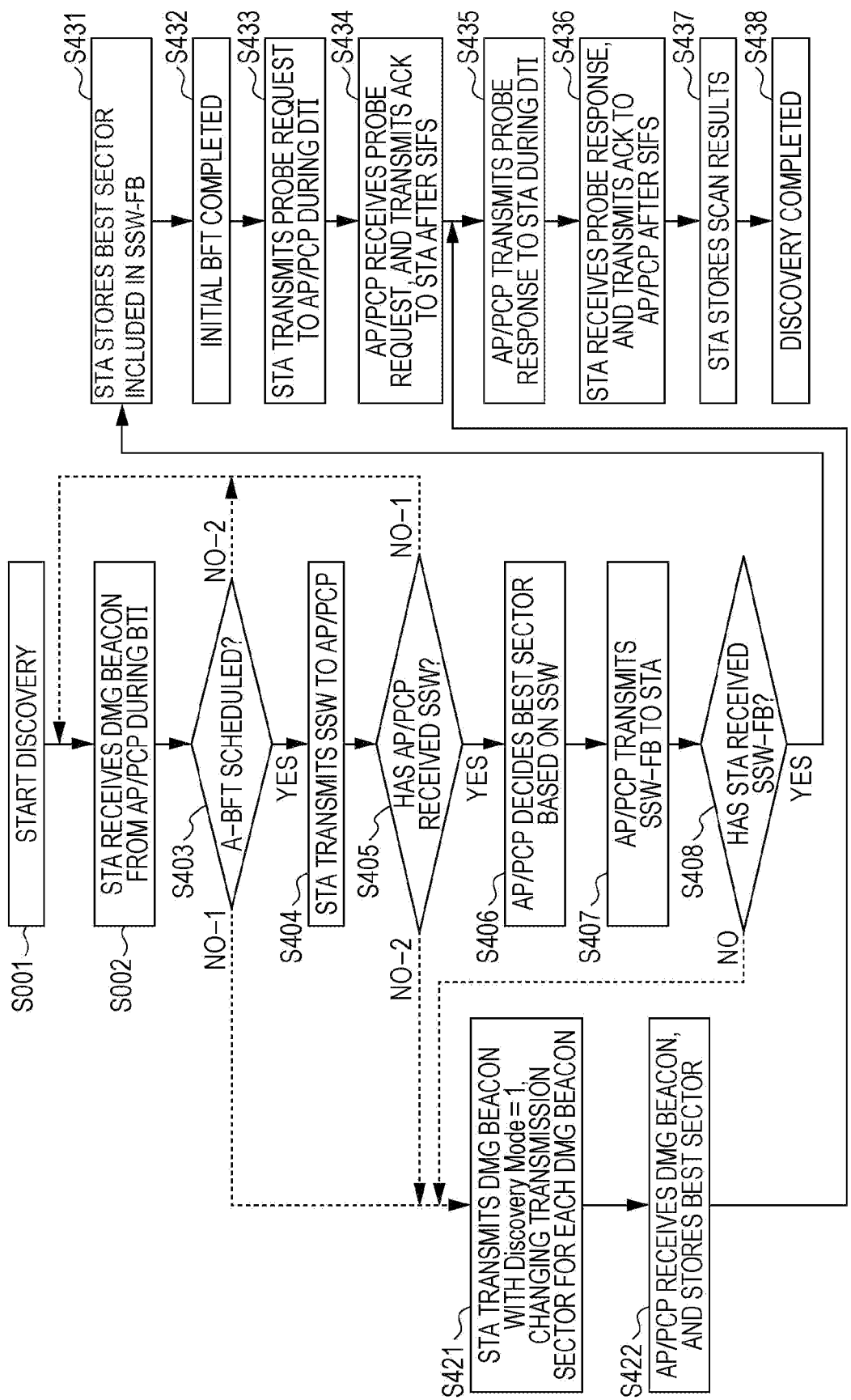
FIG. 45 is a flowchart illustrating an example of procedures of a STA performing discovery.

FIG. 45 is a flowchart illustrating an example of procedures for the STA 100 to perform discovery. Processes that are the same as in FIG. 7 (first embodiment) are denoted by the same numbers, and description will be omitted.

First, the STA 100 starts discovery (S001). Next, the STA 100 receives a DMG beacon during the BTI (S002).

In a case where no A-BFT period has been scheduled (S403: NO-1), the STA 100 transitions to S421 in order to transmit a DMG beacon where Discovery Mode=1. S421 will be described later. Note that the STA 100 may return to S002 in order to await the next BTI, in the same way as in the first embodiment (see S403: NO-2 in FIG. 45, and the DTI in FIG. 42).

Next, in a case where an A-BFT period is scheduled (S403: YES), the STA 100 transmits an SSW frame (S404). Note that unlike the case in S004 in FIG. 7, the STA 100 does not set DR=1 in the SSW frame here (see A-BFT period in FIG. 2).

In a case where the AP/PCP 300 does not receive the SSW frame from S404 (S405: NO-1), the flow returns to S002 (see A-BFT period in FIG. 2). In this case, the SSW-FB frame (and probe response in S012) are not transmitted to the STA 100. Now, a case where the SSW frame is not received includes a case where there is a reception error, a case where the reception power is lower than a predetermined value, and so forth. In a case where the AP/PCP 300 does not receive the SSW frame from S404 (S405: NO-2), the flow may transition to the later-described S421.

In a case of having received the SSW frame from S404 (S405: YES), the AP/PCP 300 determines the best sector based on the SSW frame (S406). Next, the AP/PCP 300 transmits the SSW-FB frame to the STA 100 (S407) (see A-BFT period in FIG. 2). The flow then advances to S408.

In S408, in a case where the STA 100 has not received the SSW-FB frame from the AP/PCP 300 (S408: NO), the flow transitions to S421 in order to transmit a DMG beacon where Discovery Mode=1 (see A-BFT period in FIG. 2).

In S421, the STA 100 transmits DMG beacons where Discovery Mode=1, changing the transmission sector each DMG beacon (S421) (See the DTI in FIG. 42). Note that the STA 100 may include the best sector information of the AP/PCP 300 in the DMG beacon where Discovery Mode=1, based on the reception quality of the DMG beacon of the AP/PCP 300 received in S002, and transmit. The STA 100 may include scheduling information in the DMG beacon, and set a BTI, A-BFT period, and DTI, that are different from the scheduling (time) set in the DMG beacon by the AP/PCP 300.

On the other hand, the AP/PCP 300 receives the DMG beacon form S421, and stores in memory the best sector information included in the DMG beacon in order to communicate with the STA 100 (S422). Accordingly, the BFT between the STA 100 and AP/PCP 300 is completed (see the DTI in FIG. 42). The AP/PCP 300 then omits transmission of the SSW frame, and transitions to S435 (see the DTI in FIG. 42). This is a point of difference as to the case of the third embodiment.

In S408, in a case of having received an SSW-FB frame from the AP/PCP 300 (S408: YES), the STA 100 stores in memory information of the best sector included in the SSW-FB frame in memory (S431). The STA 100 then judges that initial BFT between the AP/PCP 300 and the own STA 100 has been completed (successful) (S432). The processing of S431 and S432 are the same as the respective processing in S009 and S010 in FIG. 7.

Next, the STA 100 transmits a probe response to the AP/PCP 300 during the DTI (S433).

On the other hand, the AP/PCP 300 receives the probe request, and if there is no reception error, transmits an ACK frame after SIFS (3 μsec) (S434). The processing in this S434 is the same as the processing of S011 in FIG. 7. The flow then advances to S435.

In S435, the AP/PCP 300 transmits a probe response to the STA 100 (S435). Note that the AP/PCP 300 may decide the best sector for the STA 100 by measuring the reception quality of the DMG beacon in S422, and include the best sector information of the STA 100 in the probe response in S435 (see the DTI in FIG. 42).

On the other hand, the STA 100 receives the probe response in S435, and transmits an ACK frame to the AP/PCP 300 after SIFS (3 μsec) (S436).

Next, the STA 100 stores the scan results included in the probe response from S436 in memory (S437). The processing in this S437 is the same as the processing of S015 in FIG. 7.

The STA 100 completes the discovery regarding the AP/PCP 300 (S438). The processing in this S438 is the same as the processing of S016 in FIG. 7. Modifications of Fourth Embodiment Modification 4-1

In FIG. 42, the AP/PCP 300 may receive a DMG beacon including a field indicating a discovery request (DR=1) during the DTI, and include a field indicating response capabilities in a DMG beacon and transmit during the BTI.

Modification 4-2

In a case where best sector information regarding multiple AP/PCPs (omitted from illustration) has already been obtained, the STA 100 may include multiple Beamforming Feedback elements in a DMG beacon during the DTI. The STA 100 can shorten the delay for obtaining a probe response regarding multiple AP/PCPs and complete active scanning at an early stage, by procedures which will be described later.

Modification 4-3

The STA 100 may include an element indicating discovery standards in a DMG beacon, and transmit during the DTI (see modification 3-2 of the third embodiment).

Modification 4-4

The STA 100 may include a field or subfield indicating type of discovery request in a DMG beacon, and transmit during the DTI (see modification 1-2 of the first embodiment, and FIG. 13). The AP/PCP 300 may also include additional information corresponding to the type of discovery request in a probe response, and transmit during the DTI.

Modification 4-5

Note that the STA 100 may transmit a DMG beacon including a field or subfield indicating the TRN-R subfield count during the DTI (see FIGS. 14 and 15). In a case of receiving a DMG beacon including a field indicating a discovery request (DR=1), and including a field or subfield indicating that the TRN-R subfield count is 1 or more, the AP/PCP 300 may transmit a probe response with a TRN-R subfield attached during the DTI.

Modification 4-6

The AP/PCP 300 may transmit a probe response including information requesting the STA 100 for a probe response, during the DTI (see FIG. 30).

Modification 4-7

The AP/PCP 300 may transmit a DMG beacon including information relating to the BSS (e.g., DMG Capabilities of the AP/PCP 300 that is information included in the probe response, information necessary for the STA 100 to complete discovery) during the DTI, instead of the probe response in FIG. 42.

Figure 46:
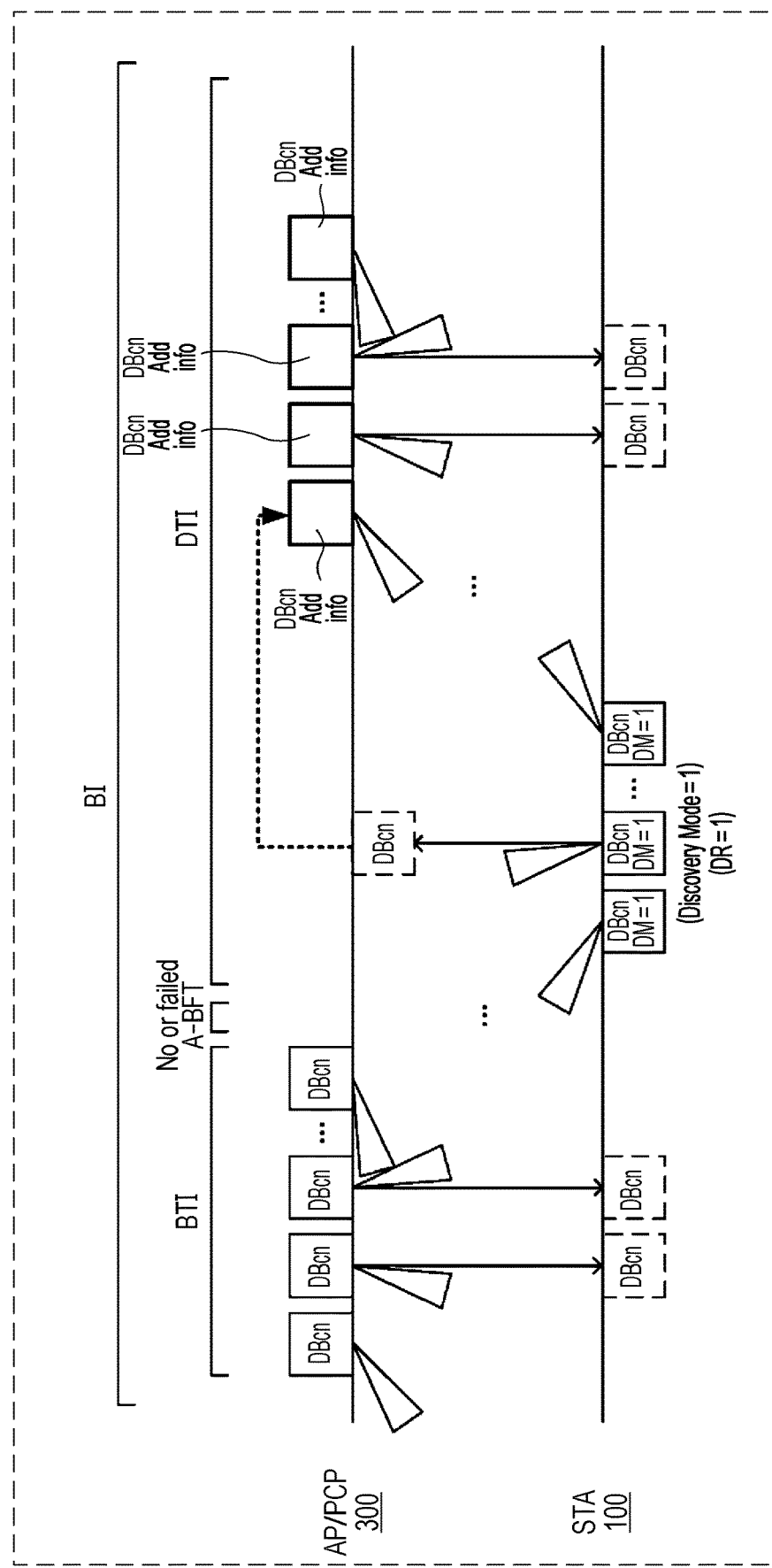
FIG. 46 is a diagram illustrating an example of procedures of a STA performing discovery.

FIG. 46 is a diagram illustrating an example of procedures of the STA 100 performing discovery. The AP/PCP 300 transmits DMG beacons including information regarding the BSS during the DTI, instead of the probe response during the DTI in FIG. 42. The DMG beacon may include part or all of the elements included in the probe response.

The STA 100 acquires information used for discovery of the AP/PCP 300 by receiving the DMG beacon transmitted by the AP/PCP 300 during the DTI, and completes discovery.

Another STA that is omitted from illustration may receive the DMG beacon transmitted by the AP/PCP 300 during the DTI, and thereby omit from the transmission of the DMG beacon by the AP/PCP 300 during the BTI through the transmission of the DMG beacon by the STA 100 during the DTI, and complete discovery.

The AP/PCP 300 may include all information regarding the BSS in the DMG beacon transmitted during the DTI, without including all information regarding the BSS in the DMG beacon transmitted during the BTI (a part may be included).

Now, the AP/PCP 300 repeatedly transmits the DMG beacon during the BTI for each BI (e.g., the number of times of transmission is great), so the amount of consumption of a great amount of wireless resources can be suppressed by not including all information regarding the BSS.

Also, transmission of the DMG beacon during the DTI is performed in a case where a DMG beacon has been received where Discovery Mode=1, so unnecessary transmission of DMG beacons is suppressed, and wireless resources can be efficiently used. For example, in a case where there is no STA performing discovery, transmission of DMG beacons including information regarding the BSS can be avoided.

As described above, in a case where the STA 100 receives a DMG beacon from the AP/PCP 300 during the BTI but BFT is not completed during the A-BFT period, the STA 100 transmits a DMG beacon including a field indicating a discovery request (DR=1) along with including information of the best sector, during the DTI. Thus, the AP/PCP 300 can acquire information of the best sector, omit transmission of the SSW frame and reception of the SSW-FB frame during the A-BFT period (see third embodiment), and transmit a probe response during the DTI.

Accordingly, even in a case where BFT as to the AP/PCP 300 is not completed during the A-BFT period, the STA 100 can avoid increase in time required for discovery.

Also, in a case of the AP/PCP 300 having received a DMG beacon including a field indicating a discovery request (DR=1) during the DTI, transmission of the SSW frame during the DTI is omitted and a probe response is transmitted. Accordingly, increase in interference caused at other STAs (omitted from illustration) due to transmission of SSW frames during the DTI can be avoided.

Fifth Embodiment

Description has been made in the third embodiment regarding procedures where, in a case that the STA 100 transmits a field indicating a discovery request (DR=1) included in a DMG beacon where Discovery Mode=1 during the BTI, and the AP/PCP 300 completes BFT during the A-BFT period, the AP/PCP 300 transmits a probe response during the DTI. Description will be made in a fifth embodiment regarding a method where the AP/PCP 300 includes shortened information regarding the BSS in a SSW frame and Short SSW packet and transmits during the A-BFT period, instead of a probe response, thereby shortening time for discovery at the STA 100.

Figure 47:
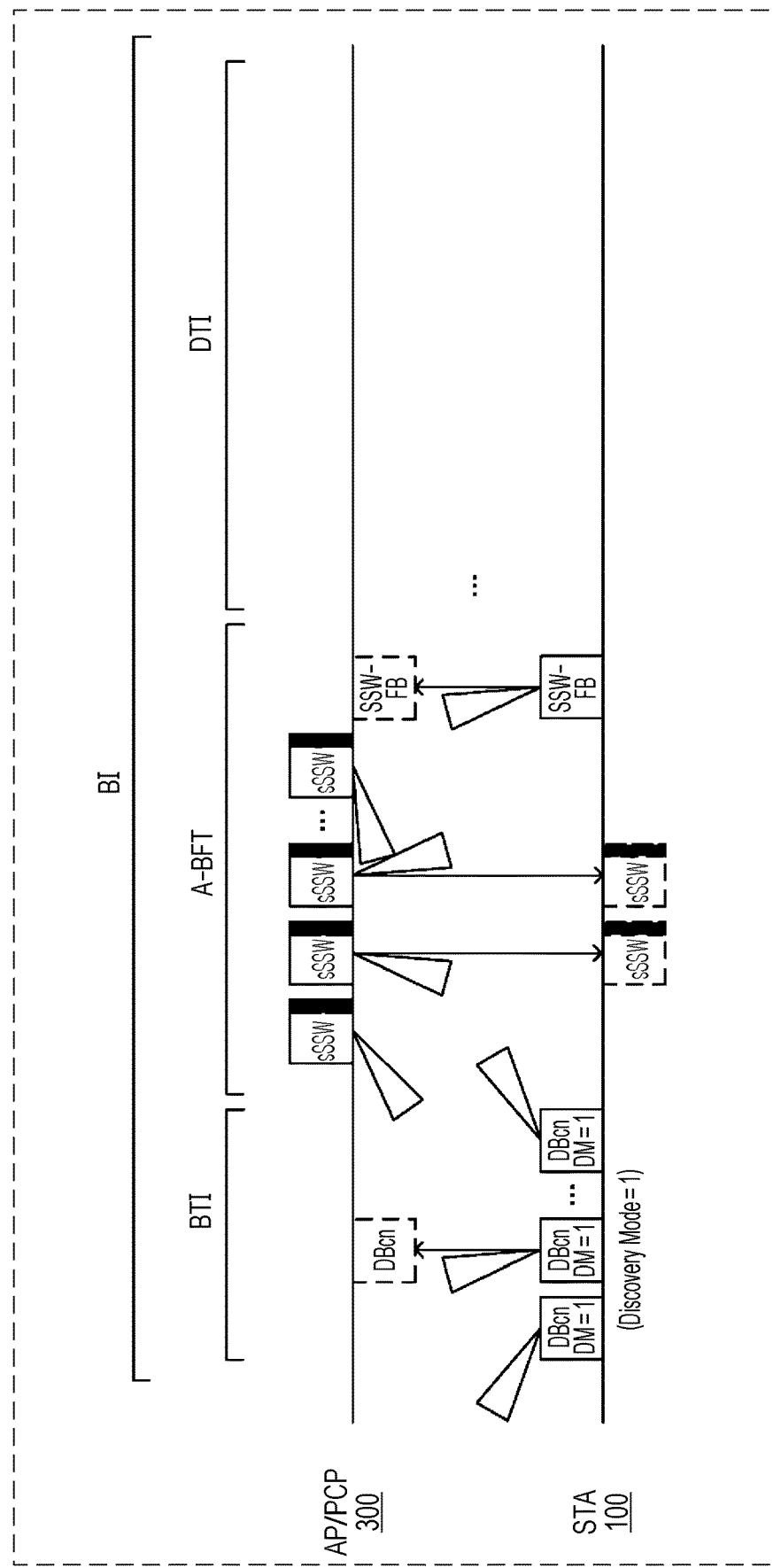
FIG. 47 is a diagram for describing procedures of a STA performing an active scan with regard to an AP/PCP according to a fifth embodiment.

FIG. 47 is a diagram illustrating an example of procedures where the STA 100 performs active scanning regarding the AP/PCP 300 in the fifth embodiment. The STA 100 includes a field indicating a discovery request (DR=1) in a DMG beacon where Discovery Mode=1, and transmits during the BTI. The AP/PCP 300 receives the DMG beacon during the BTI.

In a case of having received the DMG beacon where Discovery Mode=1 including a field indicating a discovery request (DR=1) during the BTI, the AP/PCP 300 includes shortened information regarding the BSS in a SSW frame and Short SSW packet and transmits this during the A-BFT period. Note that in FIG. 47, the AP/PCP 300 transmits Short SSW packets.

Figure 48:
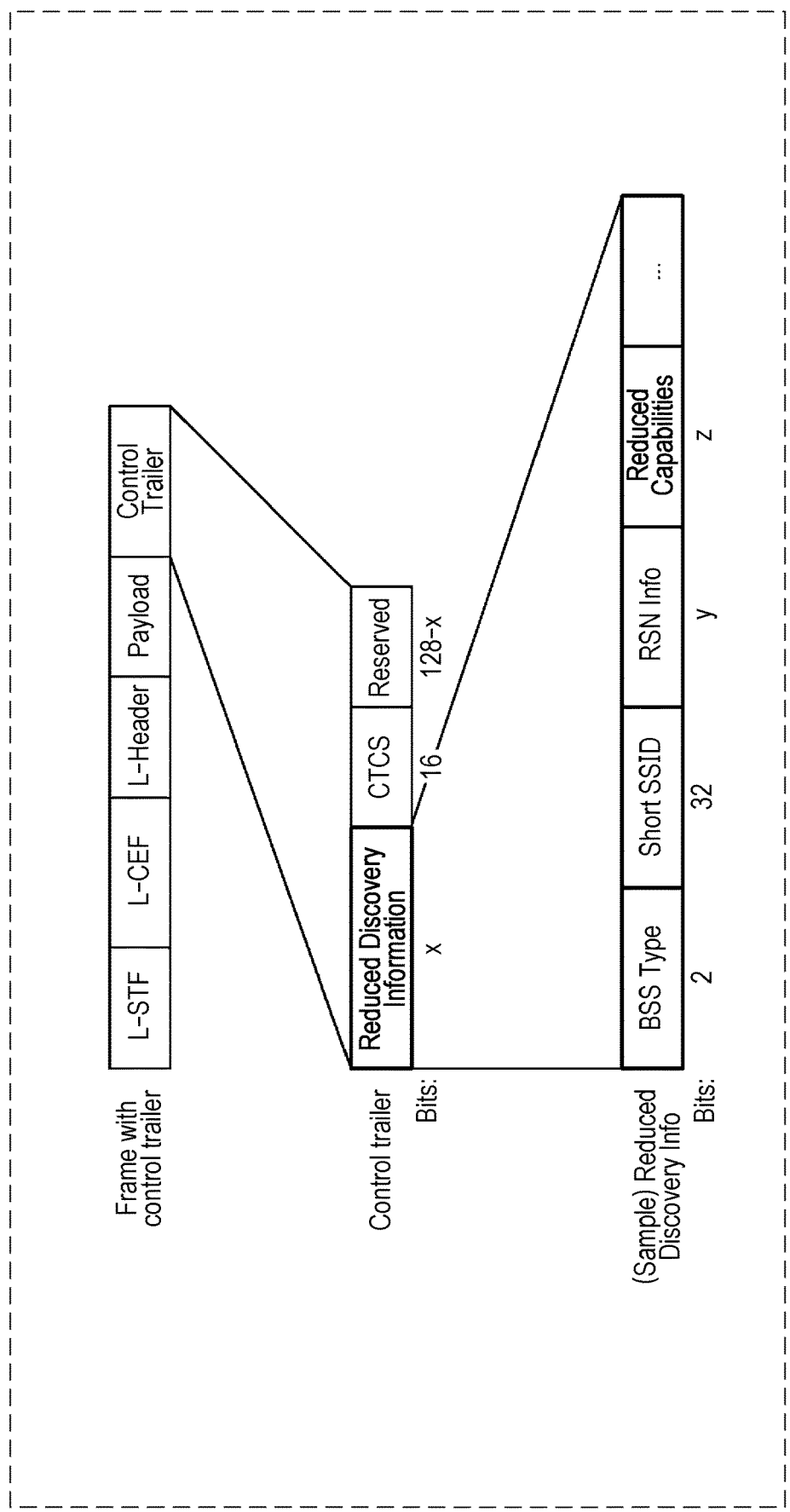
FIG. 48 is a diagram illustrating an example of the format of a Short SSW packet including reduction information relating to basic service set (BSS)

FIG. 48 is a diagram illustrating an example of the format of a Short SSW packet including shortened information relating to the BSS. Note that description of fields and subfields the same as in FIG. 23 are omitted.

The Short SSW packet includes a control trailer, and the control trailer includes Reduced Discovery Information field, for example.

The Reduced Discovery Information field includes information necessary for the STA 100 to complete discovery, e.g., BSS Type, Short SSID, RSN Info, and Reduced Capabilities field.

The Reduced Capabilities field includes information necessary for the STA 100 to perform initial connection (association or authentication) after having completed discovery. For example, authentication procedures and types of security algorithm that the AP/PCP 300 supports, for example, are included.

The Reduced Capabilities field includes, for example, a DMG Privacy field, and an extended centralized access point (ECAPC, personal basic service set control point cluster) Policy field.

The STA 100 receives a Short SSW packet including shortened information regarding the BSS, during the A-BFT period in FIG. 47.

The STA 100 judges whether or not to transmit a probe response, based on the shortened information regarding the BSS that has been received. For example, the Reduced Capabilities field does not include all information regarding the AP/PCP 300, so in a case where information regarding a function that the STA 100 uses is not included in the Reduced Capabilities field, judgement is made to transmit a probe response during the DTI.

Also, with regard to multiple option functions of the AP/PCP 300, the Reduced Capabilities field includes bits indicating whether or not the AP/PCP 300 supports the option functions, but does not include parameters regarding the option functions.

Accordingly, the STA 100 may use option functions that the AP/PCP 300 supports, and in a case where additional parameters regarding the option functions are insufficient, transmit a probe request to the AP/PCP 300 during the DTI. The STA 100 can obtain additional parameters regarding the option functions by receiving the probe response from the AP/PCP 300.

Note that in a case of the STA 100 not using option functions that the AP/PCP 300 supports, or in a case of the STA 100 using option functions that the AP/PCP 300 supports and additional parameters regarding the option functions are sufficient, the STA 100 may omit transmission of the probe request to the AP/PCP 300. The STA 100 may decide whether or not to transmit a probe request to the AP/PCP 300 in accordance with the type of operation functions to be used.

In a case of having received a SSW frame and Short SSW packet during the A-BFT period, the STA 100 may transmit a SSW-FB frame to the AP/PCP 300.

In a case of having received a DMG beacon where Discovery Mode=1, including a field indicating a discovery request (DR=1), during the BTI, the AP/PCP 300 transmits a Short SSW packet including shortened information regarding the BSS during the A-BFT period but does not transmit a probe response, so the STA 100 can shorten the delay required for discovery. Also, the AP/PCP 300 does not transmit a probe response, so interference on other STAs can be reduced.

The STA 100 judges whether or not to transmit a probe request during the DTI, based on shortened information regarding the BSS, so unnecessary transmission of probe requests can be reduced, the delay required for discovery can be shortened, and interference on other STAs can be reduced.

Figure 49:
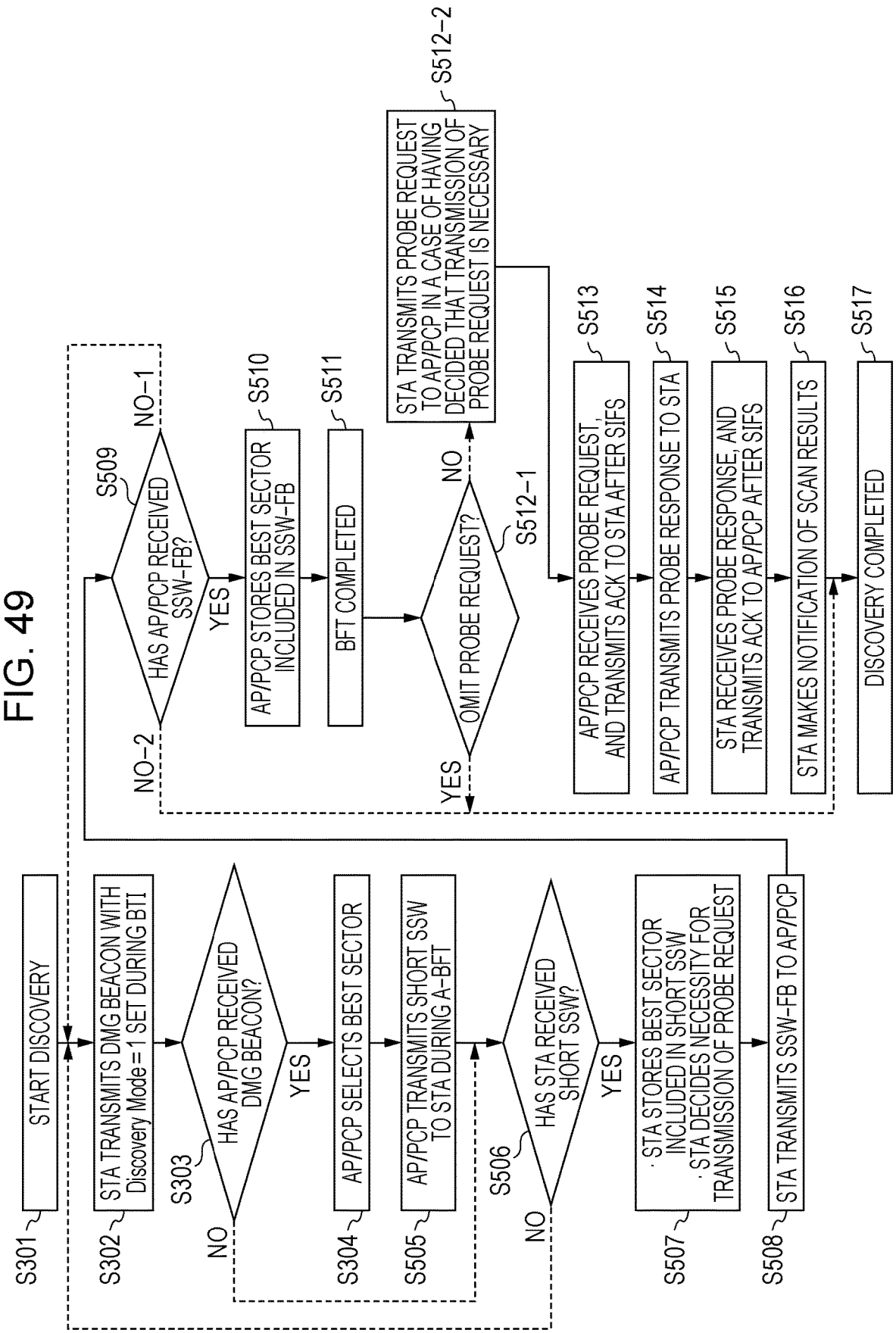
FIG. 49 is a flowchart illustrating an example of procedures of a STA performing discovery by an active scan where Discovery Mode=1.

FIG. 49 is a flowchart illustrating an example of procedures of the STA 100 performing discovery by active scanning where Discovery Mode=1. Processes the same as with FIG. 36 in the third embodiment are denoted by the same numbers, and description will be omitted.

First, the STA 100 starts discovery (S301).

Next, the STA 100 transmits a DMG beacon where the value of the Discovery Mode field has been set to 1, during the BTI (S302).

In a case where the AP/PCP 300 did not receive the DMG beacon from S302 during the BTI, or there is another reason (e.g., case of detecting interference) (S303: NO), the flow advances to S506 which will be described later. The AP/PCP 300 omits transmission of the Short SSW frame in the later-described S505 in this case.

In a case of the AP/PCP 300 having received the DMG beacon from S302 during the BTI (S303: YES), the AP/PCP 300 selects the best sector (S304). The AP/PCP 300 then transmits a Short SSW packet to the STA 100 during the A-BFT period (S505). Note that the AP/PCP 300 may transmit Short SSW packets switching the transmission sector for each Short SSW packet. The AP/PCP 300 may also include information of the best sector for the STA 100 (e.g., measured by the DMG beacon in S303) in the Short SSW packet and transmit. In a case of having received a DMG beacon including a field indicating a discovery request (DR=1) during the BTI, the AP/PCP 300 may add a controller trailer to the Short SSW packet and include shortened information regarding the BSS, and transmit.

In a case where the STA 100 does not receive the Short SSW packet from S505 during the A-BFT period (S506: NO), the flow returns to S302, and the STA 100 may reattempt transmission of the DMG beacon. Cases where the Short SSW packet was not received here may include a case where the AP/PCP 300 did not transmit the Short SSW packet in S505, and/or a case where the STA 100 did not receive the Short SSW packet due to contention with transmission by other STAs or insufficient reception sensitivity. Note that in a case of having reattempted a predetermined number of times, discovery of the current wireless channel and AP/PCP 300 may be ended.

In a case of having received an SSW frame during the A-BFT period (S506: YES), the STA 100 selects the best sector for the AP/PCP 300, and stores information of the best sector in memory, to be used for subsequent communication with the AP/PCP 300. The STA 100 also determines whether or not to transmit a probe request, based on the shortened information regarding the BSSs, included in the control trailer of the Short SSW packet (S507). In a case where decision has been made by the STA 100 in this S507 to omit transmission of a probe request, the flow may advance to S517 and discovery may be completed.

The STA 100 transmits an SSW-FB frame to the AP/PCP 300 (S508).

On the other hand, in a case of having received the SSW-FB frame from S508 (S509: YES), information of the best sector included in the SSW-FB frame is stored in memory (S510). Note that in a case where the AP/PCP 300 has not received the SSW-FB frame from S508, the flow may return to S302 (S509: NO-1). Alternatively, in this case, the flow may advance to S517 and discovery may be completed (S509: NO-2).

Next, the AP/PCP 300 judges that BFT between the AP/PCP 300 itself and the STA 100 has been completed (S511).

On the other hand, in a case of having decided to transmit a probe request in S507 (S512-1: NO), the STA 100 transmits a probe request to the AP/PCP 300 (S512-2), and the flow advances to S513. Note that in a case where the STA 100 has decided in S507 to omit transmission of the probe request, the processing of S512-2 is not performed (S512-1: YES), the flow advances to S517, and discovery is completed.

On the other hand, the AP/PCP 300 receives the probe request in S512, and transmits an ACK frame to the STA after SIFS (S513).

Next, the AP/PCP 300 transmits a probe response to the STA 100 (S514).

On the other hand, the STA 100 receives the probe response in S514, and transmits an ACK frame to the AP/PCP 300 after SIFS (S515).

Next, the MAC processor (see FIG. 8) of the STA 100 notifies the host controller of the scan results (e.g., information of the AP/PCP 300 included in the probe response, and reception quality) (S516).

The STA 100 then completes discovery of the AP/PCP 300 (S517).

Figure 50:
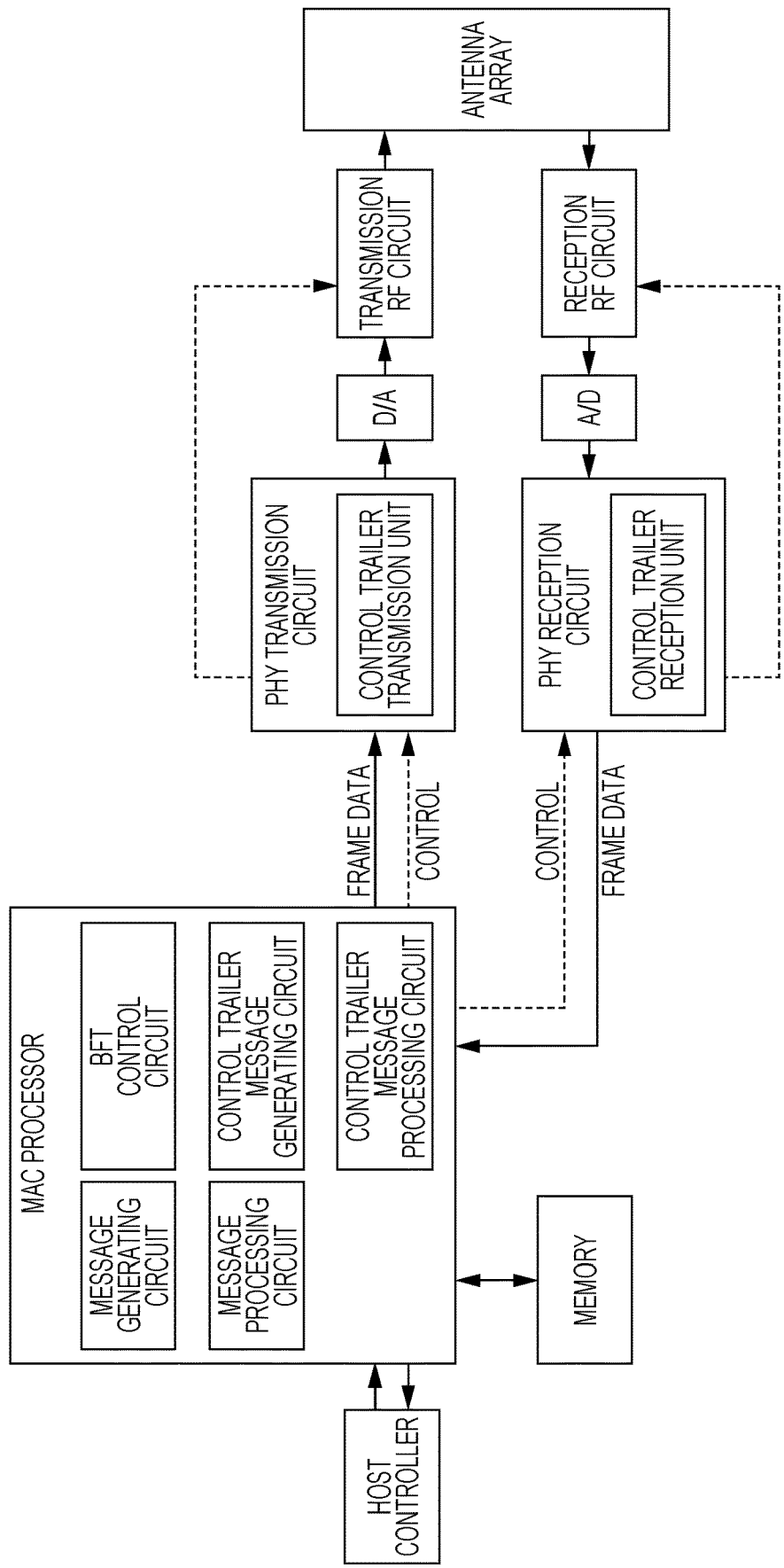
FIG. 50 is a block diagram illustrating an example of the configuration of a communication apparatus (AP/PCP and STA)

FIG. 50 is a block diagram illustrating an example of the configuration of a communication apparatus (AP/PCP 300 and STA 100). Description of components that are the same as in FIG. 32 will be omitted.

The MAC processor includes a control trailer message generating circuit and a control trailer message processing circuit.

During the A-BFT period, the control trailer message generating circuit of the AP/PCP 300 generates shortened information regarding the BSS, based on information regarding the BSS (e.g., input from the host controller), generates data for the control trailer (see FIG. 48), and inputs to the PHY transmission circuit. The PHY transmission circuit performs encoding and/or modulation of data for the control trailer, adds to a Short SSW packet, and transmits.

The STA 100 receives the Short SSW packet with the control trailer attached during the A-BFT period, the PHY reception circuit performs demodulation and/or decoding of the main unit of the Short SSW packet and control trailer, generates Short SSW data and data of the control trailer, and inputs to the MAC processor. The control trailer message processing circuit generates shortened information regarding the BSS from the data of the control trailer, and outputs to the host controller.

In a case of having judged to transmit a probe response, based on the shortened information regarding the BSS that has been received, the message generating circuit generates data for the probe request, and inputs to the PHY transmission circuit.

The host controller receives the shortened information regarding the BSS that has been received, and information of the probe response (probe request), as the results of discovery.

Modifications of Fifth Embodiment

Modification 5-1

The STA 100 may include, in a DMG beacon, a field indicating whether or not to support reception of a Short SSW packet attached with a control trailer including shortened information regarding the BSS, during the BTI.

Modification 5-2

The information that the AP/PCP 300 includes in the control trailer during the A-BFT period may be discovery information stipulated in the First Initial Link Setup (FILS) standard (IEEE 802.11ai).

Modification 5-3

The STA 100 may include a field including a discovery request (DR=1) in the SSW-FB frame and transmit during the A-BFT period, in the same way as in FIG. 35. In a case of judging that there is a need to transmit a probe request, the STA 100 may include a field including a discovery request (DR=1) in the SSW-FB frame and transmit.

In a case of having received the SSW-FB frame including a field including a discovery request (DR=1), the AP/PCP 300 transmits a probe response to the STA 100 during the DTI.

In a case of having judged to transmit a probe request, the STA 100 may transmit a field including a discovery request (DR=1) in the SSW-FB frame instead of transmitting a probe request during the A-BFT period, and thereby receive a probe response from the AP/PCP 300.

Modification 5-4

The STA 100 may judge that the AP/PCP 300 is not an object of discovery, based on the shortened information regarding the BSS received during the A-BFT period, and cancel transmission of a probe request. For example, this is a case where the BSS Type does not match the BSS Type according to the application that the STA 100 will use.

As described above, in a case where the AP/PCP 300 has received a DMG beacon where Discovery Mode=1, including a field indicating a discovery request (DR=1), during the BTI, the AP/PCP 300 transmits a Short SSW packet including shortened information regarding the BSS, and omits transmission of a probe response. Thus, the STA 100 can shorten delay required for discovery. The AP/PCP 300 also can omit transmission of a probe response, and thus interference on other STAs can be reduced.

The STA 100 judges whether or not to transmit a probe request, based on the shortened information regarding the BSS received during the A-BFT period. Accordingly, transmission of unnecessary probe requests can be reduced, delay required for discovery can be shortened, and interference on other STAs can be reduced.

Sixth Embodiment

In a case of having received an SSW frame including DR=1 during the A-BFT period, a probe response is transmitted in the first embodiment, but a control trailer (the same as that attached to the Short SSW in the fifth embodiment) is attached to the SSW-FB frame and transmitted in the sixth embodiment by the AP/PCP 300, thereby completing discovery of the STA 100 at an early stage.

Figure 51:
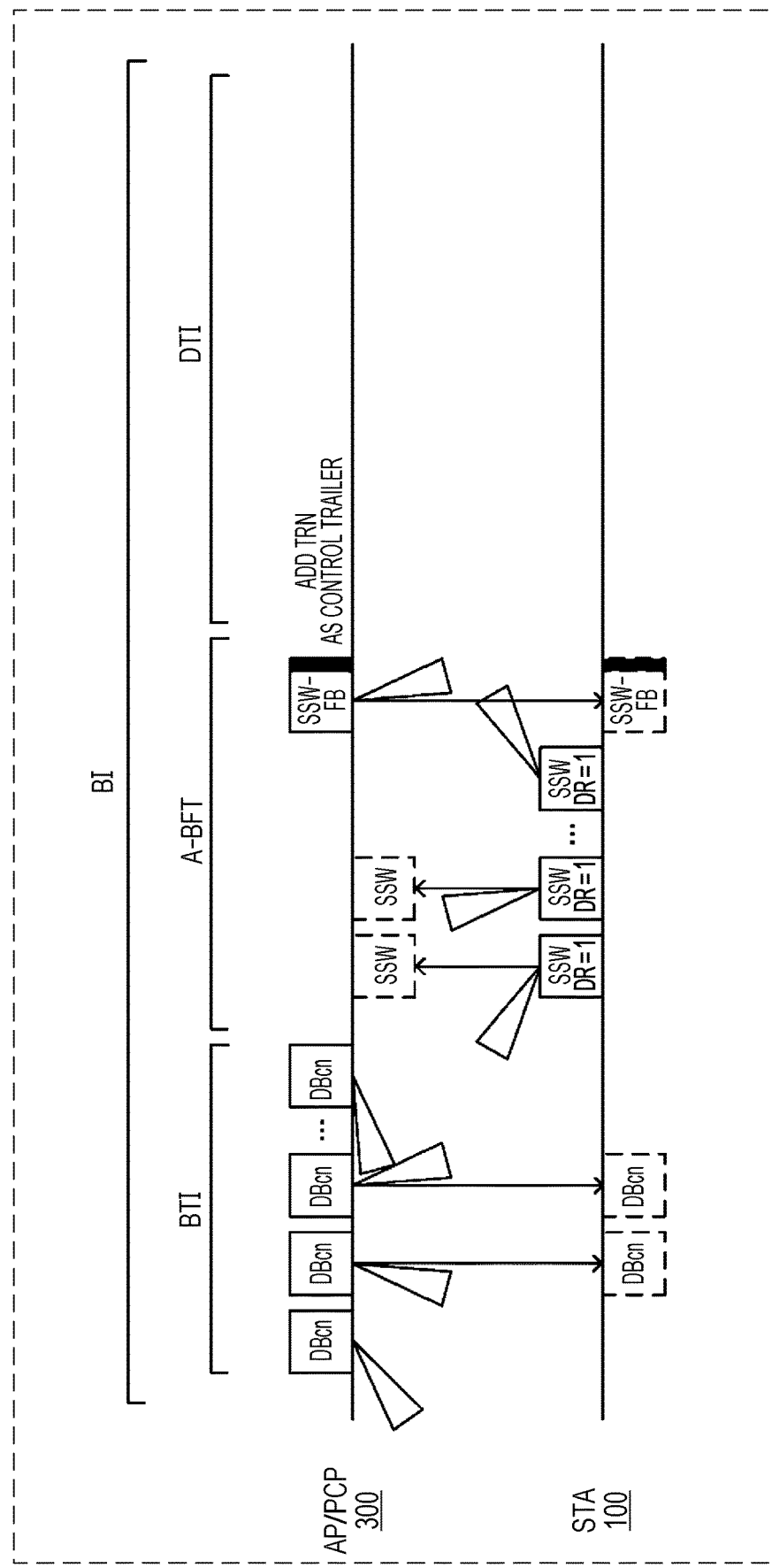
FIG. 51 is a diagram illustrating an example of procedures of a STA performing an active scan.

FIG. 51 is a diagram illustrating an example of procedures of the STA 100 performing active scanning. The AP/PCP 300 transmits DMG beacons during the BTI, while switching the transmission sector for each DMG beacon.

The STA 100 receives the DMG beacon during the BTI, and determines the best sector for the AP/PCP 300. The STA 100 transmits an SSW frame including information of the best sector for the AP/PCP 300 and a field indicating a discovery request (DR=1) during the A-BFT period.

The AP/PCP 300 receives the SSW frame and determines the best sector for the STA 100. The AP/PCP 300 includes information of the best sector for the STA 100 in the SSW-FB frame, attaches a control trailer, and transmits during the A-BFT period. The control trailer includes shortened information regarding the BSS (see FIG. 48).

The STA 100 receives the SSW-FB frame with the control trailer attached during the A-BFT period. Demodulation and/or decoding of the control trailer is performed, thereby obtaining shortened information regarding the BSS.

The STA 100 determines whether or not to request information of a probe response from the AP/PCP 300, based on shortened information regarding the BSS. That is to say, whether or not to transmit a Probe Request frame is decided.

In a case of having received a DMG beacon from the AP/PCP 300 during the BTI, the STA 100 obtains shortened information regarding the BSS from the SSW-FB frame before performing probe exchange, (transmission of Probe Request frame and reception of probe response), and determines whether or not the AP/PCP 300 is an AP/PCP that is the object of discovery. Accordingly, unnecessary probe exchange is not performed, so delay required for discovery can be shortened, and interference on other STAs (omitted from illustration) can be suppressed.

Note that the STA 100 may transmit an SSW frame during the A-BFT period without including DR=1. The AP/PCP 300 may transmit an SSW-FB frame with a control trailer attached during the A-BFT period, regardless of whether or not the received SSW frame includes DR=1.

A STA that supports reception of control trailers (e.g., STA 100) demodulates and/or decodes the control trailer and obtains shortened information regarding the BSS. A STA that does not support reception of control trailers (omitted from illustration) receives the SSW-FB frame and discards the control trailer.

Note that the STA 100 may transmit a Short SSW packet during the A-BFT period instead of an SSW frame. In a case of having received an SSW frame including DR=1 and a Short SSW packet, the AP/PCP 300 may judge that the transmission source STA (e.g., STA 100) supports reception of control trailers, and transmit an SSW frame with a control trailer added. In a case of having received an SSW-FB frame not including DR=1, the AP/PCP 300 may judge that the transmission source STA (another STA omitted from illustration) does not support reception of control trailers, and transmit an SSW-FB frame without a control trailer added. Thus, backward compatibility with the 11ad standard is maintained.

Figure 52:
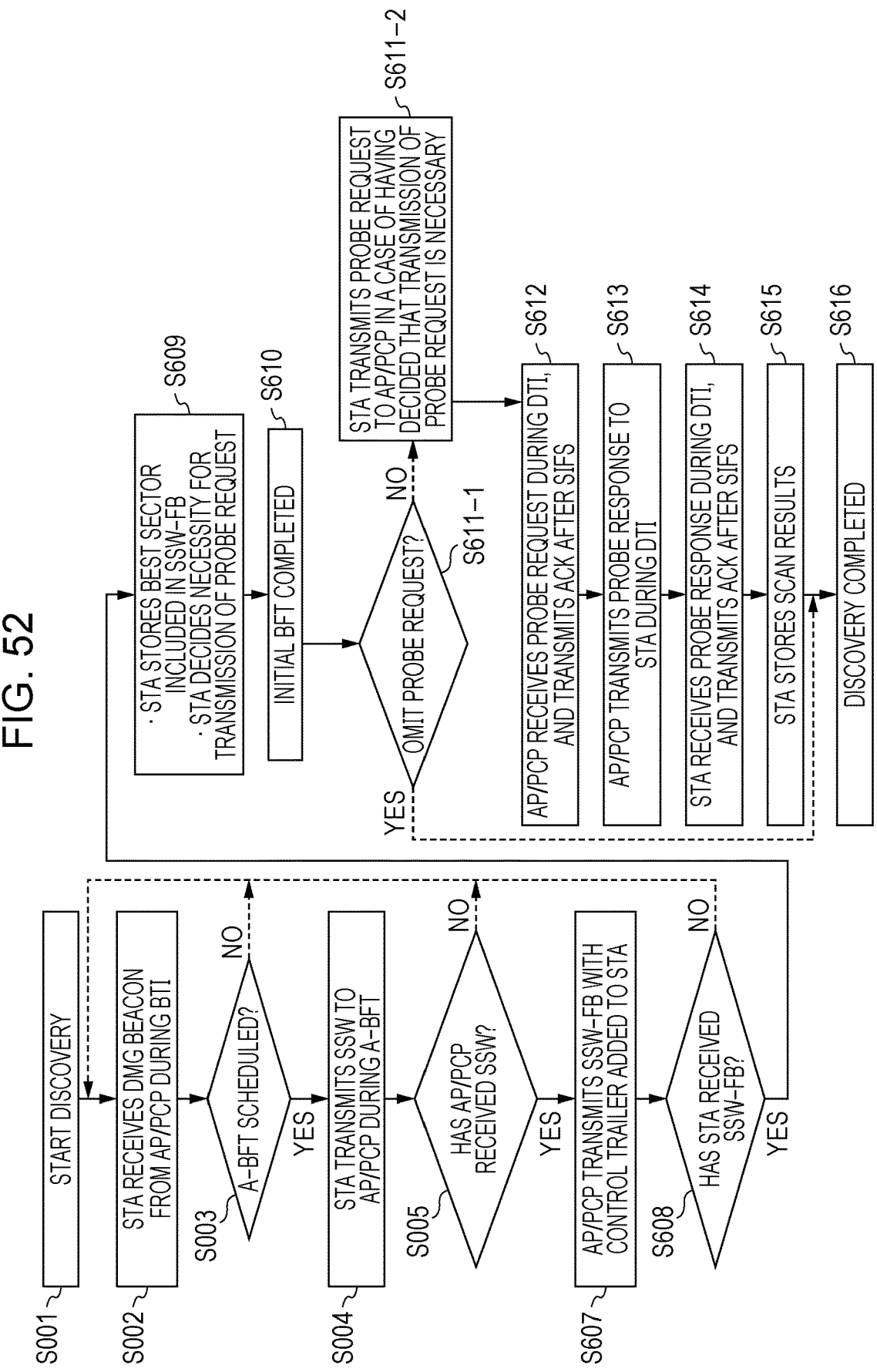
FIG. 52 is a flowchart illustrating an example of procedures of a STA performing discovery.

FIG. 52 is a flowchart illustrating an example of procedures of the STA 100 performing discovery. Processes that are the same as in FIG. 7 (first embodiment) are denoted by the same numbers, and description will be omitted.

First, the STA 100 starts discovery (S001), and processing the same as S002 through S004 in FIG. 7 is executed.

In a case of having received a SSW frame including a field indicating a discovery request (DR=1) (S005: YES), the AP/PCP 300 transmits an SSW-FB frame with a control trailer attached to the STA 100 (S607) (see the A-BFT period in FIG. 51). Note that the AP/PCP 300 may transmit the SSW-FB frame using the best sector notified by the SSW frame. The AP/PCP 300 may also include best sector information for the STA 100 in the SSW-FB frame and transmit.

On the other hand, in a case of having received the SSW-FB frame from S607 (S608: YES), the STA 100 stores information of the best sector included in the SSW-FB frame in memory, in preparation for communication with the AP/PCP 300 (see the A-BFT period in FIG. 51). In a case of having received an SSW-FB frame including a control trailer, the STA 100 determines whether or not to transmit a probe request, based on shortened information relating to the BSS included in the control trailer (S609) (see the A-BFT period in FIG. 51).

The STA 100 then judges the initial BFT between the AP/PCP 300 and the STA 100 itself to have been completed (successful) (S610).

Next, in a case of having decided to transmit a probe request in S609 (S611-1: NO), the STA 100 transmits a probe request to the AP/PCP 300 during the DTI (S611-2) (see DTI in FIG. 2), and the flow advances to S612. Note that in a case of the STA 100 having decided in S609 not to transmit a probe request (S611-1: YES), the flow may advance to S616 and complete discovery of the AP/PCP 300 (see the DTI in FIG. 51).

On the other hand, the AP/PCP 300 receives the probe request from S612 during the DTI, and transmits an ACK frame to the STA 100 after SIFS (S612) (see the DTI in FIG. 2).

Next, the AP/PCP 300 transmits a probe response to the STA 100 during the DTI (S613).

On the other hand, the STA 100 receives the probe response from S613 during the DTI, and transmits an ACK frame to the AP/PCP 300 after SIFS (S614).

Next, the STA 100 stores scan results included in the probe response in memory (S615).

The STA 100 then competes discovery with regard to the AP/PCP 300 (S616). The STA 100 may return the flow to S001 and repeat discovery on the same wireless channel, or after having switched wireless channels, in order to perform discovery regarding other AP/PCPs (omitted from illustration).

Modification of Sixth Embodiment

The AP/PCP 300 may attach a control trailer and include information indicating whether or not transmission of an SSW-FB frame including shortened information regarding the BSS (see the A-BFT period in FIG. 51) is supported in a DMG beacon (see BTI in FIG. 51) and transmit. Note that the STA 100 may include DR=1 in the SSW frame during the A-BFT period in FIG. 51.

The STA 100 may include a field indicating a request for the probe response according to the first embodiment in the SSW frames during the A-BFT period in FIG. 51. Also, the STA 100 may include in the SSW frames a field indicating requesting one of the probe response according to the first embodiment and shortened information regarding the BSS included in the control trailer according to the sixth embodiment, or requesting neither. Note that the STA 100 may transmit a Short SSW packet during the A-BFT period in FIG. 51 instead of the SSW frames.

The information that the AP/PCP 300 includes in the control trailer in the SSW-FB frame during the A-BFT period in FIG. 51 may be discovery information stipulated in FILS (IEEE 802.11ai), the same as in the fifth embodiment.

The STA 100 may judge that the AP/PCP 300 is not an object of discovery, based on the shortened information regarding the BSS received during the A-BFT period, and cancel transmission of a probe request. For example, this is a case where the BSS Type does not match the BSS Type according to the application that the STA 100 will use.

As described above, in a case where the AP/PCP 300 has received an SSW frame including a field indicating a discovery request (DR=1), during the A-BFT period, the AP/PCP 300 transmits an SSW-FB frame to which is attached a control trailer including shortened information regarding the BSS. Thus, the STA 100 can obtain shortened information regarding the BSS before performing probe exchange, and determine whether or not the AP/PCP 300 is an AP/PCP that is an object of discovery. Accordingly, unnecessary probe exchange is not performed, so delay required for discovery can be shortened, and interference on other STAs (omitted from illustration) can be reduced.

Embodiments have been described so far. The functional blocks used in description of the above embodiments typically are realized as large scale integration (LSI) that is an integrated circuit. These may be individually formed into one chip, or part or all may be included in one chip. Although the term LSI has been used here, these may be referred to as integrated circuit (IC), system LSI, super LSI, and ultra LSI, depending on the degree of integration.

The circuit integration technique is not restricted to LSIs, and dedicated circuits or dedicated processors may be used to realize the same. A field programmable gate array (FPGA) which can be programmed after manufacturing the LSI, or a reconfigurable processor where circuit cell connections and settings within the LSI can be reconfigured, may be used.

Further, in the event of the advent of an integrated circuit technology which would replace LSIs by advance of semiconductor technology or a separate technology derived therefrom, such a technology may be used for integration of the functional blocks, as a matter of course. Application of biotechnology and so forth is a possibility.

An aspect of the present disclosure is applicable to a communication system conforming to Wi-Fi standards to be compiled hereinafter, e.g., the IEEE 802.11ay standard.

What is claimed is:

1. A wireless communication method for a wireless communication apparatus, the method comprising:
    transmitting one or more beacon frames during a beacon transmission period;
    receiving one or more transmission sector sweep frames from other wireless communication apparatus, during a beamforming training period following the beacon transmission period;
    extracting, in a case where information relating to a discovery request is included in the one or more transmission sector sweep frames, information relating to a first transmission sector that is selected by the other wireless communication apparatus from among the one or more transmission sector sweep frames;
    selecting a second transmission sector from transmission sectors used by the other wireless communication apparatus, the transmission sectors being included in the received one or more transmission sector sweep;
    transmitting a feedback frame including information regarding the selected second transmission sector, using the first transmission sector during the beamforming training period; and
    transmitting a probe response frame including information regarding the selected second transmission sector, using the first transmission sector, during a data transmission period following the beamforming training period.

2. The wireless communication method according to claim 1, wherein the wireless communication apparatus changes the transmission sector for transmission of the beacon frames, for each beacon frame.

3. The wireless communication method according to claim 1,
wherein the wireless communication apparatus determines the other wireless communication apparatus that is a transmission destination of the feedback frame, based on information relating to the selected first transmission sector.

4. The wireless communication method according to claim 3,
wherein the first transmission sector is selected based on reception quality of the beacon frame at the other wireless communication apparatus.

5. The wireless communication method according to claim 1,
wherein the second transmission sector is selected based on reception quality of the transmission sector sweep frame at the wireless communication apparatus.

6. A wireless communication apparatus, comprising: a transmission circuit; a reception circuit; and a MAC processing circuit,
wherein the transmission circuit
transmits one or more beacon frames during a beacon transmission period,
transmits one or more feedback frames using a second transmission sector during a beamforming training period following the beacon transmission period, and
transmits a probe response frame using the second transmission sector, in a data transmission period following the beamforming training period,
wherein the reception circuit
receives one or more transmission sector sweep frames from other wireless communication apparatus, during the beamforming training period,
and wherein the MAC processing circuit, in a case where information regarding a discovery request is included in the one or more transmission sector sweep frames received,
extracts information relating to a first transmission sector that is selected by the other wireless communication apparatus, the information relating to a first transmission sector being included in the received one or more transmission sector sweep frames,
selects a second transmission sector from transmission sectors used by the other wireless communication apparatus, included in the received one or more transmission sector sweep frames, and
generates a feedback frame including information regarding the selected second transmission sector, and a probe response frame including information regarding the selected second transmission sector.

* * * * *